United States Patent [19]

Sugata et al.

[11] Patent Number: 4,847,639

[45] Date of Patent: Jul. 11, 1989

[54] LIQUID JET RECORDING HEAD AND RECORDING SYSTEM INCORPORATING THE SAME

[75] Inventors: Masao Sugata, Yokohama, Japan; Tatsuo Masaki, deceased, late of Yokohama, Japan, by Yoshiko Masaki, legal successor; Shinichi Hirasawa; Hirokazu Komuro, both of Hiratsuka; Yasuhiro Yano, Kawasaki, all of Japan

[73] Assignee: Canon Kabushiki Kaisha, Tokyo, Japan

[21] Appl. No.: 242,283

[22] Filed: Sep. 9, 1988

Related U.S. Application Data

[63] Continuation of Ser. No. 45,740, May 5, 1987, which is a continuation of Ser. No. 872,237, Jun. 9, 1986, abandoned.

[30] Foreign Application Priority Data

| | | | |
|---|---|---|---|
| Jun. 10, 1985 | [JP] | Japan | 60-124394 |
| Jun. 10, 1985 | [JP] | Japan | 60-124393 |
| Jun. 11, 1985 | [JP] | Japan | 60-125157 |
| Jun. 11, 1985 | [JP] | Japan | 60-125154 |
| Jun. 11, 1985 | [JP] | Japan | 60-125153 |
| Jun. 11, 1985 | [JP] | Japan | 60-125155 |
| Jun. 11, 1985 | [JP] | Japan | 60-125156 |
| Jun. 12, 1985 | [JP] | Japan | 60-126290 |
| Jun. 12, 1985 | [JP] | Japan | 60-126288 |
| Jun. 12, 1985 | [JP] | Japan | 60-126289 |
| Jun. 13, 1985 | [JP] | Japan | 60-127220 |
| Jun. 13, 1985 | [JP] | Japan | 60-127218 |
| Jun. 13, 1985 | [JP] | Japan | 60-127219 |
| Jun. 14, 1985 | [JP] | Japan | 60-128356 |
| Jun. 14, 1985 | [JP] | Japan | 60-128355 |
| Jun. 14, 1985 | [JP] | Japan | 60-128354 |
| Jun. 14, 1985 | [JP] | Japan | 60-128353 |
| Jun. 15, 1985 | [JP] | Japan | 60-130511 |

[51] Int. Cl.[4] .......... G01D 15/16

[52] U.S. Cl. .......... 346/140 R; 204/192.21; 338/309; 338/314; 427/39; 427/122; 428/408

[58] Field of Search .......... 346/140, 76 PH; 219/543; 338/308, 309, 314; 204/192.21; 427/122, 39; 428/408; 252/502

[56] References Cited

U.S. PATENT DOCUMENTS

| | | | |
|---|---|---|---|
| 3,301,707 | 1/1967 | Loeb et al. | 117/227 |
| 3,604,970 | 9/1971 | Culbertson et al. | 313/107 |

(List continued on next page.)

FOREIGN PATENT DOCUMENTS

| | | |
|---|---|---|
| 0071082 | 2/1983 | European Pat. Off. . |
| 3411702 | 10/1984 | Fed. Rep. of Germany . |
| 3316182 | 11/1984 | Fed. Rep. of Germany . |
| 3041420 | 1/1985 | Fed. Rep. of Germany . |
| 56-49521 | 6/1981 | Japan . |
| 58-42472 | 3/1983 | Japan . |
| 58-42473 | 3/1983 | Japan . |
| 1410876 | 10/1975 | United Kingdom . |
| 1582231 | 1/1981 | United Kingdom . |
| 2083841 | 3/1982 | United Kingdom . |
| 2109012 | 5/1983 | United Kingdom . |

OTHER PUBLICATIONS

Official Actions of U.K. Patent Office dated Jul. 22, 1987 and German Patent Office dated Jun. 2, 1987.

*Primary Examiner*—Joseph W. Hartary
*Attorney, Agent, or Firm*—Fitzpatrick, Cella, Harper & Scinto

[57] ABSTRACT

A liquid jet recording head such as an ink jet recording head has liquid passages having liquid outlets through which a recording liquid is discharged in the form of jet of droplet, and electro-thermal transducers for generating heat which produce energy for discharging the liquid in response to inputted electric signals. The electro-thermal transducer has a heat-generating resistance layer which is made of an amorphous material containing halogen atoms and hydrogen atoms in a matrix of carbon atoms. Disclosed also is a recording system incorporating this recording head. The amorphous material can further contain silicon atoms and/or germanium atoms.

307 Claims, 14 Drawing Sheets

U.S. PATENT DOCUMENTS

| | | | |
|---|---|---|---|
| 3,639,165 | 2/1972 | Rairden | 117/227 |
| 3,645,783 | 2/1972 | Rupert et al. | 117/212 |
| 3,961,103 | 6/1976 | Aisenberg | 427/39 |
| 4,036,786 | 7/1977 | Tiedemann | 252/502 X |
| 4,060,660 | 11/1977 | Carlson et al. | 428/408 |
| 4,172,718 | 10/1979 | Menzel | 75/174 |
| 4,296,309 | 10/1981 | Shinmi et al. | 219/216 |
| 4,345,262 | 8/1982 | Shirato | 346/140 |
| 4,361,638 | 11/1982 | Higashi et al. | 430/58 |
| 4,382,100 | 5/1983 | Holland | 427/39 X |
| 4,400,410 | 8/1983 | Green et al. | 427/39 |
| 4,414,274 | 11/1983 | Hieber | 428/336 |
| 4,436,797 | 3/1984 | Brady et al. | 430/5 |
| 4,504,519 | 3/1985 | Zelez | 427/39 |
| 4,522,663 | 6/1985 | Ovshinsky et al. | 148/403 |
| 4,567,493 | 1/1986 | Ikeda | 346/140 |
| 4,568,626 | 2/1986 | Ogawa | 430/128 |
| 4,585,704 | 4/1986 | Hirai | 428/408 X |
| 4,597,844 | 7/1986 | Hiraki et al. | 204/192 |
| 4,629,514 | 12/1986 | Suda | 204/192.21 X |

LIQUID JET RECORDING HEAD AND RECORDING SYSTEM INCORPORATING THE SAME

This is a continuation of application Ser. No. 045,740, filed May 5, 1988 which is a continuation of application Ser. No. 872,237, filed June 9, 1986 now abandoned.

BACKGROUND OF THE INVENTION

1. Field of the Invention

The present invention relates to a liquid jet recording head and a liquid jet recording system incorporating such a liquid jet recording head.

2. Related Background Art.

Amongst various recording systems heretofore known, a non-impacting system referred to as an "ink jet recording system" is superior in that it enables high-speed recording on ordinary paper sheet without substantial noise and without requiring any specific fixing treatment.

Various proposals and improvements have been made with respect to this type of recording system. Some of these proposals and improvements have already been carried out commercially, while others are still in the course of being developed for practical use.

The ink jet recording system employs a recording liquid generally referred to as "ink liquid". Droplets of the recording liquid are made to fly by various methods towards the recording member such as a paper sheet so as to be deposited on the recording member, thereby recording the desired information.

The present applicant also has proposed a new recording system of ink jet type, as disclosed in German Patent Laid-Open No. 2,843,064. This new method relies upon the following principle. Namely, thermal pulses as information signals are delivered to the recording liquid contained by a chamber. As a result of the application of the thermal pulses, the ink generates vapor voids which in turn cause the ink to be contracted and pressurized so as to be discharged from the chamber. The thus discharged recording liquid is made to fly in the form of a droplet towards the recording member and is deposited on the latter so as to record the inputted information.

This system is easily adaptable to high-speed recording and color recording, because of the feasibility of providing a high-density multi-array arrangement. In addition, since this principle can be put into use by a simpler arrangement than a conventional one, the recording head as a whole can be made compact and mass-produced easily. It is to be noted also that, by making effective use of IC (integrated circuit) and microprocessing technologies which have made remarkable progress, the recording head can have a suitably large length. For these reasons, this new liquid jet recording system can enjoy a wide use.

This liquid jet recording system features a recording head which incorporates an electro-thermal transducer as means for forcing out the ink and forming droplets of the liquid.

In order to attain a highly efficient application of the heat energy to the liquid, as well as a high responsive behavior of the liquid with respect to the on-off control of the heat, it is considreed that the electro-thermal transducer is preferably provided in a heating region which communicates with the discharge port, so that it may directly contact the liquid.

The electro-thermal transducer is basically composed of a heat-generating resistance element which generates heat when supplied with electric power and a pair of electrodes through which the electric power is supplied to the resistance element.

This direct contact between the electro-thermal transducer and the recording liquid, however, suffers from the following disadvantages. Namely, the direct contact between the electro-thermal transducer and the liquid may cause leaking of electric current through the recording liquid, depending on the resistivity of the liquid. The electric current flowing in the liquid may cause electrolysis of the liquid. There is also a risk of reaction between the heat-generating resistance element and the liquid when the element is activated by the electric power supplied thereto. Such a reaction may lead to corrosion of the heat-generating element, resulting in a change in the resistivity and/or destruction of the heat-generating element. It is also possible that the surface of the heat-generating element will be mechanically eroded or the element cracked or broken by a mechanical impact caused when the vapor voids generated as a result of application of the electric power collapsed to be extinguished.

In order to obviate this problem, it has been proposed that a protective layer made of a material having a high resistance to acid such as $SiO_2$ be formed on the surface of the heat-generating element which is made of an inorganic material superior in terms of the characteristics required for a heat-generating resistor, e.g., an alloy such as NiCr or borides of metals such as $ZrB_2$ and $HfB_2$. This protective layer is intended for preventing the heat-generating element from directly contacting the recording liquid, so as to improve the reliability and durability against repeated use, thereby obviating the above-described problems.

The liquid jet recording system having a recording head incorporating this improved electro-thermal transducer can be used satisfactorily in terms of both resistance to acid and durability, when a liquid having a comparatively low electric conductivity, such as a liquid prepared by using water or an alcohol as the solvent, is used as the colored recording liquid. This recording system, however, has often failed to provide satisfactory durability and stability against secular change when used together with a recording liquid having a large content of Na ions and, hence, high electric conductivity. For this reason, it has only been possible to use this recording system with selected recording liquids and, therefore, it has not been suitable for use with multi-color or natural color recording.

As explained above, the reliability and durability of the electro-thermal transducer would be improved by providing a protective layer on the heat-generating element. Actually, however, it is very difficult to form such a protective layer on a mass-production scale with a high degree of reproducibility, and protective layers so produced tend to have defects which undesirably permit the recording liquid to penetrate into the electro-thermal transducer towards the heat-generating element.

This problem is particularly serious in the case of an arrangement known as "high-density multi-orifice" in which a liquid passage or nozzle is provided with a multiplicity of heating sections arranged at a high density. Namely, such an arrangement requires that numerous electro-thermal transducers, corresponding in number to the number of the liquid nozzles, are formed at one time. Therefore, any failure in any of the electro-thermal transducers attributable to a defect in the protective layer causes a serious problem from the view point of yield of the recording system, as well as the production cost. In addition, the protective layer tends to deteriorate the thermal response characteristic, and also the heat generating characteristic in response to inputted electric signals.

Under these circumstances, there is an increasing demand for development of a liquid jet type recording system which employs an electro-thermal transducer having no protective layer so that the heat-generating element is directly exposed to the recording liquid, the electro-thermal transducer yet being highly resistant to heat, acid, mechanical impact and electro-chemical reaction, while exhibiting a superior thermal response characteristic.

SUMMARY OF THE INVENTION

Accordingly, an object of the invention is to provide a liquid jet recording head and a liquid jet recording system incorporating such a recording head which are improved in such a manner as to overcome the above-described problems of the prior art.

Another object of the invention is to provide a liquid jet recording head and a liquid jet recording system incorporating such a recording head, wherein the liquid jet recording head has a heat-generating resistance element which exhibits a high chemical stability, as well as high resistances to electro-chemical reaction, acid, mechanical impact and heat and, hence, the protective layer on the heat-generating resistance element may be omitted so that a higher thermal response characteristic is ensured.

Still another object of the invention is to provide a liquid jet recording head and a liquid jet recording system incorporating such a recording head, wherein the liquid jet recording head has a heat-generating resistance element which is easy to form and which has a superrior mechanical strength and softness, as well as high resistance to chemicals.

A further object of the invention is to provide a liquid jet recording head and a liquid jet recording system incorporating such a recording head, wherein the liquid jet recording head incorporates a heat-generating element having a superior resistance controllability.

A still further object of the invention is to provide a liquid jet recording head and a liquid jet recording system incorporating such a recording head, wherein the liquid jet recording head has a heat-generating resistance element which can easily realize superior heat-accumulating and heat-radiating characteristics, as well as various desirable characteristics such as the bonding between the support member and the resistance layer, stability against chemical reaction, and so forth.

To these ends, according to one aspect of the invention, there is provided a liquid jet recording head comprising: at least one liquid outlet for discharging a recording liquid so as to form a jet of droplet of the recording liquid; and at least one electro-thermal transducer for producing heat energy which is used in forming the droplets of the recording liquid; wherein the electro-thermal transducer has a heat-generating resistance layer which is made of an amorphous material containing halogen atoms in a matrix of carbon atoms. There is also provided a liquid jet recording system incorporating this recording head.

According to another aspect of the invention, there is provided a liquid jet recording head comprising: at least one liquid drop outlet for discharging a recording liquid so as to form a jet of droplet of the recording liquid; at least one liquid passage communicating with the outlet and having a heating section; and at least one electro-thermal transducer corresponding to the heating section; the electro-thermal transducer including a heat-generating resistance layer formed on a support member and made of an amorphous material containing halogen atoms in a matrix of carbon atoms, and a pair of electrodes electrically connected to the heat-generating resistance layer. There is also provided a liquid jet recording system incorporating this recording head.

According to another aspect of the invention, there is provided a liquid jet recording head comprising: at least one liquid outlet for discharging a recording liquid so as to form a jet of droplet of the recording liquid; and at least one electro-thermal transducer for producing heat energy which is used in forming the droplets of the recording liquid; wherein the electro-thermal transducer has a heat-generating resistance layer which is made of an amorphous material containing hydrogen atoms in a matrix of carbon atoms. Therre is also provided a liquid jet recording system incorporating this recording head.

According to another aspect of the invention, there is provided a liquid jet recording head comprising: at least one liquid drop outlet for discharging a recording liquid so as to form a jet of droplet of the recording liquid; at least one liquid passage communicating with the outlet and having a heating section; and at least one electro-thermal transducer corresponding to the heating section; the electro-thermal transducer including a heat-generating resistance layer formed on a support member and made of an amorphous material containing hydrogen atoms in a matrix of carbon atoms, and a pair of electrodes electrically connected to the heat-generating resistance layer. There is also provided a liquid jet recording system incorporating this recording head.

According to a further aspect of the invention, there is provided a liquid jet recording head comprising: at least one liquid outlet for discharging a recording liquid so as to form a jet of droplet of the recording liquid; and at least one electro-thermal transducer for producing heat energy which is used in forming the droplets of the recording liquid; wherein the electro-thermal transducer has a heat-generating resistance layer which is made of an amorphous material containing halogen atoms and hydrogen atoms in a matrix of carbon atoms. There is also provided a liquid jet recording system incorporating this recording head.

According to another aspect of the invention, there is provided a liquid jet recording head comprising: at least one liquid drop outlet for discharging a recording liquid so as to form a jet of droplet of the recording liquid; at least one liquid passage communicating with the outlet and having a heating section; and at least one electro-thermal transducer corresponding to the heating section; the electro-thermal transducer including a heat-generating resistance layer formed on a support member and made of an amorphous material containing halogen atoms and hydrogen atoms in a matrix of carbon atoms, and a pair of electrodes electrically connected to the heat-generating resistance layer. There is also provided a liquid jet recording system incorporating this recording head.

The above and other objects, features and advantages of the invention will become clear from the following description of the preferred embodiments when the same is read in conjunction with the accompanying drawings.

DESCRIPTION OF THE PREFERRED EMBODIMENTS

The invention will be fully described hereinunder with reference to the accompanying drawings. The same drawings will be used in reference to each of three separate embodiments described herein.

Figure 1:
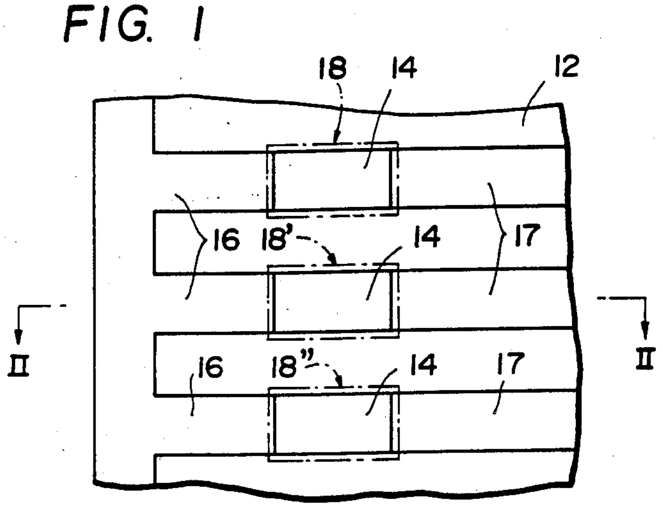
FIG. 1 is a view for explaining one embodiment of the present invention.
Figure 2:
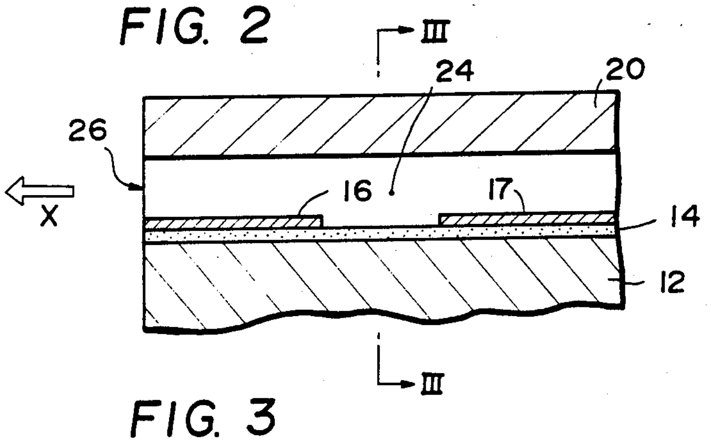
FIG. 2 is a sectional view taken along the line II—II of FIG. 1.

Referring first to FIGS. 1 and 2, a heat-generating resistance layer 14 as a constituent of an electro-thermal transducer is carrier by a support member 12. A pair of electrodes 16 and 17 are provided on the heat-generating resistance layer 14. As will be seen from FIG. 1, a plurality of modules each having the heat-generating resistance layer 14 and the electrodes 16, 17 provided on the layer 14 are arranged in a side-by-side fashion, so as to provide a multiplicity of effective heat generating regions 18, 18', 18'' which are arranged at regular intervals. In the described embodiment, the electrodes 16 of the modules are connected to a common line, thus constituting a common electrode. The arrangement is such that the heat generating regions 18, 18', 18'' are supplied with electric signals independently through the electrodes 16, 17 so that these regions generate heat in a controlled manner. As will be seen from FIG. 2, a top plate 20 having channels 22, 22', 22'' facing the heat generating regions 18, 18', 18'' is attached to the integral body constituted by the support member 12, heat-generating resistance layer 14 and the electrodes 16, 17. The channels extend in the direction of the line II—II in FIG. 1, as will be clearly shown in FIG. 3 which is a sectional view taken along the line III—III of FIG. 2. These channels provide liquid passages which are the spaces for accommodating the recording liquid. Each of the liquid passages has a heating section 24 which applies heat to the recording liquid in the liquid passage.

Each of the liquid passages is opened at its left-hand end as viewed in FIG. 2, as at 26. The open end 26 therefore constitutes an outlet for the recording liquid. The other end, i.e., the right-hand end as viewed in FIG. 2, of each liquid passage is communicated with a source of the recording liquid. The arrangement is such that, when the heat generating region associated with one of the liquid passages generates heat in response to a recording signal supplied thereto, the recording liquid in the liquid passage is evaporated to generate vapor voids so as to increase the pressure of the recording liquid, so that the liquid stagnant around the outlet 26 is discharged from the latter as indicated by an arrow X in FIG. 2. As will be understood from the foregoing explanation, FIG. 1 lacks the illustration of the top panel 20.

Preferably but not exclusively, the support member 12 is made of a material having a high durability against the heat which is applied thereto during the formation of the heat-generating resistance layer 14 thereon, as well as the heat generated by the layer 14 during the operation. It is also preferred that the material of the support member 12 has a greater electric resistivity than the heat-generating resistance layer 14 formed thereon. This, however, is not essential and the resistivity of the support member 12 may be smaller than that of the heat-generating resistance layer 14, provided that an insulating layer is interposed between the support member 12 and the heat-generating resistance layer 14. The material of the support member 12 can have a large or a small thermal conductivity, depending on the conditions of use of the liquid jet recording head.

Typical examples of the substances usable as the material of the support member 12 in the invention are inorganic matters such as glasses, ceramics, silicon and metals, and organic matters such as polyamide resins and polyimide resins.

The heat-generating resistance layer 14 according to a first embodiment is made of an amorphous material containing halogen atoms in a matrix of carbon atoms. As the halogen atoms, atoms of F, Cl, Br, I and so forth are suitably used solely or in the form of a mixture. Amongst these halogens, F and Cl are preferred between which F is more preferred.

The heat-generating resistance layer 14 according to the first embodiment, which has a matrix of carbon atoms, may contain an electroconductivity controlling substance besides the halogen atoms. The electroconductivity controlling substance may be one of so-called impurities in the field of semiconductors, e.g., one of p-type impurities which provide p-type conduction characteristics or one of n-type impurities which provide n-type conduction characteristics. Examples of the p-type impurities are elements of group III of the peiodic table, such as B, Al, Ga, In, Tl and so forth, amongst which B and Ga are used preferably, while examples of n-type impurities are elements of group V of the periodic table, such as P, As, Sb and Bi, amongst which P and As are used most preferably. These elements may be used solely or in combination.

The content of the halogen atoms in the heat-generating resistance layer 14 in the first embodiment preferably ranges between 0.0001 and 30 atomic %, more preferably between 0.0005 and 20 atomic %, and most preferably between 0.001 and 10 atomic %, although this content may be selected as desired to obtain the desired characteristics meeting the demand.

The content of the electroconductivity controlling substance, if any, in the heat-generating resistance layer 14 in the first embodiment preferably ranges between 0.01 and 50000 atomic ppm, more preferably between 0.5 and 10000 atomic ppm, and most preferably between 1 and 5000 atomic ppm, although this content may be determined as desired to obtain the desired characteristics meeting the demand. The above-mentioned ranges of the halogen atom content may apply also to the case where the heat-generating resistance layer contains the electroconductivity controlling substance in addition to the halogen atoms.

The halogen atoms and/or the electroconductivity controlling substance in the first embodiment can have non-uniform distribution in the thicknesswise direction of the heat-generating resistance layer 14. More specifically, the thickenesswise distribution of the halogen atom and/or of the electroconductivity controlling substance may have such a gradient that the content progressively increases towards the upper side of the layer 14 or, conversely, increases towards the lower side, i.e., the side adjacent the support member 12, of the layer 14. Furthermore, the distribution may be such that the content has a maximum value or a minimum value anywhere along the thickness of the layer 14. Thus, the distribution of the content of the halogen atoms and/or the electroconductivity controlling substance along the thickness of the heat-generating resistance layer 14 can be selected suitably so as to provide the desired characteristics.

The heat-generating resistance layer 14 in a second embodiment is made of an amorphous material containing hydrogen atoms in a matrix of carbon atoms.

The heat-generating resistance layer 14 according to the second embodiment, which has a matrix of carbon atoms, may contain an electroconductivity controlling substance besides the hydrogen atoms. The electroconductivity controlling substance may be one of so-called impurities in the field of semiconductors, e.g., one of p-type impurities which provide p-type conduction characteristics or one of n-type impurities which provide n-type conduction characteristics. Examples of the p-type impurities are elements of group III of the periodic table, such as B, Al, Ga, In, Tl and so forth, amongst which B and Ga are used preferably, while examples of n-type impurities are elements of group V of the periodic table, such as P, As, Sb and Bi, amongst which P and As are used most preferably. These elements may be used solely or in combination.

The content of the hydrogen atoms in the heat-generating resistance layer 14 in the second embodiment preferably ranges between 0.0001 and 30 atomic %, more preferably between 0.0005 and 20 atomic %, and most preferably between 0.001 and 10 atomic %, although this content may be selected as desired to obtain the desired characteristics meeting the demand.

The content of the electroconductivity controlling substance, if any, in the heat-generating resistance layer 14 of the second embodiment preferably ranges between 0.01 and 50000 atomic ppm, more preferably between 0.5 and 10000 atomic ppm, and most preferably between 1 and 5000 atomic ppm, although this content may be determined as desired to obtain the desired characteristics meeting the demand. The above-mentioned ranges of the hydrogen atom content may apply also to the case where the heat-generating resistance layer contains the electroconductivity controlling substance in addition to the hydrogen atoms.

The hydrogen atoms and/or the electroconductivity controlling substance in the second embodiment can have non-uniform distribution in the thicknesswise direction of the heat-generating resistance layer 14. The above-specified ranges of content of hydrogen atoms and/or the electroconductivity controlling substance apply also to the case where the hydrogen atoms and/or the electroconductivity controlling substance is distributed non-uniformly. More specifically, the thicknesswise distribution of the hydrogen atom and/or of the electroconductivity controlling substance may have such a gradient that the content progressively increases towards the upper side of the layer 14 or, conversely, increases towards the lower side, i.e., the side adjacent the support member 12, of the layer 14. Furthermore, the distribution may be such that the content has a maximum value or a minimum value anywhere along the thickness of the layer 14. Thus, the distribution of the content of the hydrogen atoms and/or the electroconductivity controlling substance along the thickness of the heat-generating resistance layer 14 can be selected suitably so as to provide the desired characteristics.

the heat-generating resistance layer 14 in a third embodiment is made of an amorphous material containing halogen atoms and hydrogen atoms in a matrix of carbon atoms. As the halogen atoms, atoms of F, Cl, Br, I and so forth are suitably used solely or in the form of a mixture. Amongst these halogens, F and Cl are preferred between which F is more preferred.

According to the invention, the amorphous material containing halogen atoms and hydrogen atoms in a matrix of carbon atoms can further contain silicon atoms.

According to the invention, the amorphous material containing halogen atoms and hydrogen atoms in a matrix of carbon atoms can further contain germanium atoms.

According to the invention, the amorphous material containing halogen atoms and hydrogen atoms in a matrix of carbon atoms can further contain silicon atoms and germanium atoms.

According to the invention, each of the amorphous materials explained above: namely, the amorphous material containing halogen atoms and hydrogen atoms in a matrix of carbon atoms, the amorphous material containing halogen atoms, hydrogen atoms and silicon atoms in the matrix of carbon atoms; the amorphous material containing halogen atoms, hydrogen atoms and germanium atoms in a matrix of carbon atoms; and the amorphous material containing halogen atoms, hydrogen atoms, silicon atoms and germanium atoms; can further contain a substance which controls the electroconductivity of the heat-generating resistance layer.

The electroconductivity controlling substance may be one of so-called impurities in the field of semiconductors, e.g., one of p-type impurities which provide p-type conduction characteristics or one of n-type impurities which provide n-type conduction characteristics. Examples of the p-type impurities are elements of group III of the periodic table, such as B, Al, Ga, In, Tl and so forth, amongst which B and Ga are used preferably, while examples of n-type impurities are elements of group V of the periodic table, such as P, As, Sb and Bi, amongst which P and As are used most preferably. These elements may be used solely or in combination.

The halogen atoms and/or the hydrogen atoms can have non-uniform distribution in the thicknesswise direction of the heat-generating resistance layer 14. More specifically, the thicknesswise distribution of the halogen atoms and/or of the hydrogen atoms have such a gradient that the content progressively increases towards the upper side of the layer 14 or, conversely, increases towards the lower side, i.e., the side adjacent the support member 12, of the layer 14. Furthermore, the distribution may be such that the content has a maximum value or a minimum value anywhere along the thickness of the layer 14. Thus, the distribution of the content of the halogen atoms and/or of the hydrogen atoms along the thickness of the heat-generating resistance layer 14 can be selected suitably so as to provide the desired characteristics.

When the heat-generating resistance layer 14 contains silicon atoms, halogen atoms and hydrogen atoms, at least one of these three kinds of atoms can have non-uniform distribution in the thicknesswise direction of the heat-generating resistance layer 14. More specifically, the thicknesswise distribution of at least one of these three kinds of atoms may have such a gradient that the content progressively increases towards the upper side of the layer 14 or, conversely, increases towards the lower side, i.e., the side adjacent the support member 12, of the layer 14, or the distribution pattern may be such that the content of at least one of these three kinds of atoms have a maximum value or a minimum value anywhere along the thickness of the layer 14. Thus, the distribution pattern of the content of at least one of three kinds of atoms along the thickness of the heat-generating resistance layer 14 can be selected suitably so as to provide the desired characteristics.

When the heat-generating resistance layer 14 contains germanium atoms, halogen atoms and hydrogen atoms, at least one of these three kinds of atoms can have non-uniform distribution in the thicknesswise direction of the heat-generating resistance layer 14. More specifically, the thicknesswise distribution of at least one of these three kinds of atoms may have such a gradient that the content progressively increases towards the upper side of the layer 14 or, conversely, increases towards the lower side, i.e., the side adjacent the support member 12, of the layer 14, or the distribution pattern may be such that the content of at least one of these three kinds of atoms have a maximum value or a minimum value anywhere along the thickness of the layer 14. Thus, the distribution pattern of the content of at least one of three kinds of atoms along the thickness of the heat-generating resistance layer 14 can be selected suitably so as to provide the desired characteristics.

When the heat-generating resistance layer 14 contains silicon atoms, germanium atoms, halogen atoms and hydrogen atoms, at least one of these four kinds of atoms can have non-uniform distribution in the thicknesswise direction of the heat-generating resistance layer 14. More specifically, the thicknesswise distribution of at least one of these four kinds of atoms may have such a gradient that the content progressively increases towards the upper side of the layer 14 or, conversely, increases towards the lower side, i.e., the side adjacent the support member 12, of the layer 14, or the distribution pattern may be such that the content of at least one of these four kinds of atoms have a maximum value or a minimum value anywhere along the thickness of the layer 14. Thus, the distribution pattern of the content of at least one of four kinds of atoms along the thickness of the heat-generating resistance layer 14 can be selected suitably so as to provide the desired characteristics.

When the heat-generating resistance layer 14 contains an electroconductivity controlling substance, e.g., when the layer 14 contains halogen atoms, hydrogen atoms and an electroconductivity controlling substance, at least one of these three kinds of atoms can have non-uniform distribution in the thicknesswise direction of the heat-generating resistance layer 14. More specifically, the thicknesswise distribution of at least one of these three kinds of atoms may have such a gradient that the content progressively increases towards the upper side of the layer 14 or, conversely, increases towards the lower side, i.e., the side adjacent the support member 12, of the layer 14, or the distribution pattern may be such that the content of at least one of these three kinds of atoms have a maximum value or a minimum value anywhere along the thickness of the layer 14. Thus, the distribution pattern of the content of at least one of three kinds of atoms along the thickness of the heat-generating resistance layer 14 can be selected suitably so as to provide the desired characteristics.

This applies also to other cases: namely, a first case where the heat-generating resistance layer 14 contains silicon atoms, halogen atoms, hydrogen atoms and an electroconductivity controlling substance, a second case where the heat-generating resistance layer 14 contains germanium atoms, halogen atoms, hydrogen atoms and an electroconductivity controlling substance, a second case where the heat-generating resistance layer 14 contains germanium atoms, halaogen atoms, hydrogen atoms and an electroconductivity controlling substance, a third case where the heat-generating resistance layer 14 contains the silicon atoms, germanium atoms, halogen atoms, hydrogen atoms and an electroconductivity controlling substance. Thus, non-uniform distribution of content of at least one of the constituent elements may be adopted in all the cases of different combinations of the constituent elements mentioned before, and the distribution pattern of the constituent element or elements may be selected suitably so as to attain the desired characteristics.

FIGS. 24 to 29 show practical examples of distribution pattern of the content of at least one of the silicon atoms, germanium atoms, halogen atoms, hydrogen atoms and the electroconductivity controlling substance along the thickness of the heat-generating resistance layer 14 in the recording head of the invention. In these Figures, the ordinate axis represents the distance T from the intersurface between the support member 12 and the heat-generating resistance layer 14, as well as the thickness t of the heat-generating resistance layer 14, while the abscissa axis represents the content C of at least one of the silicon atoms, germanium atoms, halogen atoms, hydrogen atoms and the electroconductivity controlling substance. In these Figures, the scales of the axes C and T are varied in such a manner as to emphasize the characteristics peculiar to these Figures. Thus, the invention can be carried out in accordance with the distribution patterns shown in these Figures, within certain ranges of tolerance of values in respective cases. it will be clear to those skilled in the art, however, that the content distribution patterns shown in these Figures are only illustrative and the invention does not exclude the use of other distribution patterns. The distribution patterns of the contents of different constituent elements may differ from one another, and can be selected independently of each other, in order to attain the desired characteristics. The thickness of the heat-generating resistance layer 14 can be selected freely, so as to provide optimum thermal and; mechanical characteristics.

In the case of the third embodiment, the content of the halogen atoms in the heat-generating resistance layer 14 preferably ranges between 0.0001 and 30 atomic %, more preferably between 0.0005 and 20 atomic %, and most preferably between 0.001 and 10 atomic %, although this content may be selected as desired to obtain the desired characteristics meeting the demand.

Also, in the case of the third embodiment, the content of the hydrogen atoms in the heat-generating resistance layer 14 preferably ranges between 0.0001 and 30 atomic %, more preferably between 0.0005 and 20 atomic %, and most preferably between 0.001 and 10 atomic %, although this content may be selected as desired to obtain the desired characteristics meeting the demand.

The sum of the contents of the halogen atoms and the hydrogen atoms in the heat-generating resistance layer 14 of the third embodiment, preferably ranges between 0.0001 and 40 atomic %, more preferably between 0.0005 and 30 atomic %, and most preferably between 0.001 and 20 atomic %, although this content may be selected as desired to obtain the desired characteristics meeting the demand.

The content of the silicon atoms, if any, in the heat-generating resistance layer 14 of the third embodiment preferably ranges between 0.0001 and 40 atomic %, more preferably between 0.0005 and 20 atomic %, and most preferably between 0.001 and 10 atomic %, although this content may be selected as desired to obtain the desired characteristics meeting the demand.

The content of the germanium atoms, if any, in the heat-generating resistance layer 14 of the third embodiment preferably ranges between 0.0001 and 40 atomic %, more preferably between 0.0005 and 20 atomic %, and most preferably between 0.001 and 10 atomic %, although this content may be selected as desired to obtain the desired characteristics meeting the demand.

When the halogen atoms, hydrogen atoms and the silicon atoms are contained, the sum of the contents of the silicon atoms, halogen atoms and the hydrogen atoms in the heat-generating resistance layer 14 of the third embodiment preferably ranges between 0.0001 and 40 atomic %, more preferably between 0.0005 and 30 atomic %, and most preferably between 0.001 and 20 atomic %, although this content may be selected as desired to obtain the desired characteristics meeting the demand.

When the halogen atoms, hydrogen atoms and the germanium atoms are contained, the sum of the contents of the germanium atoms, halogen atoms and the hydrogen atoms in the heat-generating resistance layer 14 of the third embodiment preferably ranges between 0.0001 and 40 atomic %, more preferably between 0.0005 and 30 atomic %, and most preferably between 0.001 and 20 atomic %, although this content may be selected as desired to obtain the desired characteristics meeting the demand.

When the halogen atoms, hydrogen atoms, silicon atoms and the germanium atoms are contained, the sum of the contents of the silicon atoms, germanium atoms, halogen atoms and the hydrogen atoms in the heat-generating resistance layer 14 of the third embodiment preferably ranges between 0.0001 and 40 atomic %, more preferably between 0.0005 and 30 atomic %, and most preferably between 0.001 and 20 atomic %, although this content may be selected as desired to obtain the desired characteristics meeting the demand.

The content of the electroconductivity controlling substance, if any, in the heat-generating resistance layer 14 of the third embodiment preferably ranges between 0.01 and 50000 atomic ppm, more preferably between 0.5 and 10000 atomic ppm, and most preferably between 1 and 5000 atomic ppm, although this content may be determined as desired to obtain the desired characteristics meeting the demand. The above-mentioned ranges of the contents of constituent elements apply both to the case where these elements are distributed uniformly and to the case where these elements are distributed non-uniformly.

The thickness of the heat-generating resistance layer is not specifically limited, and any desired thickness can be adopted in order to attain the desired thermal and mechanical characteristics.

The first embodiment of the invention will now be described.

As stated before, the heat-generating resistance layer 14 in the recording head of the first embodiment of the invention is made of an amorphous material containing halogen atoms in a matrix of carbon atoms. This amorphous material will be expressed as "a-C:X" hereinafter, where X shows halogen atoms. The amorphous material a-C:X can be formed by plasma CVD (Chemical Vapor Deposition) method such as glow-discharge method or by a vacuum deposition method such as sputtering.

The process for forming the resistance layer 14 of a-C:X by the glow discharge method basically includes the steps of: placing the support member in a deposition chamber of a reduced internal pressure; and introducing a material gas capable of supplying the carbon atoms C and a material gas capable of supplying the halogen atoms X into the deposition chamber, while causing a glow discharge within the deposition chamber by means of high-frequency wave or a microwave, thereby forming a layer of a-C:X on the support member 12. The rate of introduction of the X material gas may be changed in relation to time if a non-uniform distribution of halogen atoms X is required.

On the other hand, the formation of the resistance layer 14 of a-C:X by sputtering is conducted by a process which basically includes the steps of: placing the support member 12 in a deposition chamber maintaining an atmosphere of a reduced pressure constituted by an inert gas such as Ar, He or their mixture; and effecting sputtering on a target constituted by the carbon atoms C, while introducing the X material gas for supplying the halogen atoms X. The rate of introduction of the X gas may be varied in relation to time, in order to obtain a certain gradient, i.e., non-uniform distribution, of the halogen atoms X.

The amorphous material used as the material of the heat-generating resistance layer 14 in the recording head constituting the first embodiment of the invention can contain an electroconductivity controlling substance besides the halogen atoms in a matrix of carbon atoms. This amorphous material will be expressed as "a-C:X(p,n)" hereinafter, where X shows halogen atoms, while (p,n) represents the electroconductivity controlling substance. The amorphous material a-C:X(p,n) can be formed by plasma CVD method such as glow-discharge method or by a vacuum deposition method such as sputtering.

The process for forming the resistance layer 14 of a-C:X(p,n) by the glow discharge method basically includes the steps of: placing the support member in a deposition chamber of a reduced internal pressure; and introducing a material gas capable of supplying the carbon atoms C, a material gas capable of supplying the halogen atoms X and a material gas capable of supplying the electroconductivity controlling substance into the deposition chamber, while causing a glow discharge within the deposition chamber by means of high-frequency wave or a microwave, thereby forming a layer of a-C:X(p,n) on the support member 12. The rate of introduction of at least one of the X material gas and the (p,n) material gas may be varied in relation to time, if a non-uniform distribution of at least one of halogen atoms X and the substance (p,n) is required.

On the other hand, the formation of the resistance layer 14 of a-C:X(p,n) by sputtering is conducted by a process which basically includes the steps of: placing the support member 12 in a deposition chamber; maintaining an atmosphere of a reduced pressure constituted by an inert gas such as Ar, He or their mixture; and effecting sputtering on a target constituted by the carbon atoms C, while introducing the X material gas for supplying the halogen atoms X and the (p,n) material gas capable of supplying the electroconductivity controlling substance (p,n) into the chamber. The rate of introduction of the X material gas and/or the rate of introduction of the (p,n) material gas may be varied in relation to time, in order to obtain a certain gradient, i.e., non-uniform distribution, of the halogen atoms X and/or of the electroconductivity controlling substance.

In the processes explained above in connection with the first embodiment, the material gases for supplying the carbon atoms (C), halogen atoms (X) and the electroconductivity controlling substance (p,n) may be a substance which exists in the gaseous phase under normal pressure or a substance which can be gasified under a reduced pressure.

The material for supplying carbon atoms (C) in the first embodiment may include saturated hydrocarbons having 1 to 5 carbon atoms, ethylenic hydrocarbons having 2 to 5 carbon atoms. acetylenic hydrocarbons having 2 to 4 carbon atoms and aromatic hydrocarbos. Practical examples of the saturated hydrocarbons are methane ($CH_4$), ethane ($C_2H_6$), propane ($C_3H_8$), n-buthane (n-$C_4H_{10}$) and pentane ($C_5H_{12}$). Practical examples of ethylenic hydrocarbons are ethylene ($C_2H_4$), propylene ($C_3H_6$), butene-1 ($C_4H_8$), butene-2 ($C_4H_8$), isobutylene ($C_4H_8$), and pentene ($C_5H_{10}$). practical examples of acetylenic hydrocarbons are acetylene ($C_2H_2$). methalacetylene ($C_3H_4$) and butyne ($C_4H_6$). A practical example of aromatic hydrocarbons is benzene ($C_6H_6$).

The materials for supplying halogen atoms X in the first embodiment include halogens, halides, interhalogen compounds, and halo-substituted hydrocarbon derivatives. Practical examples of halogens are $F_2$, $Cl_2$, $Br_2$ and $I_2$. Practical examples of halides are HF, HCl, HBr and HI. Practical examples of interhalogen compounds are BrF, ClF, $ClF_3$, $BrF_5$, $BrF_3$, $IF_3$, $IF_7$, ICl and IBr. Practical examples of halo-substituted hydrocarbon derivatives are $CF_4$, $CHF_3$, $CH_2F_2$, $CH_3F$, $CCl_4$, $CHCl_3$, $CH_2Cl_2$, $CH_3Cl$, $CBr_4$, $CHBr_3$, $CH_2Br_2$, $CH_3Br$, $CI_4$, $CHI_3$, $CH_2I_2$, and $CH_3I$.

Examples of the material for supplying the electroconductivity controlling substance in the first embodiment are as follows. For supplying atoms of the group III, particularly boron atoms, boron hydrides such as $B_2H_6$, $B_4H_{10}$, $B_5H_9$, $B_5H_{11}$, $B_6H_{10}$, $B_6H_{12}$ and $B_6H_{14}$, as well as boron halides such as $BF_3$, $BCl_{13}$ and $BBr_3$, are suitably used. Materials such as $AlCl_3$, $GaCl_3$, $Ga(CH_3)_3$, $InCl_3$ and $TlCl_3$ are usable for introducing other atoms of the group III.

For supplying atoms of the group V, particularly phosphorus, phosphorous hydrides such as $PH_3$ and $P_2H_4$ and phosphorous halides such as $PH_4I$, $PF_3$, $PF_5$, $PCl_3$, $PCl_5$, $PBr_3$, $PBr_5$ and $PI_3$ are suitably used. Materials such as $AsH_3$, $AsF_3$, $AsCl_3$, $AsBr_3$, $AsF_5$, $SbH_3$, $SbF_3$, $SbF_5$, $SbCl_3$, $SbCl_5$, $BiH_3$, $BiCl_3$ and $BiBr_3$ are usable for introducing other atoms of the group V. These materials can be used solely or in combination.

In the process for forming the heat-generating resistance layer described in connection with the first embodiment, the amounts of the halogen atoms and the electroconductivity controlling substance contained by the resistance layer 14 to be formed, as well as the characteristics of the resistance layer 14, can be controlled by suitably selecting the factors such as the temperature of the support member, rates of supply of the material gasses, electric discharging power and pressure in the deposition chamber.

When it is desired to obtain a heat-generating resistance layer 14 of the first embodiment in which either one or both of the halogen atoms and the electroconductivity controlling substance have non-uniform thicknesswise distribution, it is preferred that the rate or rates of introduction of either one or both of the halogen atoms and the electroconductivity controlling substance are varied in relation to time, by value control means or other suitable means.

In forming the first embodiment the support member temperature is selected to range preferably between 20° and 1500° C., more preferably between 30° and 1200° C., and most preferably between 50° and 1100° C. The rate of supply of the material gas is suitably selected in accordance with the heat-generating characteristic of the layer and the layer forming speed.

The electric discharge power preferably ranges between 0.001 and 20 W/$cm^2$, more preferably between 0.01 and 15 W/$cm^2$, and most preferably between 0.05 and 10 W/$cm^2$.

Finally, the pressure in the deposition chamber preferably ranges between $10^{-4}$ to 10 Torr, and more preferably between $10^{-2}$ and 5 Torr.

The resistance layer of the recording head of the first embodiment of the invention, produced by the method described above, possesses characteristics similar to those of diamond. For instance, Vickers hardness of this layer is as high as 1800 to 5000. Chemical and thermal stabilities are also superior by virtue of the halogen atoms. In addition, the controllability of the resistance is enhanced thanks to the presence of the electroconductivity controlling substance.

The heat-generating resistance layer used in the recording head of the first embodiment of the invention does not necessitate any protective layer thereon because it exhibits a high durability against mechanical impacts, as well as high chemical stability. Therefore, the liquid jet recording head of the first embodiment of the invention, which incorporates this heat-generating resistance layer, permits a high efficiency of transmission of heat to the recording liquid in response to the inputted signal, thus affording a high thermal response characteristic. This in turn improves the flying characteristics of the droplets in response to the signals inputted to the recording head.

The first embodiment of the invention, however, does not exclude provisions of a protective layer on the heat-generating resistance layer, provided that the protective layer does not significantly impair the response characteristics. In fact, the provision of the protective layer is essential when the recording liquid is electrically conductive, in order to avoid any short circuit of electric current between two electrodes through the liquid.

Figure 4:
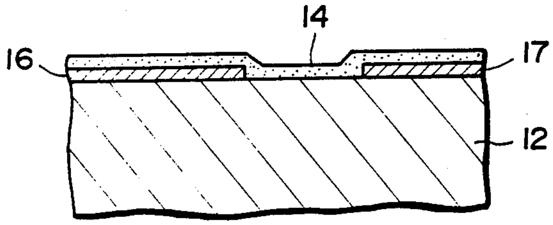
FIGS. 4 and 5 are fragmentary sectional views of different examples of an array of the electro-thermal transducers in the recording head of FIG. 1.

The electro-thermal transducer of the first embodiment described above has the heat-generating resistance layer formed on the support member and overlain by the electrodes. This, however, is not essential and the arrangement may be such that the electrodes are sandwiched between the support member and the heat-generating resistance layer. FIG. 4 shows a modification in which electrodes 16 and 17 are formed directly on the support member 12 and are overlain by the heat-generating resistance layer 14.

Figure 5:
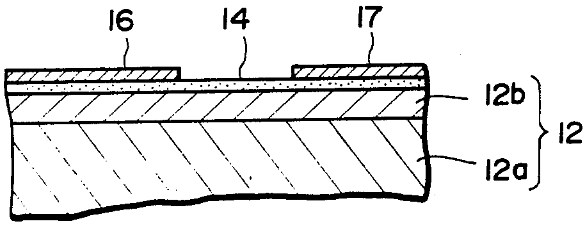

Although the support member 12 of the first embodiment has been explained as being constituted by a single member, the support member 12 used in the invention may be a composite member. FIG. 5 shows an example of such a composite support member. Namely, this support member has a base portion **12*a* and a surface layer 12*b* formed on the base portion 12*a***.

The base portion **12*a* of the first embodiment may be constituted by the same material as the support member material explained in connection with FIGS. 1 to 3, while the surface layer 12*b* may be formed of a material which exhibits a higher affinity to the resistance layer 14 which is to be formed thereon. Thus, the surface layer 12*b* may be formed of an amorphous material having a matrix of carbon atoms or a suitable known oxide. The surface layer 12*b* can be formed by deposition on the base portion 12*b*** from a suitable material, in the same manner as that in the formation of the heat-generating resistance layer explained hereinabove.

The surface layer **12*b*** of the first embodiment may be a glazing layer of an ordinary glass or, when the base portion is made of a metal, an oxide layer formed by oxidizing the surface of such a metal base portion.

The electrodes 16 and 17 of the first embodiment may be of any known material having the required conductivity, e.g., metals such as Au, Cu, Al, Ag and Ni.

Figure 6:
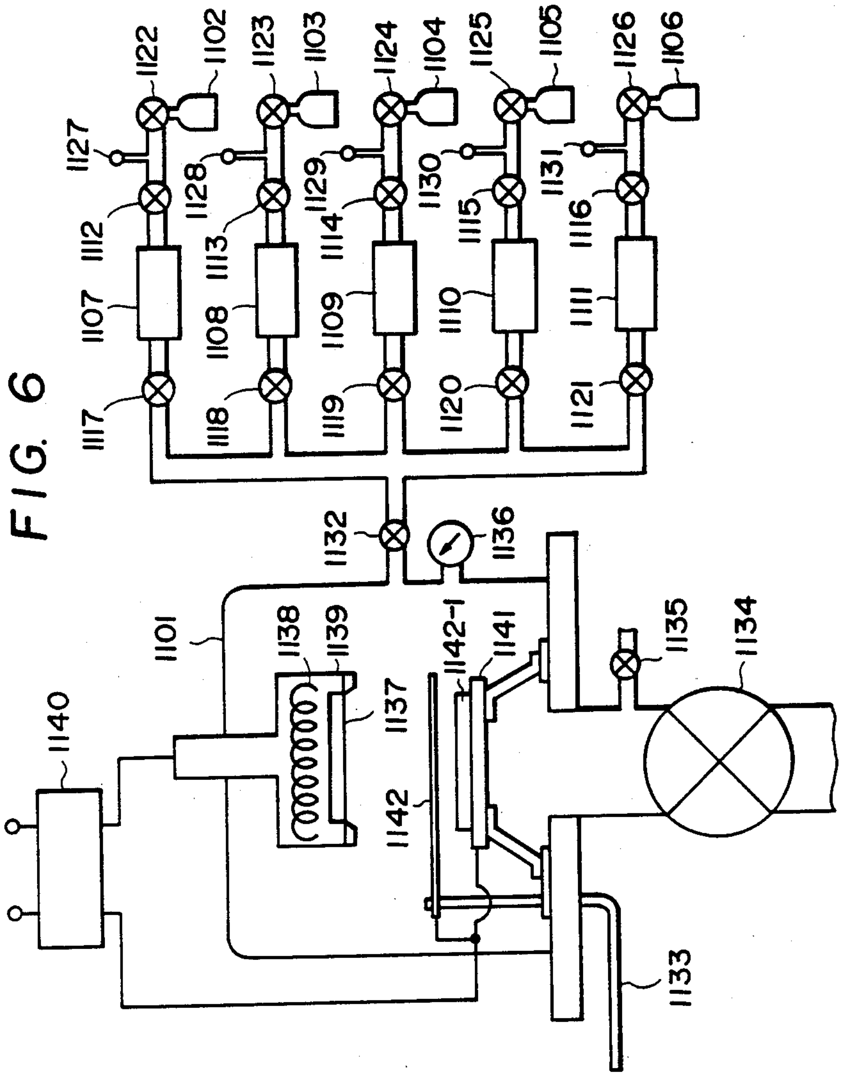
FIG. 6 is a schematic illustration of a deposition system used in forming the recording head of FIG. 1.

The recording head of the first embodiment of the present invention can be produced by the following process, using an apparatus which is exemplarily shown in FIG. 6 and adapted for forming the heat-generating resistance layer by deposition on the support member surface.

Referring to FIG. 6, the apparatus for forming the heat-generating resistance layer of the first embodiment has the following constituents: a deposition chamber 1101; gas cylinders 1102 to 1106; mass-flow controllers 1107 to 1111; inlet valves 1112 to 1116; outlet valves 1117 to 1121; gas cylinder valves 1122 to 1126; outlet pressure gauges 1127 to 1131; an auxiliary valve 1132; a lever 1133; a main valve 1134; a leak valve 1135; a vacuum gauge 1136; a support member 1137 on which the heat-generating resistance layer is to be formed; a heater 1138; a support member supporting means 1139; a high-voltage electric power supply 1140; an electrode 1141; and a shutter 1142. A numberal 1142-1 denotes a target which is adapted to be secured to the electrode 1141 when sputtering is to be conducted.

For obtaining a heat-generating resistance layer having a matrix of carbon atoms and containing halogen atoms, the process may be as follows. The gas cylinder 1102 is charged with $CF_4$ gas (99.9% or higher purity) diluted with Ar gas, while the gas cylinder 1103 is charged with $C_2F_6$ (99.9% or higher purity) gas also diluted with Ar gas. Before letting the gases in these cylinders flow into the deposition chamber 1101, the operator confirms that the valves 1122 to 1126 of all gas cylinders 1102 to 1106 are closed and that the inlet valves 1112 to 1116, outlet valves 1117 to 1121 and the auxiliary valve 1132 are all opened. Then, the operator opens the main valve 1134 to evacuate the deposition chamber 1101 and associated gas pipes, and, when the reading of the vacuum gauge 1136 has reached $1.5\times10^{-6}$ Torr, closes the auxiliary valve 1132, inlet valves 1112 to 1116 and the outlet valves 1117 to 1121. Then, the valves between the deposition chamber 1101 and the gas cylinders containing the gases to be used are opened, so that these gses are introduced into the deposition chamber 1101.

When the resistance layer of a-C:X is formed by glow discharge method with this apparatus, the process may be as follows.

As the first step, the valve 1122 is opened to allow the $CF_4$/Ar gas to be discharged from the gas cylinder 1102, while regulating the pressure indicated by the outlet pressure gauge 1127 at 1 kg/$cm^2$. Subsequently, the inlet valve 1112 is gradually opened to allow the gas to flow into the mass-flow controller 1107. Then the outlet valve 1117 and the auxiliary valve 1132 are gradually opened so as to introduce the $CF_4$/Ar gas into the deposition chamber 1101. Meanwhile, the operator adjusts the mass-flow controller 1107 so as to maintain a desired flow rate of the $CF_4$/Ar gas and also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform distribution of X in the resistance layer made of a-C:X, the opening of the outlet valve 1117 is varied manually or by an external driving motor so as to change the flow rate of the $CF_4$/Ar gas along a predetermined curve of changing rate, thereby establishing a thicknesswise variation of the content of F atoms in the product layer 14.

When the resistance layer of a-C:X is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CF_4/Ar$ gas is introduced from the cylinder 1102 into the deposition chamber 1101 at a desired flow rate, as in the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber, as in the case of the layer formation by glow discharge.

For attaining a non-uniform distribution of X in the resistance layer made of a-C:X, the opening of the outlet valve 1117 is varied so as to change the flow rate of the $CF_4/Ar$ gas along a predetermined curve of changing rate, thereby establishing a thicknesswise variation of the content of F atoms in the product layer 14, as in the case of the layer formation by glow discharge.

For obtaining a heat-generating resistance layer of a-C:X(p,n) system having a matrix of carbon atoms and containing halogen atoms and also an electroconductivity controlling substance, the gas cylinder 1102 is charged with $CF_4$ gas (99.9% or higher purity) diluted with Ar gas, while the gas cylinder 1103 is charged with $BF_3$ (99.9% or higher purity) gas also diluted with Ar gas. Similarly, the cylinder 1104 is charged with $PF_5$ gas (99.9% or higher purity) diluted with Ar gas. Before letting the gases in these cylinders flow into the deposition chamber 1101, the operator confirms that the valves 1122 to 1126 of all gas cylinders 1102 to 1106 are closed and that the inlet valves 1112 to 1116, outlet valves 1117 to 1121 and the auxiliary valve 1132 are all opened. Then, the operator opens the main valve 1134 to evacuate the deposition chamber 1101 and associated gas pipes, and, when the reading of the vacuum gauge 1136 has reached $1.5 \times 10^{-6}$ Torr, closes the auxiliary valve 1132, inlet valves 1112 to 1116 and the outlet valves 1117 to 1121. Then, the valves between the deposition chamber 1101 and the gas cylinders containing the gases to be used are opened, so that these gases are introduced into the deposition chamber 1101.

When the resistance layer of a-C:X(p,n) is formed by glow discharge method with this apparatus, the process may be as follows.

As the first step, the valve 1122 is opened to allow the $CF_4/Ar$ gas to be discharged from the gas cylinder 1102, and the valve 1123 is opened to allow the $BF_3/Ar$ gas to be discharged from the gas cylinder 1103, while regulating the pressures indicated by the outlet pressure gauges 1127 and 1128 at 1 $kg/cm^2$. Subsequently, the inlet valves 1112 and 1113 are gradually opened to allow the gases to flow into the mass-flow controllers 1107 and 1108. Then the outlet valves 1117, 1118 and the auxiliary valve 1132 are gradually opened so as to introduce the $CF_4/Ar$ gas and the $BF_3/Ar$ gas into the deposition chamber 1101. Meanwhile, the operator adjusts the mass-flow controllers 1107, 1108 so as to maintain a desired ratio of flow rate between the $CF_4/Ar$ gas and the $BF_3/Ar$ gas and adjusts also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform distribution of atoms X and/or of the electroconductivity controlling substance in the resistance layer made of a-C:X(p,n), the opening of the outlet valve 1117 and/or of the outlet valve 1118 is varied manually or by an external driving motor so as to change the flow rate of the $CF_4/Ar$ gas and/or of the $BF_3/Ar$ gas along predetermined curves of changing rate, thereby establishing a thicknesswise variation of the content of F atoms and/or of the electroconductivity controlling substance in the product layer 14.

When the resistance layer of a-C:X(p,n) is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CF_4/Ar$ gas and the $BF_3/Ar$ gas are introduced from the cylinders 1102 and 1103 into the deposition chamber 1101 at desired flow rates, as in the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber, as in the case of the layer formation by glow discharge.

For attaining a non-uniform distribution of atoms X and/or of the electroconductivity controlling substance in the resistance layer made of a-C:X(p,n), the opening of the outlet valve 1117 and/or of the outlet valve 1118 is varied so as to change the flow rate of the $CF_4/Ar$ gas and/or of the $BF_3/Ar$ gas along predetermined curves of changing rate, thereby establishing a thicknesswise variation of the content of F atoms and/or of the electroconductivity controlling substance in the product layer 14, as in the case of the layer formation by glow discharge.

Figure 3:
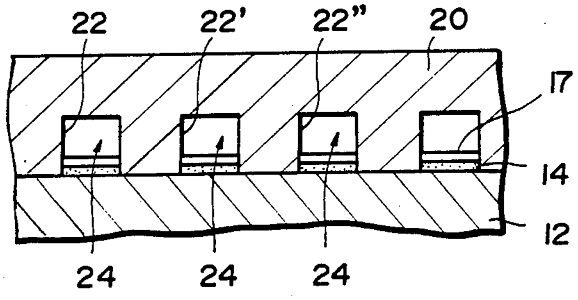
FIG. 3 is a sectional view taken along the line III—III of FIG. 2.

The electro-thermal transducer of the type shown in FIGS. 1 to 3, intended for use in the liquid jet recording head of the first embodiment of the invention, is produced by forming the heat-generating resistance layer on the support member in the manner described above, forming conductive layers, e.g., an Au layer and an Al layer, for forming the electrodes on the heat-generating resistance layer, and effecting patterning of the conductive layers and the heat-generating resistance layer by known photolithographic techniques. If necessary, a protective layer is formed to cover the heat-generating resistance layer and the electrodes.

On the other hand, the electro-thermal transducer of the type shown in FIG. 4, intended for use in the liquid jet recording head of the first embodiment of the invention, is produced by forming a conductive layer beforehand on the support member, effecting patterning of the conductive layer by means of photolithographic techniques, and forming the heat-generating resistance layer by a glow discharge or sputtering as explained before.

The top plate of the recording head of the first embodiment is made of a material similar to that of the suport member. The channels are formed by a suitable method such as mechanical cutting by a microcutter, chemical etching and so forth. When a photosensitive glass is used as the material, the channels can be formed by exposure in the desired pattern followed by development.

The joining of the top plate to the support member in the first embodiment is carried out by bonding through an adhesive, after obtaining sufficient positional alignment. Some kinds of material of the top plate permit the joining of the top plate to the support member by fusion welding.

Figure 7:
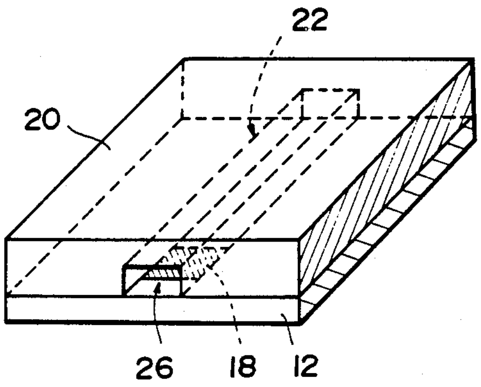
FIGS. 7 and 8 are fragmentary perspective sectional views of the recording head in accordance with the present invention.
Figure 8:
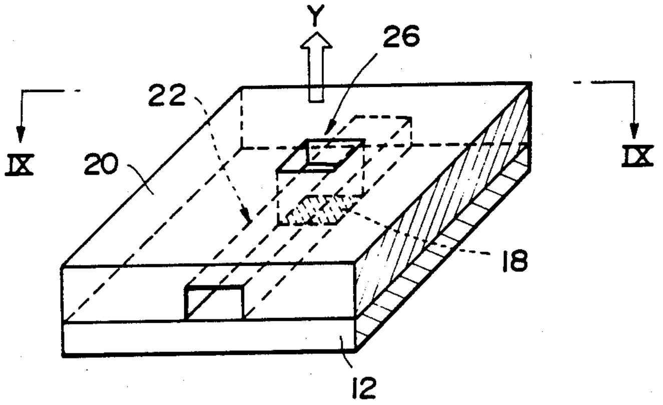

In the first embodiment of the liquid jet recording head described above, the outlet 26 for the recording liquid is formed in one end of each channel 22 which defines the liquid passage in the top plate 20, as typically shown in FIG. 7. This position of the recording liquid outlet, however, is not exclusive and the recording liquid outlet 26 may be formed to open in the surface of the top plate 20, as shown in FIG. 8. In this case, the end openings of each channel defining the liquid passage may be utilized as a recording liquid inlet through which the recording liquid is introduced into the liquid passage, and the recording liquid is jetted through the outlet 26 as indicated by an arrow Y. In this case, needless to say, each channel may be closed at its one end thereof so that the liquid is introduced through the other open end of the channel.

A modification of the liquid jet recording head of the first embodiment will be explained hereinunder.

Figure 9:
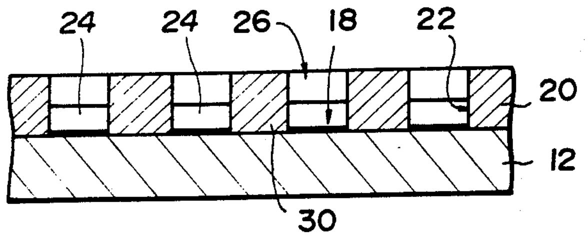
FIG. 9 is a fragmentary sectional taken along lines IX—IX of FIG. 8.

Referring to FIG. 9 which is a sectional view taken along the line IX—IX of FIG. 8, the top plate 20 is held in contact at its portions other than the channels with the support member of the electro-thermal transducer. Therefore, the heating sections 24 formed along the respective channels 22 are isolated from one another by the barriers 30 which are constituted by the portions of the top plate 20 contacting the support member. In the arrangement shown in FIG. 9, the heat-generating regions 18 are provided in the respective channels near the outlets 26.

Figure 10:
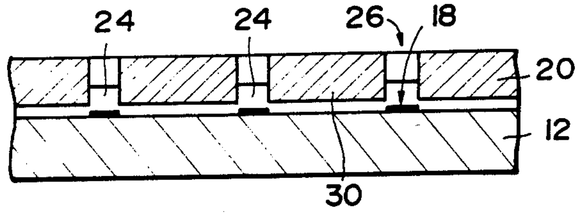
FIGS. 10 to 12 are fragmentary sectional views similar to FIG. 9 but showing different examples of the recording head in accordance with the invention.
Figure 12:
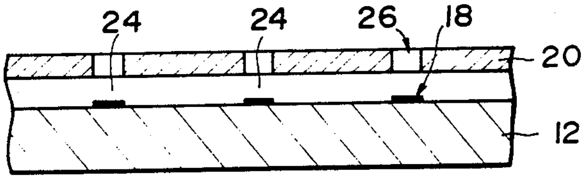

FIGS. 10 and 12 are sectional views which can represent different examples of the recording head of the first embodiment, taken along the line IX—IX of FIG. 8.

in the recording head shown in FIG. 10, the barriers 30 do not contact the support member 12 so that the heating sections 24 corresponding to the heat generating regions 18 are in communication with one another. That is, the liquid passages are not independent as shown in FIG. 9, but instead the adjacent liquid passages are in communication with each other.

Figure 11:
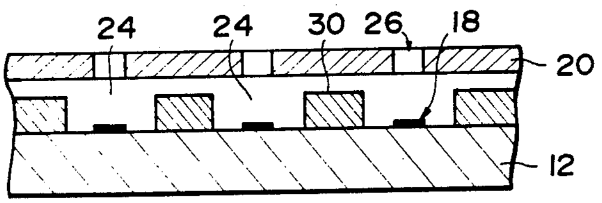

In the recording head shown in FIG. 11, the barriers 30 are not formed in the top plate 20 but are formed in the support member. Therefore, the heating sections 24 are in communication with each other, as in the case of the recording head shown in FIG. 10. Thus, adjacent liquid passages are in communication with each other also in this case.

The recording head shown in FIG. 12 does not have any barrier, unlike the recording heads shown in FIGS. 10 and 11. In this case, therefore, the liquid passage is constituted by an ink chamber which is common to all the heating sections 24.

Various examples shown in FIGS. 9 to 12, which can represent modifications of the first embodiment of the recording head shown in FIG. 8, are obtainable also with the liquid jet recording head of the type shown in FIG. 7.

The provision of the barriers 30 is not essential to the first embodiment. Namely, the barriers can be dispensed with provided that the reach and aim of the flying droplets do not exceed predetermined tolerances, although it is true that the direction, velocity and rate of the liquid jet may be affected by the liquid stagnant in adjacent liquid outlets. The provision of the barriers, however, is preferred in order to reduce mutual interference between adjacent liquid outlets and to improve the efficiency of conversion of the energy. It will be clear to those skilled in the art that the barriers may be formed integrally with the top plate or may be formed as independent members and then suitably secured to the top plate. The flat top plate may be formed of the same material as the top plate with channels explained before. Hardened layers of photosensitive resin can be used as the material of the barriers and the top plate.

As will be seen from the foregoing description, the present invention provides a liquid jet recording head incorporating an electro-thermal transducer having a heat-generating resistance layer made of an amorphous material containing halogen atoms in the matrix of carbon atoms, as well as a liquid jet rocroding system which incorporates this recording head. The heat-generating resistance layer of the above-mentioned amorphous material exhibits a high chemical stability, high resistance both to the electrochemical reaction and oxidation, and superior resistance to mechanical impact and heat. Thus, the liquid jet recording head and system in accordance with the invention has various superior characteristics, particularly high chemical and thermal stabilities.

In addition, the control of the electric resistance value is facilitated in the first embodiment in which the heat-generating resistance layer contains also an electroconductivity controlling substance besides the halogen atoms.

It is thus possible with the first embodiment to realize a high frequency response characteristic and distinguished reliability of the liquid jet recording.

It is also possible with the first embodiment to easily attain various desired characteristics such as heat accumulating characteristic, heat radiation characteristic, affinity between the support member and the resistance layer and resistance against chemical reaction with the recording liquid, by developing a non-uniform distribution of content of the halogen atoms and/or the content of the electroconductivity controlling substance.

Practical examples of the liquid jet recording head in accordance with the first embodiment invention will be described hereinunder.

Examples of the First Embodiment:

Examples of the liquid jet recording head of the first embodiment invention, as well as a comparison example, were produced by making use of electro-thermal transducers which were prepared in accordance with the following methods.

A glass #7059 produced by Corning Glass Works was used as the material of the support member. A surface layer of heat-oxidized $SiO_2$ having a thickness of 5 μm was formed as a heat accumulating layer. In each case, a heat-generating resistance layer and electrodes were formed on the support member, and a protective layer was formed as needed. The layered structures composed of the heat-generating resistance layer, electrodes and protective layer were prepared in the following three types A, B and C.

Type A

The heat-generating resistance layer was formed on the support member by means of the deposition system explained before in connection with FIG. 6. The conditions of the deposition were as shown in Tables 1, 2, 4, 5, 7 and 9. More specifically, examples shown in Tables 1, 4, 7 and 9 were prepared by glow discharge, while the examples shown in Tables 2 and 5 and comparison example were prepared by sputtering. In the sputtering for the preparation of examples shown in Tables 2 and 5, graphite (99.9% purity) was used as the target material, whereas the sputtering for the preparation of the comparison example employed $HfB_2$ as the target material.

The comparison example prepared under the same conditions was used for the comparison in each of a first case (a-C:X), a second case (a-C:X) with non-uniform X distribution, a third case (a-C:X(p,n)) and a fourth case (a-C:X(p,n)) with non-uniform (p,n) distribution.

During the deposition, the gas flow rates and other conditions were maintained as shown in Tables 1, 2, 4, 5, 7 and 9, so that heat-generating resistance layers were formed to have thicknesses as shown in Tables 3, 6, 8 and 10.

Then, an Al layer was formed on the heat-generating resistance layer by an electron beam method, and a resist pattern was formed by a photolithographic technique. Using this resist pattern, etching was conducted on the Al layer so as to form a plurality of pairs of electrodes. Then, another resist pattern was formed by a photolithographic technique, and unnecessary portions of the heat-generating resistance layer were removed by etching with an etching liquid of a HF (hydrofluoric acid) system. Consequently, a plurality of heat-generating resistance elements, each having a heat-generating region constituted by a portion of the heat-generating resistance layer of 40 $\mu m \times 200$ $\mu m$ and electrodes deposited thereon, were formed. The pitch of the heat-generating regions was 8 regions per millimeter.

Subsequently, a layer of photosensitive polyimide (commercial name Photoneece supplied by Tokyo Oka Kogyo) was formed by spin coating method. After a pre-baking conducted at 80° C. for 1 hour, the heat-generating element was subjected to an exposure which was conducted by the use of an aligner, and then to a development, so as to form an aperture or window in each heat generating region. Finally, the heat-generating element was post-baked for 30 minutes at 140° C. and for 1 hour at 400° C., whereby an array of the electro-thermal transducers was completed.

The resistance values of the heat generating regions in various electro-thermal transducers produced by the method described above are shown in Tables 3, 6, 8 and 10. The photosensitive polyimide was used for the purpose of preventing any electrolysis of the Al electrode in the ink.

Figure 13:
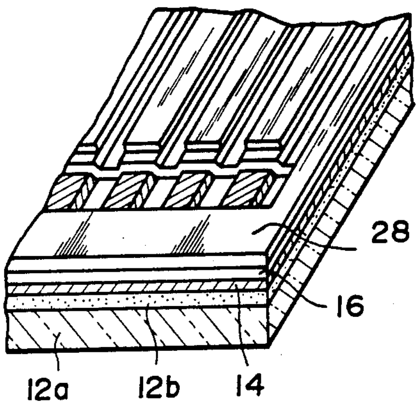
FIGS. 13, 15 and 17 are perspective views of different examples of the array of the electro-thermal transducers in a recording head in accordance with the invention.
Figure 14:
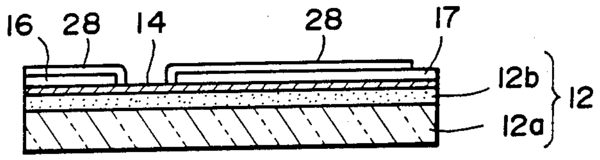
FIGS. 14, 16 and 18 are sectional views of the examples of the respective arrays shown in FIGS. 13, 15 and 17.

The thus completed array of electro-thermal transducers is shown in schematic perspective view in FIG. 13 and in schematic corss-sectional view in FIG. 14. In these Figures, a reference numeral 28 designates a polyimide layer.

Type B

A heat-generating resistance layer could be formed on each support member in the same manner as Type A, under the depositing conditions as shown in Tables 1, 2, 4, 5, 7 and 9. During the deposition, the gas flow rates and other factors were controlled as shown in Tables 1, 2, 4, 5, 7 and 9, so that heat-generating resistance layers were formed to have various thicknesses as shown in Tables 6, 8 and 10.

Figure 15:
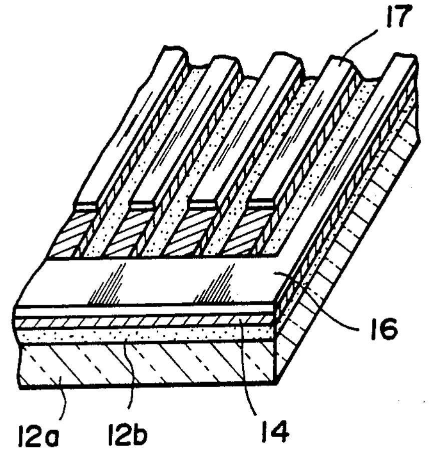
Figure 16:
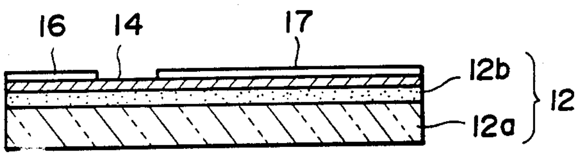

Then, an Au layer was formed on the heat-generating resistance layer by an electon beam method, and a resist pattern was formed by a photolithographic technique. Using this resist pattern, etching was conducted on the Au layer so as to form a plurality of pairs of electrodes. Then, another resist pattern was formed by a photolithographic technique, and unnecessary portions of the heat-generating resistance layer were removed by etching with an etching liquid of a HF system. Consequently, a plurality of heat-generating resistance elements, each having a heat-generating region constituted by a portion of the heat-generating resistance layer of 40 $\mu m \times 200$ $\mu m$ and electrodes deposited thereon, were formed. The pitch of the heat-generating regions was 8 regions per millimeter. The resistance values of the heat generating regions in various electro-thermal transducers produced by the method described above are shown in Tables 3, 6, 8 and 10, as in the case of Type A. The construction of thus completed array of electro-thermal transducers is shown in schematic perspective view in FIG. 15 and in schematic cross-sectional view in FIG. 16.

Type C

Figure 17:
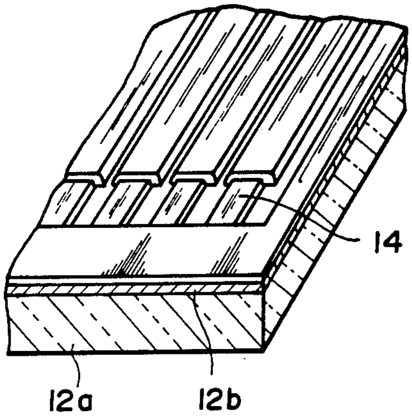
Figure 18:
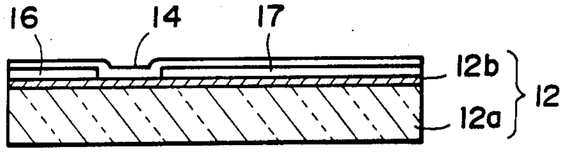

An Al layer was formed on the support member by an electron beam method on which was formed a resist pattern by a photolithographic technique. Using this resist pattern, a plurality of pairs of electrodes were formed on the Al layer. Then, a heat-generating resistance layer was formed on the Al layer. This could be done by the same method as that in Type A. The deposition conditions were maintained as shown in Tables 1, 2, 4, 5, 7 and 9, so that the heat-generating resistance layer was formed in various thicknesses as shown in Tables 3, 6, 8 and 10. Then, another resist pattern was formed by a photolithographic technique and the unnecessary portion of the heat-generating resistance layer was removed by an etching liquid of a HF system. Consequently, heat-generating resistance elements, each having a heat-generating region constituted by a portion of the heat-generating resistance layer of 40 $\mu m \times 200$ $\mu m$ and electrodes deposited thereon, were formed. The pitch of the heat-generating regions was 8 regions per millimeter. In this case, the Al electrodes are effectively protected by the heat-generating resistance layer, so that it is not necessary to form a protective layer for the electrodes. The resistance values of the heat-generating regions of the electro-thermal transducers formed by the method described above are shown in Tables 3, 6, 8 and 10, as is the case of Type A. The construction of the thus formed array of electro-thermal transducers is shown in schematic perspective view in FIG. 17 and in schematic cross-sectional view in FIG. 18.

Liquid jet recording heads according to the first embodiment were produced by making use of the electro-thermal transducers which were prepared according to the various methods described above. Broadly, two types of recording heads were produced: namely, type I constructed as shown in FIG. 7 and type II constructed as shown in FIG. 8. The recording head of type I was produced in two different processes. The recording head produced by a first process will be referred to as Type I-1, while the recording head produced by a second method will be referred to as Type I-2.

The production processes were as follows.

Type I-1

Figure 19:
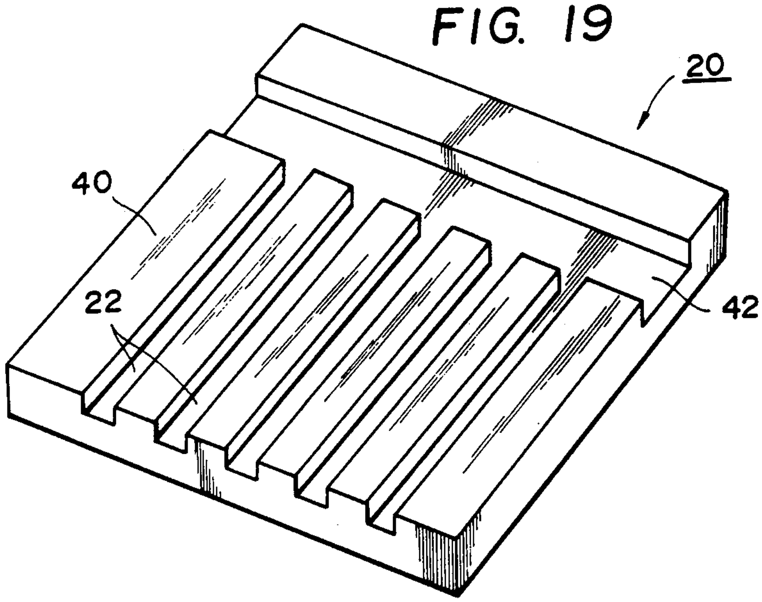
FIG. 19 is a perspective view of a top panel of a recording head in accordance with the invention.
Figure 20:
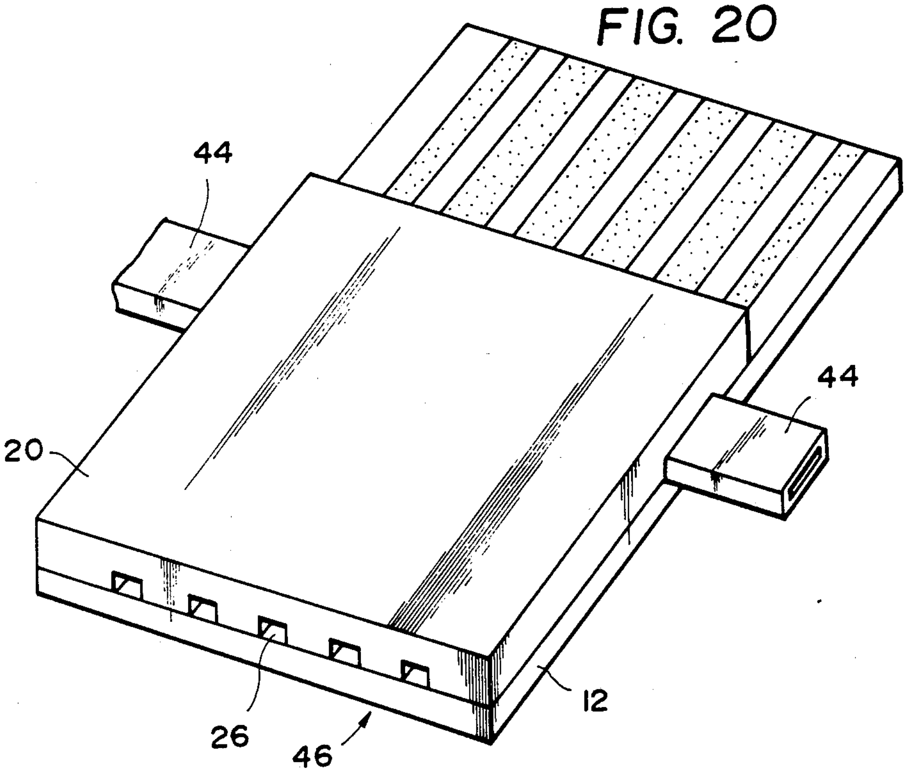
FIGS. 20, 21 and 22 are perspective views of different examples of a recording head in accordance with the invention.

Referring to FIG. 19, a top plate 20 with channels was formed from a glass sheet 40. A plurality of channels 22 which constitute liquid passages, each being 40

μm wide and 40 μm deep, and a groove 42 which constitutes a common ink chamber communicating with the liquid passages were formed by a microcutter in the glass sheet 40 thus completing the top plate 20 with channels.

The top plate 20 was then adjoined to each of the array of electro-thermal transducers formed by the methods described before, in such a manner that the heat-generating regions in the electro-thermal transducers are aligned with the channels 22, thus forming the liquid passages and the common ink chamber. Then, ink inlet tubes 44 for introducing an ink into the common ink chamber were connected to the assembly, thus completing an integral recroding head 46.

Type I-2

Figure 21:
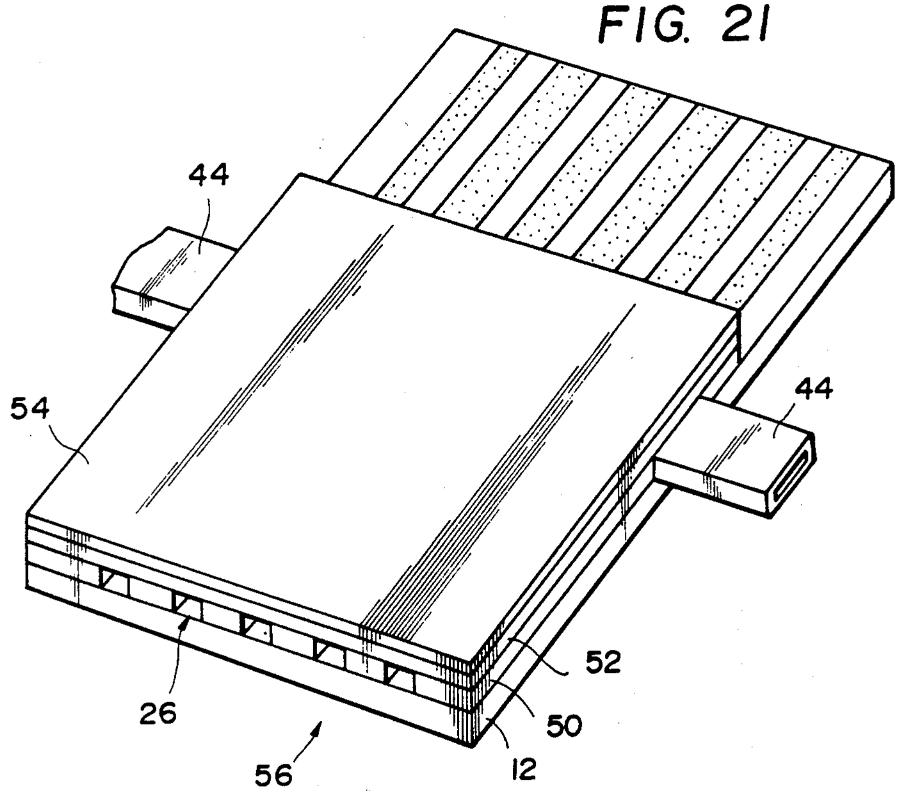

Each array of electro-thermal transducers was coated with a photosensitive layer 50 which was a layer produced by Tokyo Oka Kogyo under the commercial name of Ordyl. The coated element was then exposed by a aligner and subjected to development so that the layer 50 was formed into a predetermined pattern. Then, a glass sheet 54, which was also coated with a photosensitive layer 52 of the same material as layer 50, was adhered to the patternized layer on the electro-thermal transducer. The thus formed member was then cut mechanically such as by dies cutting so as to expose the liquid outlets 26. Then, ink introduction tubes 44 for introducing an ink from a source (not shown) were connected to the cut assembly, whereby an integral recording head 56 was formed as shown in schematic perspective view in FIG. 21.

Type II

Figure 22:
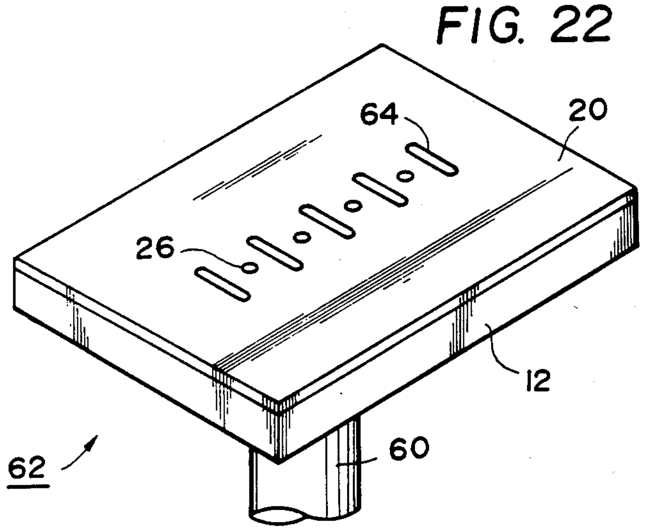

As a first step of the production process, a top plate 20 was formed to have liquid outlets 26 in its major surface. More specifically, the top plate 20 was formed from a stainless steel sheet having channels formed therein by, for example, etching. A pattern of a photosensitive layer, produced by Hitachi Chemical Co., Ltd. under the commercial name of PHT-145FT-50, was formed on the stainless steel sheet, and an Ni-plating layer was formed by an electroforming method. It will be seen that the liquid outlets 26 were formed at positions where the photosensitive layer pattern exists. The thus formed top plate 20 was adhered by an adhesive to the array of electro-thermal transducers in such a manner that the heat-generating regions are aligned with the liquid outlets 26. The electro-thermal transducer was beforehand perforated by mechanical working to permit the supply of the ink into the common ink chamber in the top plate 20. Then, an ink introduction tube 60 for introducing an ink from a source (not shown) was connected to the underside of the electro-thermal transducer, whereby an integral recording head 62 was formed as shown in schematic perspective view in FIG. 22. In FIG. 22, a numeral 64 denotes recesses which provide barriers between adjacent liquid outlets. Thus, the recording head of the Type II can have either the construction shown in FIG. 9 or the construction shown in FIG. 10, according to the design of the barriers, or even the construction shown in FIG. 12 which is devoid of barriers.

Thus, three types A, B and C of construction of the array of electro-thermal transducers and three types I-1, I-2 and II of construction of the recording head are available, and various combinations are possible among these types.

Amongst these various combinations, a combination between the electro-thermal transducer of type A and the recording head construction of type I-1 was subjected to a durability test which will be explained hereinunder.

A lead board was attached to a recording head constituted by the construction of type A and the construction of type I, so as to complete a recording head unit. The lead board had electrode leads (not shown) connected to independent electrodes 17 corresponding to the respective heat-generating regions and an electrode lead (not shown) to the electrode 16 common to all heat-generating regions.

Figure 23:
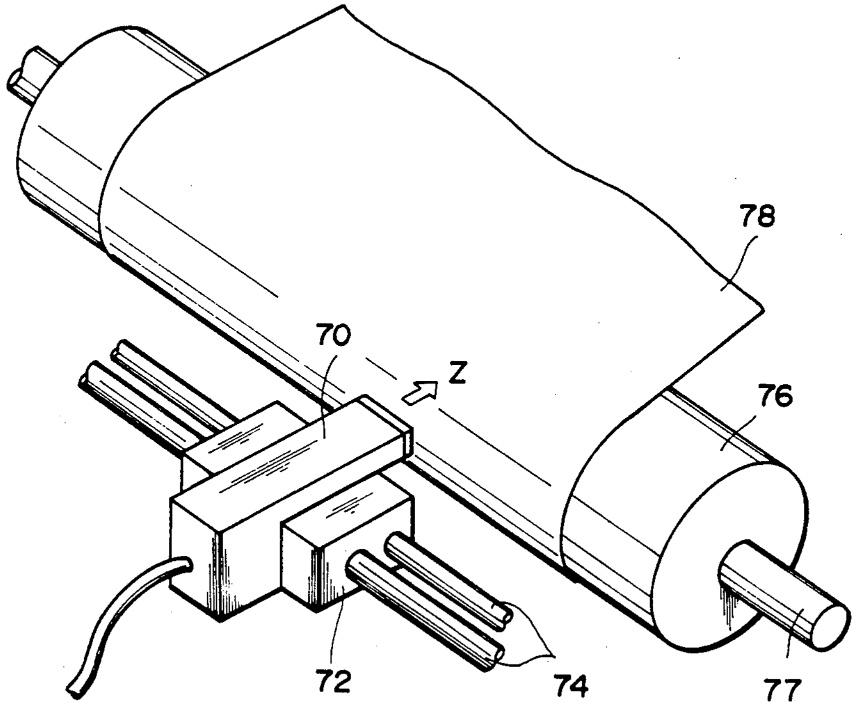
FIG. 23 is a perspective view of an ink jet recording system in accordance with the invention.
Figure 24:
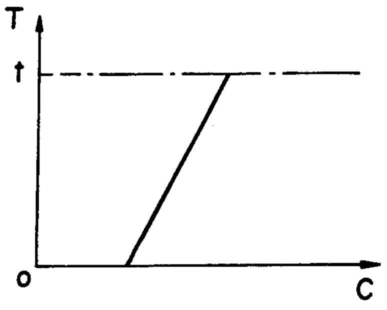
FIGS. 24 to 29 are graphs showing the distribution of content of at least one of silicon atoms, germanium atoms, halogen atoms and hydrogen atoms and an electroconductivity controlling substance in a heat generating resistance layer.
Figure 25:
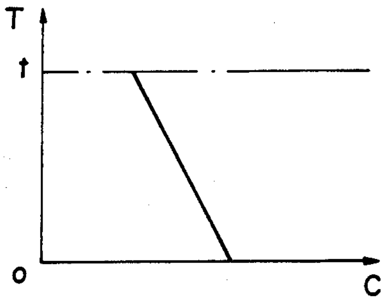
Figure 26:
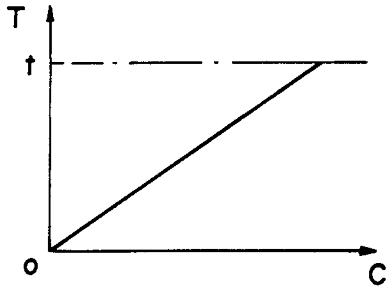
Figure 27:
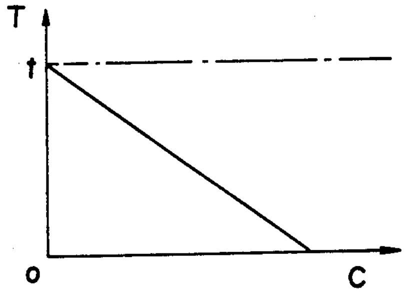
Figure 28:
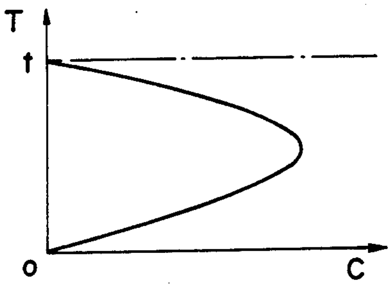
Figure 29:
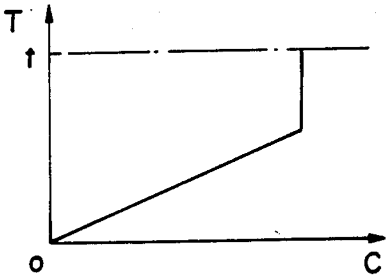

A liquid jet recording system as shown in schematic perspective view in FIG. 23 was assembled by using this recording head unit. As will be seen from this Figure, the liquid jet recording system employs the following parts: the recording head unit 70; a carriage 72 carrying the recording head unit 70; guide members 74 for guiding the reciprocatory motion of the carriage 72; and a platen 76. A numeral 78 denotes a recording medium such as a print paper held on the platen 76.

The recording head unit 70 is so oriented that the recording liquid outlets are directed in the direction of an arrow Z so that the droplets of the recording liquid may fly in the direction of the arrow Z so as to be deposited in the form of dots on the recording medium 78 on the platen 76. Main scanning is conducted by driving the recording head unit 70 along the guide members 74 by a suitable driving means, while auxiliary scanning is conducted by causing the platen 76 to rotate about its axis of the shaft 77 by another suitable driving means, whereby the inputted information is recorded by the liquid dots on the recording medium 78.

A test was conducted using this liquid jet recording system under the following conditions.

Rectangular-wave pulses were applied to the heat-generating regions. The pulse width was 10 μ sec and the period was 200 μ sec. The level of the voltage of the pulse was selected to be 1.2 times as high as the minimum boiling temperature at which the generation of void in the recording liquid is commenced. Thus, the voltage of the pulse was selected to be 24 V when the minimum voltage to produce boiling temperature was 20 V. The composition of the recording liquid used was as follows:

| | |
|---|---|
| Water | 68 weight parts |
| DEG (diethylene glycol) | 30 weight parts |
| Black dye | 2 weight parts |

The test operation of the recording system was carried out by using the recording liquid specified above and under the conditions explained above, and the durability was examined for various examples, the result of which is shown in Tables 3, 6, 8 and 10. The evaluation of the durability was made by counting the number of electric pulses sustained by the recording head. The marks "o" and "x" appearing in these Tables represent, respectively, that the recording head could withstand $10^9$ or more repetitional cycles of pulses and that the recording head could withstand only $10^6$ cycles or less.

From these Tables, it will be seen that the liquid jet recording head acording to the first embodiment of the present invention exhibits superior durability and recording characteristic over the comparison example. Although the result of the test conducted with the combination between type A and type I-1 was specifically described, it is to be understood that similar superiority of the liquid jet recording head of the first embodiment of the invention was confirmed also with other combinations of types.

Various examples of the liquid jet printing head of the first embodiment of the invention were prepared together with some comparison examples, and conditions of deposition for forming the heat-generating resistance layers, thicknesses of the layers, resistance values and results of evaluation are summarized in Tables 1 to 10. Examples P-1, P-2, P-3, P-4, S-1 and S-2 appearing in Tables 1 to 3 are those which have resistance layers of a-C:X type composition. Examples P-5, P-6, P-7, P-8, P-9, P-10, P-11, P-12, S-3 and S-4 appearing in Tables 4 to 6 are those which have resistance layers of a-C:X type composition with non-uniform distribution of atoms X. Examples P-13, P-14, P-15 and P-16 appearing in Tables 7 and 8 are those which have resistance layers of the a-C:X(p,n) type composition. Finally, examples P-17, P-18, P-19, P-20, P-21, P-22, P-23 and P-24 are those which have resistance layers of the a-C:X(p,n) type construction with non-uniform distribution of X and/or the electroconductivity controlling substance. As stated before, the same comparison example is shown in all Tables.

In the following tables, the "Substrate" is the support member.

TABLE 1

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| P-1 | $CF_4/Ar$ | 0.5 | 50 | 1 | 350 | glass |
| P-2 | $CF_4/Ar$ | 0.2 | 50 | 2 | 350 | glass |
| P-3 | $CF_4/Ar$ | 0.5 | 50 | 1 | 350 | Si |
| P-4 | $CF_4/Ar$ | 0.2 | 50 | 2 | 350 | Si |

TABLE 2

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| S-1 | $CF_4/Ar$ | 0.5 | 20 | 5.5 | 350 | glass |
| S-2 | $CF_4/Ar$ | 0.5 | 20 | 5.5 | 350 | Si |
| Reference example | Ar | 1 | 20 | 1.6 | 200 | Si |

TABLE 3

| Example No. | Thickness (Å) | Resistance (Ω) | Durability |
|---|---|---|---|
| P-1 | 1000 | 205 | o |
| P-2 | 1000 | 205 | o |
| P-3 | 1000 | 205 | o |
| P-4 | 1000 | 205 | o |
| S-1 | 1000 | 205 | o |
| S-2 | 1000 | 205 | o |
| Reference example | 1500 | 120 | x |

TABLE 4

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| P-5 | $CF_4/Ar$ | 0.5 | 50 20 | 1 | 350 | glass |
| P-6 | $CF_4/Ar$ | 0.2 | 50 20 | 2 | 350 | glass |
| P-7 | $CF_4/Ar$ | 0.5 | 20 50 | 1 | 350 | glass |
| P-8 | $CF_4/Ar$ | 0.2 | 20 50 | 2 | 350 | glass |
| P-9 | $CF_4/Ar$ | 0.5 | 50 20 | 1 | 350 | Si |
| P-10 | $CF_4/Ar$ | 0.2 | 50 20 | 2 | 350 | Si |
| P-11 | $CF_4/Ar$ | 0.5 | 20 50 | 1 | 350 | Si |
| P-12 | $CF_4/Ar$ | 0.2 | 20 50 | 2 | 350 | Si |

TABLE 5

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| S-3 | $CF_4/Ar$ | 0.5 | 20 → 10 | 5.5 | 350 | glass |
| S-4 | $CF_4/Ar$ | 0.5 | 20 → 10 | 5.5 | 350 | Si |
| Reference example | AR | 1 | 20 | 1.6 | 200 | Si |

TABLE 6

| Example No. | Thickness (Å) | Resistance (Ω) | Durability |
|---|---|---|---|
| P-5 | 1000 | 230 | o |
| P-6 | 1000 | 230 | o |
| P-7 | 1000 | 230 | o |
| P-8 | 1000 | 230 | o |
| P-9 | 1000 | 230 | o |
| P-10 | 1000 | 230 | o |
| P-11 | 1000 | 230 | o |
| P-12 | 1000 | 230 | o |
| S-3 | 1000 | 230 | o |
| S-4 | 1000 | 230 | o |
| Reference example | 1500 | 120 | x |

TABLE 7

| Example No. | Reaction gas Kind A/B | Ratio A/B | Flow rate (SCCM) | Electric power ($W/cm^2$) | Substrate temp. (°C.) | Substrate material |
|---|---|---|---|---|---|---|
| P-13 | $CF_4$/Ar | 0.5 | 50 | 1.5 | 350 | glass |
| | $BF_3$/Ar | $1 \times 10^{-5}$ | 125 | | | |
| P-14 | $CF_4$/Ar | 0.5 | 50 | 1.5 | 350 | glass |
| | $PF_5$/Ar | $1 \times 10^{-5}$ | 125 | | | |
| P-15 | $CF_4$/Ar | 0.5 | 50 | 1.5 | 350 | Si |
| | $BF_3$/Ar | $1 \times 10^{-5}$ | 125 | | | |
| P-16 | $CF_4$/Ar | 0.5 | 50 | 1.5 | 350 | Si |
| | $PF_5$/Ar | $1 \times 10^{-5}$ | 125 | | | |

TABLE 8

| Example No. | Thickness (Å) | Resistance (Ω) | Durability |
|---|---|---|---|
| P-13 | 1000 | 180 | o |
| P-14 | 1000 | 180 | o |
| P-15 | 1000 | 180 | o |
| P-16 | 1000 | 180 | o |
| Reference example | 1500 | 120 | x |

TABLE 9

| Example No. | Reaction gas Kind A/B | Ratio A/B | Flow rate (SCCM) | Electric power ($W/cm^2$) | Substrate temp. (°C.) | Substrate material |
|---|---|---|---|---|---|---|
| P-17 | $CF_4$/Ar | 0.5 | 50 → 70 | 1.5 | 350 | glass |
| | $BF_3$/Ar | $1 \times 10^{-5}$ | 125 | | | |
| P-18 | $CF_4$/Ar | 0.5 | 50 → 70 | 1.5 | 350 | glass |
| | $PF_5$/Ar | $1 \times 10^{-5}$ | 125 | | | |
| P-19 | $CF_4$/Ar | 0.5 | 50 → 30 | 1.5 | 350 | glass |
| | $BF_3$/Ar | $1 \times 10^{-5}$ | 125 | | | |
| P-20 | $CF_4$/Ar | 0.5 | 50 → 30 | 1.5 | 350 | glass |
| | $PF_5$/Ar | $1 \times 10^{-5}$ | 125 | | | |
| P-21 | $CF_4$/Ar | 0.5 | 50 → 70 | 1.5 | 350 | Si |
| | $BF_3$/Ar | $1 \times 10^{-5}$ | 125 | | | |
| P-22 | $CF_4$/Ar | 0.5 | 50 → 70 | 1.5 | 350 | Si |
| | $PF_5$/Ar | $1 \times 10^{-5}$ | 125 | | | |
| P-23 | $CF_4$/Ar | 0.5 | 50 → 30 | 1.5 | 350 | Si |
| | $BF_3$/Ar | $1 \times 10^{-5}$ | 125 | | | |
| P-24 | $CF_4$/Ar | 0.5 | 50 → 30 | 1.5 | 350 | Si |
| | $PF_5$/Ar | $1 \times 10^{-5}$ | 125 | | | |

TABLE 10

| Example No. | Thickness (Å) | Resistance (Ω) | Durability |
|---|---|---|---|
| P-17 | 1000 | 205 | o |
| P-18 | 1000 | 205 | o |
| P-19 | 1000 | 205 | o |
| P-20 | 1000 | 205 | o |
| P-21 | 1000 | 205 | o |
| P-22 | 1000 | 205 | o |
| P-23 | 1000 | 205 | o |
| P-24 | 1000 | 205 | o |
| Reference example | 1500 | 120 | X |

Figure 30:
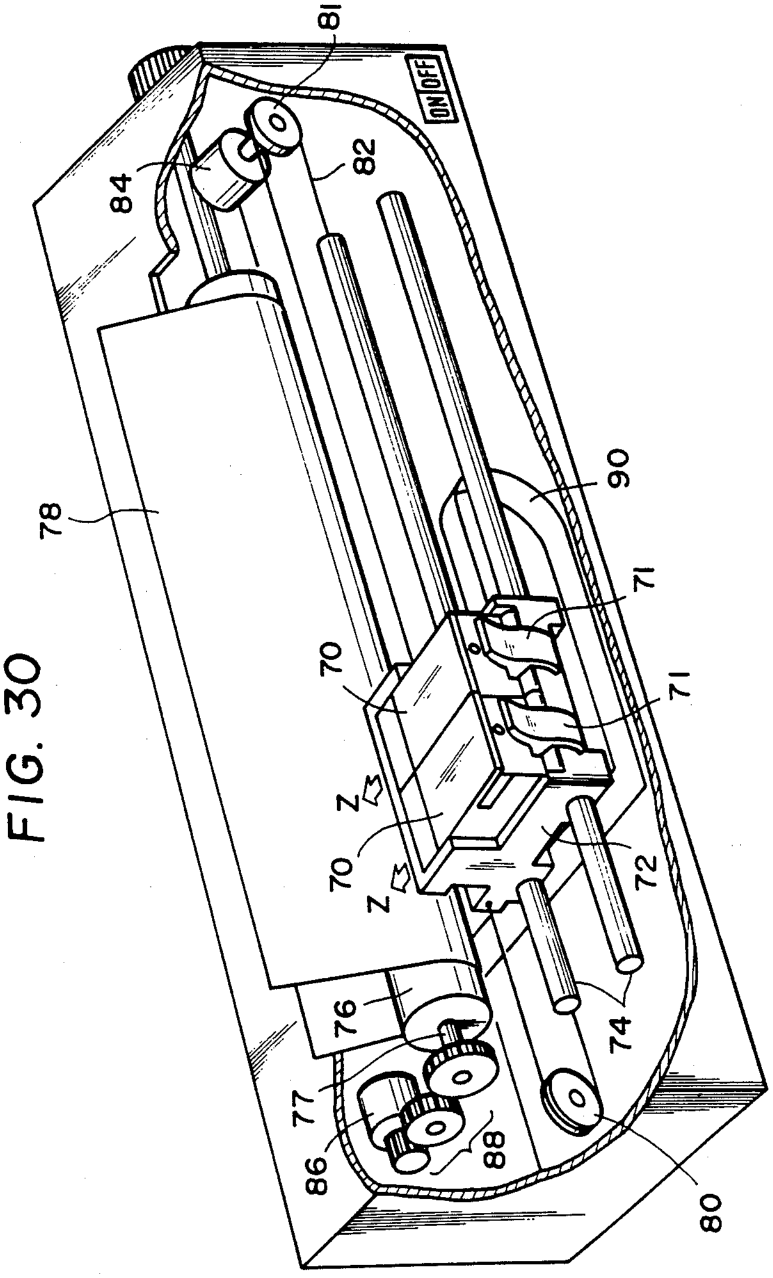
FIG. 30 is a partly-removed perspective view of a recording system in accordance with the invention.

A practical embodiment of a liquid jet recording system of the invention which incorporates the described liquid jet recording head according to the first embodiment of the invention will be explained hereinunder. FIG. 30 is a partly cut-away perspective view of a liquid jet recording system embodying the present invention.

This recording system has a pair of recording head units 70 mounted on a carriage 72 in a side-by-side fashion and fixed by retainers 71. Each of the recording head units 70 is detachable and may be of a disposable type which is wasted when the recording liquid therein has been consumed. A wire 82 going around pulleys 80 and 81 has both ends connected to respective side surfaces of the carriage 72. The pulley 81 is power-driven by a motor 84. The arrangement is such that, as the motor 84 operates, the carriage 72 is pulled by the wire 82 so as to move to the left and right as viewed in FIG. 30 along the guide members 74.

On the other hand, a platen 76 is carried by a rotary shaft 77 which in turn is driven by another motor 86 through a gear mechanism 88, so as to feed a recording medium 78.

In operation, electric signals corresponding to the information to be recorded are delivered to the recording head units 70 through a flexible wiring web 90, so that the recording head units 70 jet the droplets of the recording liquid towards the recording medium as indicated by arrows Z, whereby the information is recorded on the recording medium.

Needless to say, the recording head may be of full-line type which extends over the entire length of the recording or print line. In such a case, it isnot necessary to employ a mechanism for driving the recording head, unlike the embodiment shown in FIG. 30.

The second embodiment of the invention will now be described.

As stated before, the heat-generating resistance layer 14 in the recording head of the second embodiment of the invention is made of an amorphous material containing hydrogen atoms in a matrix of carbon atoms. This amorphous material will be expressed as "a-C:H" hereinafter, where H shows hydrogen atoms. The amorphous material a-C:H can be formed by plasma CVD (Chemical Vapor Deposition) method such as glow-discharge method or by a vacuum deposition method such as sputtering.

The process for forming the resistance layer 14 of a-C:H by the glow discharge method basically includes the steps of: placing the support member in a deposition chamber of a reduced internal pressure; and introducing a material gas capable of supplying the carbon atoms C and a material gas capable of supplying the hydrogen atoms H into the deposition chamber, while causing a glow discharge within the deposition chamber by means of high-frequency wave or a microwave, thereby forming a layer of a-C:H on the support member. The rate of introduction of the H material gas may be changed in relation to time if a non-uniform distribution of hydrogen atoms H is required.

On the other hand, the formation of the resistance layer 14 of a-C:H by sputtering is conducted by a process which basically includes the steps of: placing the support member 12 in a deposition chamber maintaining an atmosphere of a reduced pressure constituted by an inert gas such as Ar, He or their mixture; and effecting sputtering on a target constituted by the carbon atoms C, while introducing the H material gas for supplying the hydrogen atoms H. The rate of introduction of the H gas may be varied in relation to time, in order to obtain a certain gradient, i.e., non-uniform distribution, of the hydrogen atoms H.

The amorphous material used as the material of the heat-generating resistance layer 14 in the recording head of the invention can contain an electroconductivity controlling substance besides the hydrogen atoms in a matrix of carbon atoms. This amorphous material will be expressed as "a-C:H(p,n)" hereinafter, where H shows hydrogen atoms, while (p,n) represents the electroconductivity controlling substance. The amorphous material a-C:H(p,n) can be formed by plasma CVD method such as glow-discharge method or by a vacuum deposition method such as sputtering.

The process for forming the resistance layer 14 of a-C:H(p,n) by the glow discharge method basically includes the steps of: placing the support member in a deposition chamber of a reduced internal pressure; and introducing a material gas capable of supplying the carbon atoms C, a material gas capable of supplying the hydrogen atoms H and a material gas capable of supplying the electroconductivity controlling substance into the deposition chamber, while causing a glow discharge within the deposition chamber by means of high-frequency wave or a microwave, thereby forming a layer of a-C:H(p,n) on the support member 12. The rate of introduction of at least one of the H material gas and the (p,n) material gas may be varied in relation to time, if a non-uniform distribution of at least one of hydrogen atoms H and the substance (p,n) is required.

On the other hand, the formation of the resistance layer 14 of a-C:H(p,n) by sputtering is conducted by a process which basically includes the steps of: placing the support member 12 in a deposition chamber; maintaining an atmosphere of a reduced pressure constituted by an inert gas such as Ar, He or their mixture; and effecting sputtering on a target constituted by the carbon atoms C, while introducing the H material gas for supplying the hydrogen atoms H and the (p,n) material gas capable of supplying the electroconductivity controlling substance (p,n) into the chamber. The rate of introduction of the H material gas and/or the rate of introduction of the (p,n) material gas may be varied in relation to time, in order to obtain a certain gradient, i.e., non-uniform distribution, of the hydrogen atoms H and/or of the electroconductivity controlling substance.

In the processes explained above in connection with the second embodiment, the material gases for supplying the carbon atoms (C), hydrogen atoms (H) and the electroconductivity controlling substance (p,n) may be a substance which exists in the gaseous phase under normal pressure or a substance which can be gasified under a reduced pressure.

The material for supplying carbon atoms (C) in the second embodiment may include saturated hydrocarbons having 1 to 5 carbon atoms, ethylenic hydrocarbons having 2 to 5 carbon atoms, acetylenic hydrocarbons having 2 to 4 carbon atoms and aromatic hydrocarbons. Practical examples of the saturated hydrocarbons are methane ($CH_4$), ethane ($C_2H_6$), propane ($C_3H_8$), n-butane (n-$C_4H_{10}$) and pentane ($C_5H_{12}$). Practical examples of ethylenic hydrocarbons are ethylene ($C_2H_4$), propylene ($C_3H_6$), butene-1 ($C_4H_8$), butene-2 ($C_4H_8$), isobutylene ($C_4H_8$), and pentane ($C_5H_{10}$).

Practical examples of acetylenic hydrocarbons are acetylene ($C_2H_2$), methylacetylene ($C_3H_4$) and butyne ($C_4H_6$). A practical example of aromatic hydrocarbons is benzene ($C_6H_6$).

The materials for supplying hydrogen atoms H in the second embodiment include hydrogen gas and above-mentioned hydrocarbons such as saturated hydrocarbons, ethylenic hydrocarbons, acetylenic hydrocarbons and aromatic hydrocarbons which are used as the material for supplying carbon atoms C.

Examples of the material for supplying the electroconductivity controlling substance in the second embodiment are as follows. For supplying atoms of the group III, particularly boron atoms, boron hydrides such as $B_2H_6$, $B_4H_{10}$, $B_5H_9$, $B_5H_{11}$, $B_6H_{10}$, $B_6H_{12}$ and $B_6H_{14}$, as well as boron halides such as $BF_3$, $BCl_{13}$ and $BBr_3$, are suitably used. Materials such as $AlCl_3$, $GaCl_3$, $Ga(CH_3)_3$, $InCl_3$ and $TlCl_3$ are usable for introducing other atoms of the group III.

For supplying atoms of the group V, particularly phosphorus, phosphorous hydrides such as $PH_3$ and $P_2H_4$ and phosphorous halides such as $PH_4I$, $PF_3$, $PF_5$, $PCl_3$, $PCl_5$, $PBr_3$, $PBr_5$, and $PI_3$ are suitably used. Materials such as $AsH_3$, $AsF_3$, $AsCl_3$, $AsBr_3$, $AsF_5$, $SbH_3$, $SbF_3$, $SbF_5$, $SbCl_3$, $SbCl_5$, $BiH_3$, $BiCl_3$ and $BiBr_3$ are usable for introducing other atoms of the group V.

These materials can be used solely or in combination.

In the process for forming the heat-generating resistance layer described in connection with the second embodiment, the amounts of the hydrogen atoms and the electroconductivity controlling substance contained by the resistance layer 14 to be formed, as well as the characteristics of the resistance layer 14, can be controlled by suitably selecting the factors such as the temperature of the support member, rates of supply of the material gases, electric discharging power and pressure in the deposition chamber..

When it is desired to obtain a heat-generating resistance layer 14 according to the second embodiment in which either one or both of the hydrogen atoms and the electroconductivity controlling substance have non-uniform thicknesswise distribution, it is preferred that the rate or rates of introduction of either one or both of the hydrogen atoms and the electroconductivity controlling substance are varied in relation to time, by valve control means or other suitable means.

The support member temperature is selected to range preferably between 20° and 1500° C., more preferably between 30° and 1200° C., and most preferably between 50 ° and 1100° C.

The rate of supply of the material gas is suitably selected in accordance with the heat-generating characteristic of the layer and the layer forming speed.

The electric discharge power preferably ranges between 0.001 and 20 $W/cm^2$, more preferably between 0.01 and 15 $W/cm^2$, and most preferably between 0.05 and 10 $W/cm^2$.

Finally, the pressure in the deposition chamber preferably ranges between $10^{-4}$ to 10 Torr, and more preferably between $10^{-2}$ and 5 Torr.

The resistance layer of the recording head of the second embodiment of the invention, produced by the method described above, possesses characteristics similar to those of diamond. For instance, Vickers hardness of this layer is as high as 1800 to 5000. Chemical and thermal stablilities are also superior by virtue of the hydrogen atoms. In addition, the controllability of the resistance is enhanced thanks to the presence of the electroconductivity controlling substance.

The heat-generating resistance layer used in the recording head of the second embodiment of the invention does not necessitate any protective layer thereon because it exhibits a high durability against mechanical impacts, as well as high chemical stability. Therefore, the liquid jet recording head of the second embodiment of the invention, which incorporates this heat-generating resistance layer, permits a high efficiency of transmission of heat to the recording liquid in response to the inputted signal, thus affording a high thermal response characteristic. This in turn improves the flying characteristics of the droplets in response to the signals inputted to the recording head.

The second embodiment of the invention, however, does not exclude provision of a protective layer on the heat-generating resistance layer, provided that the protective layer does not significantly impair the response characteristics. In fact, the rpovision of the protective layer is essential when the recording liquid is electrically conductive, in order to avoid any short circuit of electric current between two electrodes through the liquid.

The electro-thermal transducer of the second embodiment described above has the heat-generating resistance layer formed on the support member and overlain by the electrodes. This, however, is not essential and the arrangement may be such that the electrodes are sandwiched between the support member and the heat-generating resistance layer. FIG. 4 shows a modification in which electrodes 16 and 17 are formed directly on the support member 12 and are overlain by the heat-generating resistance layer 14.

Although the support member 12 in the second embodiment has been explained as being constituted by a single member, the support member 12 used in the invention may be a composite member. FIG. 5 shows an example of such a composite support member. Namely, this support member has a base portion 12*a* and a surface layer 12*b* formed on the base portion 12*a*.

The base portion 12*a* in the second embodiment may be constituted by the same material as the support member material explained in connection with FIGS. 1 to 3, while the surface layer 12*b* may be formed of a material which exhibits a higher affinity to the resistance layer 14 which is to be formed thereon. Thus, the surface layer 12*b* may be formed of an amorphous material having a matrix of carbon atoms or a suitable known oxide. The surface layer 12*b* of the second embodiment can be formed by deposition on the base portion 12*b* from a suitable material, in the same manner as that in the formation of the heat-generating resistance layer explained above.

The surface layer 12*b* of the second embodiment may be a glazing layer of an ordinary glass or, when the base portion is made of a metal, an oxide layer formed by oxidizing the surface of such a metal base portion.

The electrodes 16 and 17 of the second embodiment may be of any known material having the required conductivity, e.g., metals such as Au, Cu, Al, Ag and Ni.

The recording head of the second embodiment of the present invention can be produced by the following process, using an apparatus which is exemplarily shown in FIG. 6 and adapted for forming the heat-generating resistance layer by deposition on the support member surface.

Referring to FIG. 6, the apparatus for forming the heat-generating resistance layer has the following constituents: a deposition chamber 1101; gas cylinders 1102 to 1106; mass-flow controllers 1107 to 1111; inlet valves 1112 to 1116; outlet valves 1117 to 1121; gas cylinder valves 1122 to 1126; outlet pressure gauges 1127 to 1131; an auxiliary valve 1132; a lever 1133; a main valve 1134; a leak valve 1135; a vacuum gauge 1136; a support member 1137 on which the heat-generating resistance layer is to be formed; a heater 1138; a support member supporting means 1139; a high-voltage electric power supply 1140; an electrode 1141; and a shutter 1142. A numeral 1142-1 denotes a target which is adapted to be secured to the electrode 1141 when sputtering is to be conducted.

For obtaining a heat-generating resistance layer having a matrix of carbon atoms and containing hydrogen atoms, i.e., a heat-generating resistance layer of a-C:H type composition, the process may be as follows. The gas cylinder 1102 is charged with $CH_4$ gas (99.9% or higher purity) diluted with Ar gas, while the gas cylinder 1103 is charged with $C_2H_6$ (99.9% or higher purity) gas also diluted with Ar gas. Before letting the gases in these cylinders flow into the deposition chamber 1101, the operator confirms that the valves 1122 to 1126 of all gas cylinders 1102 to 1106 are closed and that the inlet valves 1112 to 1116, outlet valves 1117 to 1121 and the auxiliary valve 1132 are all opened. Then, the operator opens the main valve 1134 to evacuate the deposition chamber 1101 and associated gas pipes, and, when the reading of the vacuum gauge 1136 has reached $1.5\times10^{-6}$ Torr, closes the auxiliary valve 1132, inlet valves 1112 to 1116 and the outlet valves 1117 to 1121. Then, the valves between the deposition chamber 1101 and the gas cylinders containing the gases to be used are opened, so that these gases are introduced into the deposition chamber 1101.

When the resistance layer of a-C:H is formed by glow discharge method with this apparatus, the process may be as follows.

As the first step, the valve 1122 is opened to allow the $CH_4$ gas to be discharged from the gas cylinder 1102, while regulating the pressure indicated by the outlet pressure gauge 1127 at 1 $kg/cm^2$. Subsequently, the inlet valve 1112 is gradually opened to allow the gas to flow into the mass-flow controller 1107. Then the outlet valve 1117 and the auxiliary valve 1132 are gradually opened so as to introduce the $CH_4$ gas into the deposition chamber 1101. Meanwhile, the operator adjusts the mass-flow controller 1107 so as to maintain a desired flow rate of the $CH_4$ gas and also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform distribution of H in the resistance layer made of a-C:H, the opening of the outlet valve 1117 is varied manually or by an external driving motor so as to change the flow rate of the $CH_4$ gas along a predetermined curve of changing rate, thereby establishing a thicknesswise variation of the content of F atoms in the product layer 14.

When the resistance layer of a-C:H is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CH_4$ gas is introduced from the cylinder 1102 into the deposition chamber 1101 at a desired flow rate, as in the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber, as in the case of the layer formation by glow discharge.

For attaining a non-uniform distribution of H in the resistance layer made of a-C:H, the opening of the outlet valve 1117 is varied so as to change the flow rate of the $CH_4$ gas along a predetermined curve of changing rate, thereby establishing a thicknesswise variation of the content of H atoms in the product layer 14, as in the case of the layer formation by glow discharge.

For obtaining a heat-generating resistance layer of a-C:H(p,n) system having a matrix of carbon atoms and containing hydrogen atoms and also an electroconductivity controlling substance, the gas cylinder 1102 is charged with $CH_4$ gas (99.9% or higher purity) diluted with Ar gas, while the gas cylinder 1103 is charged with $BF_3$ (99.9% or higher purity) gas also diluted with Ar gas. Similarly, the cylinder 1104 is charged with $B_2H_6$, gas (99.9% or higher purity) diluted with Ar gas. Before letting the gases in these cylinders flow into the deposition chamber 1101, the operator confirms that the valves 1122 to 1126 of all gas cylinders 1102 to 1106 are closed and that the inlet valves 1112 to 1116, outlet valves 1117 to 1121 and the auxiliary valve 1132 are all opened. Then, the operator opens the main valve 1134 to evacuate the deposition chamber 1101 and associated gas pipes, and, when the reading of the vacuum gauge 1136 has reached $1.5\times10^{-6}$ Torr, closes the auxiliary valve 1132, inlet valves 1112 to 1116 and the outlet valves 1117 to 1121. Then, the valves between the deposition chamber 1101 and the gas cylinders containing the gases to be used are opened, so that these gases are introduced into the deposition chamber 1101.

When the resistance layer of a-C:H(p,n) system is formed by glow discharge method with this apparatus, the process may be as follows.

As the first step, the valve 1122 is opened to allow the $CH_4$ gas to be discharged from the gas cylinder 1102, and the valve 1123 is opened to allow the $PH_3/Ar$ gas to be discharged from the gas cylinder 1103, while regulating the pressures indicated by the outlet pressure gauges 1127 and 1128 at 1 kg/cm$^2$. Subsequently, the inlet valves 1112 and 1113 are gradually opened to allow the gases to flow into the mass-flow controllers 1107 and 1108. Then the outlet valves 1117, 1118 and the auxiliary valve 1113 are gradually opened so as to introduce the $CH_4$ gas and the $PH_3/Ar$ gas into the deposition chamber 1101. Meanwhile, the operator adjusts the mass-flow controllers 1107, 1108 so as to maintain a desired ratio of flow rate between the $CH_4/Ar$ gas and the $PH_3/Ar$ gas and adjusts also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform distribution of atoms H and/or of the electroconductivity controlling substance in the resistance layer made of a-C:H(p,n), the opening of the outlet valve 1117 and/or of the outlet valve 1118 is varied manually or by an external driving motor so as to change the flow rate of the $CH_4/Ar$ gas and/or of the $PH_3/Ar$ gas along predetermined curves of changing rate, thereby establishing a thicknesswise variation of the content of H atoms and/or of the electroconductivity controlling substance in the product layer 14.

When the resistance layer of a-C:H(p,n,) is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CH_4$ gas and the $PH_3/Ar$ gas are introduced from the cylinders 1102 and 1103 into the deposition chamber 1101 at desired flow rates, as in the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber 1101, as in the case of the layer formation by glow discharge.

For attaining a non-uniform distribution of atoms H and/or of the electroconductivity controlling substance in the resistance layer made of a-CH:H(p,n), the opening of the outlet valve 1117 and/or of the outlet valve 1118 is varied so as to change the flow rate of the $CH_4/Ar$ gas and/or of the $PH_3/Ar$ gas along predetermined curves of changing rate, thereby establishing a thicknesswise variation of the content of H atoms and/or of the electroconductivity controlling substance in the product layer 14, as in the case of the layer formation by glow discharge.

The electro-thermal transducer of the type shown in FIGS. 1 to 3, intended for use in the liquid jet recording head of the second embodiment invention, is produced by forming the heat-generating resistance layer on the support member in the manner described above, forming conductive layers, e.g., an Au layer and an Al layer, for forming the electrode on the heat-generating resistance layer, and effecting patterning of the conductive layers and the heat-generating resistance layer by known photolithographic techniques. If necessary, a protective layer is formed to cover the heat-generating resistance layer and the electrodes.

On the other hand, the electro-thermal transducer of the type shown in FIG. 4 intended for use in the liquid jet recording head of the second embodiment of the invention, is produced by forming a conductive layer beforehand on the support member, effecting patterning of the conductive layer by means of photolithographic technique, and forming the heat-generating resistance layer by a glow discharge or sputtering as explained before.

The top plate of the recording head of the second embodiment is made of a material similar to that of the support member. The channels are formed by a suitable method such as mechanical cutting by a microcutter, chemical etching and so forth. When a photosensitive glass is used as the material; the channels can be formed by exposure in the desired pattern followed by development.

The joining of the top plate to the support member in the second embodiment is carried out by bonding through an adhesive, after obtaining sufficient positional alignment. Some kinds of material of the top plate permit the joining of the top plate to the support member by fusion welding.

In the second embodiment of the liquid jet recording head described above, the outlet 26 for the recording liquid is formed in one end of each channel 22 which defines the ink chamber in the top plate 20, as typically shown in FIG. 7. This position of the recording liquid outlet, however, is not exclusive and the recording liquid outlet 26 may be formed to open in the surface of the top plate 20, as shown in FIG. 8. In this case, the end openings of each channel defining the ink chamber may be utilized as a recording liquid inlet through which the recording liquid is introduced into the liquid passage, and the recording liquid is jetted through the outlet 26 as indicated by an arrow Y. In this case, needless to say, each channel may be closed at one end thereof so that the liquid is introduced through the other open end of the channel.

A modification of the liquid jet recording head of the second embodiment will be explained hereinunder.

Referring to FIG. 9 which is a sectional view taken along the line IX—IX of FIG. 8, the top plate 20 is held in contact at its portions other than the chanels with the support ;member of the electro-thermal transducer. Therefore, the heating sections 24 formed along the respective chanels 22 are isolated from one another by the barriers 30 which are constituted by the portions of the top plate 20 contacting the support member. In the arrangement shown in FIG. 9, the heat-generating regions 18 are provided in the respective channels near the outlets 26.

FIGS. 10 and 12 are sectional views which represent different examples of the recording head of the second described embodiment, taken along the line IX—IX of FIG. 8.

In the recording head shown in FIG. 10, the barriers 30 do not contact the support member 12 so that the heating sections 24 corresponding to the heat generating regions 18 are in communication with one another. That is, the liquid passages are not independent as shown in FIG. 9 but instead the adjacent liquid passages are in communication with each other.

In the recording head shown in FIG. 11, the barriers 30 are not formed in the top plate 20 but are formed in the support member. Therefore, the heating sections 24 are in communication with each other, as in the case of the recording head shown in FIG. 10. Thus, adjacent liquid passages are in communication with each other also in this case.

The recording head shown in FIG. 12 does not have any barrier, unlike the recording heads shown in FIGS. 10 and 11. In this case, therefore, the liquid passage is constituted by an ink chamber which is common to all the heating sections 24.

Various examples shown in FIGS. 9 to 12, which represent modifications of the second embodiment of the recording head shown in FIG. 8, are obtainable also with the liquid jet recording head of the type shown in FIG. 7.

The provision of the barriers 30 is not essential to the second embodiment. Namely, the barriers can be dispensed with provided that the reach and aim of the flying droplets do not exceed predetermined tolerances, although it is true that the direction, velocity and rate of the liquid jet may be affected by the liquid stagnant in adjacent liquid outlets. The provision of the barriers, however, is preferred in order to reduce mutual interference between adjacent liquid outlets and to improve the efficiency of conversion of the energy. It will be clear to those skilled in the art that the barriers may be formed integrally with the top plate or may be formed as independent members and then suitably secured to the top plate. The flat top plate may be formed of the same material as the top plate with channels explained before. Hardened layers of photosensitive resin can be used as the material of the barriers and the top plate.

As will be seen from the foregoing description, the second embodiment of the present invention provides a liquid jet recording head incorporating an electro-thermal transducer having a heat-generating resistance layer made of an amorphous material containing hydrogen atoms in the matrix of carbon atoms, as well as a liquid jet recording system which incorporates this recording head. The heat-generating resistance layer of the above-mentioned amorphous material exhibits a high chemical stability, high resistance both to electrochemical reaction and oxidation, and superior resistance to mechanical impact and heat and, therefore, high thermal responsive characteristics and durability. In addition, according to the second embodiment of the present invention, it is easy to form the heat-generating resistance layer.

It is to be noted also that the control of the electric resistance value is facilitated in the second embodiment when the heat-generating resistance layer contains also an electroconductivity controlling substances besides the hydrogen atoms.

It is thus possible with the second embodiment to realize a high frequency responsive characteristic and distinguished reliability of liquid jet recording.

It is also possible with the second embodiment to easily attain various desired characteristics such as a heat accumulating characteristic, a heat radiation characteristic, an affinity between the support member and the resistance layer and resistance against chemical reaction with the recording liquid, by developing a non-uniform distribution of content of the hydrogen atoms and/or the content of the electroconductivity controlling substance.

Practical examples of the liquid jet recording head in accordance with the second embodiment of the invention will be described hereinunder.

Examples of the Second Embodiment:

Examples of the liquid jet recording head of the second embodiment of the invention, as well as a comparison example, were produced by making use of electro-thermal transducers which were prepared in accordance with the following methods.

a glass #7059 produced by Corning Glass Works was used as the material of the support member. A surface layer of heat-oxidized $SiO_2$ having a thickness of 5 μm was formed as a heat accumulating layer. In each case, a heat-generating resistance layer and electrodes were formed on the support member, and a protective layer was formed as needed. The layered structures composed of the heat-generating resistance layer, electrodes and protective layer were prepared in the following three types D, E and F.

Type D

The heat-generating resistance layer was formed on the support member by means of the deposition system explained before in connection with FIG. 6. The conditions of the deposition were as shown in Tables 11, 12, 14, 15, 17 and 19. More specifically, examples shown in Tables 11, 14, 17 and 19 were prepared by glow discharge, while the examples shown in Tables 12 and 15 and comparison example were prepared by sputtering. In the sputtering for the preparation of examples shown in Tables 12 and 15, graphite (99.9% purity) was used as the target material, whereas the sputtering for the preparation of the comparison example employed $HfB_2$ as the target material.

The comparison example prepared under the same conditions was used for the comparison in each of a first case (a-C:H), a second case (a-C:H) with non-uniform H distribution, a third case (a-C:H(p,n)) and a fourth case (a-C:H(p,n) with non-uniform (p,n) distribution.

During the deposition, the gas flow rates and other conditions were maintained as shown in Tables 11, 12, 14, 15, 17 and 19, so that heat-generating resistance layers were formed to have thicknesses as shown in Tables 13, 16, 18 and 20.

Then, an Al layer was formed on the heat-generating resistance layer by an electron beam method, and a resist pattern was formed by a photolithographic technique. Using this resist pattern, etching was conducted on the Al layer so as to form a plurality of pairs of electrodes. Then, another resist pattern was formed by a photolithographic technique, and unnecessary portions of the heat-generating resistance layer were removed by etching with an etching liquid of a HF (hydrofluoric acid) system. Consequently, a plurality of heat-generating resistance elements, each having a heat-generating region constituted by a portion of the heat-generating resistance layer of 40 μm×200 μm and electrodes deposited thereon, were formed. The pitch of the heat-generating regions was 8 regions per millimeter.

Subsequently, a layer of photosensitive polyimide (commercial name Photoneece, supplied by Tokyo Oka Kogyo) was formed by spin coating method. After a pre-baking conducted at 80° C. for 1 hour, the heat-generating element was subjected to an exposure which was conducted by the use of an aligner, and then to a development, so as to form an aperture or window in each heat generating region. Finally, the heat-generating element was post-baked for 30 minutes at 140° C. and for 1 hour at 400° C., whereby an array of the electro-thermal transducers was completed.

The resistance values of the heat generating regions in various electro-thermal transducers produced by the method described above are shown in Tables 13, 16, 18 and 20. The photosensitive polyimide was used for the purpose of preventing any electrolysis of the Al electrode in the ink.

The thus completed array of electro-thermal transducers is shown in schematic perspective view in FIG. 13 and in schematic corss-sectional view in FIG. 14. In these Figures, a reference numeral 28 designates a polyimide layer.

Type E

A heat-generating resistance layer could be formed on each support member in the same manner as Type D, under the depositing conditions as shown in Tables 11, 12, 14, 15, 17 and 19. During the deposition, the gas flow rates and other factors were controlled as shown in Tables 11, 12, 14, 15, 17 and 19, so that heat-generating resistance layers were formed to have various thicknesses as shown in Tables 16, 18 and 20.

Then, an Au layer wad formed on the heat-generating resistance layer by an electron beam method, and a resist pattern was formed by a photolithographic technique. Using this resist pattern, etching was conducted on the Au layer so as to form a plurality of pairs of electrodes. Then, another resist pattern was formed by a photolithographic technique, and unnecessary portions of the heat-generating resistance layer were removed by etching with an etching liquid of a HF system. Consequently, a plurality of heat-generating resistance elements, each having a heat-generating region constituted by a portion of the heat-generating resistance layer of 40 μm×200 μm and electrodes deposited thereon, were formed. The pitch of the heat-generating regions was 8 regions per millimeter. The resistance values of the heat generating regions in various electro-thermal transducers produced by the method described above are shown in Tables 13, 16, 18 and 20, as in the case of Type D. The construction of thus completed array of electro-thermal transducers is shown in schematic perspective view in FIG. 15 and in schematic cross-sectional view in FIG. 16.

Type F

An Al layer was formed on the support member by an electron beam method on which was formed a resist pattern by photolithographic technique. Using this resist pattern, a plurality of pairs of electrodes were formed on the Al layer. Then, a heat-generating resistance layer was formed on the Al layer. This could be done by the same method as that in Type D. The deposition conditions were maintained as shown in Tables 11, 12, 14, 15, 17 and 19, so that the heat-generating resistance layer was formed in various thicknesses as shown in Tables 13, 16, 18 and 20. Then, another resist pattern was formed by a photolithographic technique and the unnecessary portion of the heat-generating resistance layer was removed by an etching liquid of a HF system. Consequently, heat-generating resistance elements, each having a heat-generating region constituted by a portion of the heat-generating resistance layer of 40 μm×200 μm and electrodes deposited thereon, were formed. The pitch of the heat-generating regions was 8 regions per millimeter. In this case, the Al electrodes were effectively protected by the heat-generating resistance layer, so that it is not necessary to form a protective layer for the electrodes. The resistance values of the heat-generating regions of the electro-thermal transducers formed by the method described above are shown in Tables 13, 16, 18 and 20, as is the case of Type D. The construction of the thus formed array of electro-thermal transducers is shown in schematic perspective view in FIG. 17 and in schematic cross-sectional view in FIG. 18.

Liquid jet recording heads according to the second edbodiment were produced by making use of the electro-thermal transducers which were prepared according to the various methods described above. Broadly, two types of recording heads were produced: namely, type III constructed as shown in FIG. 7 and type IV constructed as shown in FIG. 8. The recording head of type III was produced in two different processes. The recording head produced by a first process will be referred to as Type III-1, while the recording head produced by a second method will be referred to as Type III-2.

The production processes were as follows.

Type III-1

Referring to FIG. 19, a top plate 20 with channels was formed from a glass sheet 40. A plurality of channels 22 which constitute liquid passages, each being 40 μm wide and 40 μm deep, and a groove 42 which constitutes a common ink chamber communicating with the liquid passages were formed by a microcutter in the glass sheet 40 thus completing the top plate 20 with channels.

The top plate 20 was then adjoined to each of the array of electro-thermal transducers formed by the methods described before, in such a manner that the heat-generating regions in the electro-thermal transducers are aligned with the channels 22, thus forming the liquid passages and the common ink chamber. Then, ink inlet tubes 44 for introducing an ink into the common ink chamber were connected to the assembly, thus completing an integral recording head 46.

Type III-2

Each array of electro-thermal transducers was coated with a photosensitive layer 50 which was a layer produced by Tokyo Oka Kogyo under the commercial name of Ordyl. The coated element was then exposed by an aligner and subjected to development so that the layer 50 was formed into a predetermined pattern. Then, a glass sheet 54, which was also coated with a photosensitive layer 52 of the same material as layer 50, was adhered to the patternized layer on the electro-thermal transducer. The thus formed member was then cut mechanically such as by dies cutting so as to expose the liquid outlets 26. Then, ink introduction tubes 44 for introducing an ink from a source (not shown) were connected to the cut assembly, whereby an integral recording head 56 was formed as shown in schematic perspective view in FIG. 21.

Type IV

A top plate 20 was formed to have liquid outlets 26 in its major surface. More specifically, the top plate 20 was formed from a stainless steel sheet having channels formed therein by, for example, etching. A pattern of a photosensitive layer, produced by Hitachi Chemical Co., Ltd. under the commercial name of PHT-145FT-50, was formed on the stainless steel sheet, and an Ni-plating layer was formed by an electroforming method. It will be seen that the liquid outlets 26 were formed at positions where the photosensitive layer pattern exists. The thus formed top plate 20 was adhered by an adhesive to the array of electro-thermal transducers in such a manner that the heat-generating regions are aligned with the liquid outlets 26. The electro-thermal transducer was beforehand perforated by mechanical working to permit the supply of the ink into the common ink chamber in the top plate 20. Then, an ink introduction tube 60 for introducing an ink from a source (not shown) was connected to the underside of the electro-thermal transducer, whereby an integral recording head 62 was formed as shown in schematic perspective view in FIG. 22. In FIG. 22, a numeral 64 denotes recesses which provide barriers between adjacent liquid outlets. Thus, the recording head of the Type IV can have either the construction shown in FIG. 9 or the construction shown in FIG. 10, according to the design of the barriers, or even the construction shown in FIG. 12 which is devoid of barriers.

Thus, three types, D, E and F of construction of the array of electro-thermal transducers and three types, III-1, III-2 and IV, of construction of the recording head are available, and various combinations are possible among these types.

Amongst these various combinations, a combination between the electro-thermal transducer of type D and the recording head construction of type III-1 was subjected to a durability test which will be explained hereinunder.

A lead board was attached to a recording head constituted by the construction of type D and the construction of type III, so as to complete a recording head unit. The lead board had electrode leads (not shown) connected to independent electrodes 17 corresponding to the respective heat-generating regions and an electrode lead (not shown) to the electrode 16 common to all heat-generating regions.

A liquid jet recording system as shown in schematic perspective view in FIG. 23 was assembled by using this recording head unit. As will be seen from this Figure, the liquid jet recording system employs the following parts: the recording head unit 70; a carriage 72 carrying the recording head unit 70; guide members 74 for guiding the reciprocatory motion of the carriage 72; and a platen 76. A numeral 78 denotes a recording medium such as a print paper held on the platen 76.

The recording head unit 70 is so oriented that the recording liquid outlets are directed in the direction of an arrow Z so that the droplets of the recording liquid maya fly in the direction of the arrow Z so as to be deposited in the form of dots on the recording medium 78 on the platen 76. Main scanning is conducted by driving the recording head unit 70 along the guide members 74 by a suitable driving means, while auxiliary scanning is conducted by causing the platen 76 to rotate about its axis of the shaft 77 by another suitable driving means, whereby the inputted information is recorded by the liquid dots on the recording medium 78.

A test was conducted using this liquid jet recording system under the following conditions.

Rectangular-wave pulses were applied to the heat-generating regions. The pulse width was 10 μsec and the period was 200 μsec. The level of the voltage of the pulse was selected to be 1.2 times as high as the minimum boiling temperature at which the generation of void in the ink is commenced. Thus, the voltage of the pulse was selected to be 24 V when the minimum voltage to produce boiling temperature was 20 V. The composition of the ink used was as follows:

| | |
|---|---|
| Water | 68 weight parts |
| DEG (diethylene glycol) | 30 weight parts |
| Black dye | 2 weight parts |

The test operation of the recording system was carried out by using the ink specified above and under the conditions explained above, and the durability was examined for various examples, the result of which is shown in Tables 13, 16, 18 and 20. The evaluation of the durability was made by counting the number of electric pulses sustained by the recording head. The marks "o" and "x" appearing in these Tables represent, respectively, that the recording head could withstant $10^9$ or more repetitional cycles of pulses and that the recording head could withstand only $10^6$ cycles or less.

From these Tables, it will be seen that the liquid jet recording head embodying the present invention exhibits superior durability and recording characteristic over the comparison example. Although the result of the test conducted with the combination between type D and type III-1 was specifically described, it is to be understood that similar superiority of the liquid jet recording head of the invention was confirmed also with other combinations of types. In the following tables, the "Substrate" is the support member.

TABLE 11

| Example No. | Reaction Gas Kind A/B | Reaction Gas Ratio A/B | Flow rate (SCCM) | Electric power (W/cm²) | Substrate temp. (°C.) | Substrate material |
|---|---|---|---|---|---|---|
| P-25 | $CH_4$ | 1 | 50 | 0.8 | 350 | glass |
| P-26 | $C_2H_6$ | 1 | 50 | 1.5 | 350 | glass |
| P-27 | $CH_4$ | 1 | 50 | 0.8 | 350 | Si |
| P-28 | $C_2H_6$ | 1 | 50 | 1.5 | 350 | Si |

TABLE 12

| Example No. | Reaction Gas Kind A/B | Reaction Gas Ratio A/B | Flow rate (SCCM) | Electric power (W/cm²) | Substrate temp. (°C.) | Substrate material |
|---|---|---|---|---|---|---|
| S-5 | $H_2$ | 1 | 50 | 13 | 350 | glass |
| S-6 | $H_2$ | 1 | 50 | 13 | 350 | Si |
| Reference example | Ar | 1 | 20 | 1.5 | 200 | Si |

TABLE 13

| Example No. | Thickness (Å) | Resistance (Ω) | Durability |
|---|---|---|---|
| P-25 | 1000 | 205 | o |
| P-26 | 1000 | 205 | o |
| P-27 | 1000 | 205 | o |
| P-28 | 1000 | 205 | o |

TABLE 13-continued

| Example No. | Thickness (Å) | Resistance (Ω) | Durability |
|---|---|---|---|
| S-5 | 1000 | 205 | o |
| S-6 | 1000 | 205 | o |
| Reference example | 1500 | 120 | x |

TABLE 14

| Example No. | Reaction Gas Kind A/B | Reaction Gas Ratio A/B | Flow rate (SCCM) | Electric power (W/cm²) | Substrate temp. (°C.) | Substrate material |
|---|---|---|---|---|---|---|
| P-29 | $CH_4$ | 1 | 50→20 | 0.8 | 350 | glass |
| P-30 | $C_2H_6$ | 1 | 50→20 | 1.5 | 350 | glass |
| P-31 | $CH_4$ | 1 | 20→50 | 0.8 | 350 | glass |
| P-32 | $C_2H_6$ | 1 | 20→50 | 1.5 | 350 | glass |
| P-33 | $CH_4$ | 1 | 50→20 | 0.8 | 350 | Si |
| P-34 | $C_2H_6$ | 1 | 50→20 | 1.5 | 350 | Si |
| P-35 | $CH_4$ | 1 | 20→50 | 0.8 | 350 | Si |
| P-36 | $C_2H_6$ | 1 | 20→50 | 1.5 | 350 | Si |

TABLE 15

| Example No. | Reaction Gas Kind A/B | Reaction Gas Ratio A/B | Flow rate (SCCM) | Electric power (W/cm²) | Substrate temp. (°C.) | Substrate material |
|---|---|---|---|---|---|---|
| S-7 | $H_2$ | 1 | 20→10 | 13 | 350 | glass |
| S-8 | $H_2$ | 1 | 20→10 | 13 | 350 | Si |
| Reference example | Ar | 1 | 20 | 1.5 | 200 | Si |

TABLE 16

| Example No. | Thickness (Å) | Resistance (Ω) | Durability |
|---|---|---|---|
| P-29 | 1000 | 230 | o |
| P-30 | 1000 | 230 | o |
| P-31 | 1000 | 230 | o |
| P-32 | 1000 | 230 | o |
| P-33 | 1000 | 230 | o |
| P-34 | 1000 | 230 | o |
| P-35 | 1000 | 230 | o |
| P-36 | 1000 | 230 | o |
| S-7 | 1000 | 230 | o |
| S-8 | 1000 | 230 | o |
| Reference example | 1500 | 120 | x |

TABLE 17

| Example No. | Reaction gas Kind A/B | Reaction gas Ratio A/B | Flow rate (SCCM) | Electric power (W/cm²) | Substrate temp. (°C.) | Substrate material |
|---|---|---|---|---|---|---|
| P-37 | $CH_4$/Ar | 0.5 | 50 | 1.5 | 350 | glass |
| | $PH_3$/Ar | $1 \times 10^{-5}$ | 125 | | | |
| P-38 | $CH_4$/Ar | 0.5 | 50 | 1.5 | 350 | glass |
| | $B_2H_6$/Ar | $1 \times 10^{-5}$ | 125 | | | |
| P-39 | $CH_4$/Ar | 0.5 | 50 | 1.5 | 350 | Si |
| | $PH_3$/Ar | $1 \times 10^{-5}$ | 125 | | | |
| P-40 | $CH_4$/Ar | 0.5 | 50 | 1.5 | 350 | Si |
| | $B_2H_6$/Ar | $1 \times 10^{-5}$ | 125 | | | |

TABLE 18

| Example No. | Thickness (Å) | Resistance (Ω) | Durability |
|---|---|---|---|
| P-37 | 1000 | 180 | o |
| P-38 | 1000 | 180 | o |
| P-39 | 1000 | 180 | o |
| P-40 | 1000 | 180 | o |
| Reference example | 1500 | 120 | x |

TABLE 19

| Example No. | Reaction gas Kind A/B | Ratio A/B | Flow rate (SCCM) | Electric power (W/cm²) | Substrate temp. (°C.) | Substrate material |
|---|---|---|---|---|---|---|
| P-41 | $CH_4/Ar$ | 0.5 | 50→30 | 1.5 | 350 | glass |
| | $PH_3/Ar$ | $1 \times 10^{-5}$ | 125 | | | |
| P-42 | $CH_4/Ar$ | 0.5 | 50→30 | 1.5 | 350 | glass |
| | $B_2H_6/Ar$ | $1 \times 10^{-5}$ | 125 | | | |
| P-43 | $CH_4/Ar$ | 0.5 | 50 | 1.5→1.6 | 350 | glass |
| | $PH_3/Ar$ | $1 \times 10^{-5}$ | 125 | | | |
| P-44 | $CH_4/Ar$ | 0.5 | 50 | 1.5→1.6 | 350 | glass |
| | $B_2H_6/Ar$ | $1 \times 10^{-5}$ | 125 | | | |
| P-45 | $CH_4/Ar$ | 0.5 | 50→30 | 1.5 | 350 | Si |
| | $PH_3/Ar$ | $1 \times 10^{-5}$ | 125 | | | |
| P-46 | $CH_4/Ar$ | 0.5 | 50→30 | 1.5 | 350 | Si |
| | $B_2H_6/Ar$ | $1 \times 10^{-5}$ | 125 | | | |
| P-47 | $CH_4/Ar$ | 0.5 | 50 | 1.5→1.6 | 350 | Si |
| | $PH_3/Ar$ | $1 \times 10^{-5}$ | 125 | | | |
| P-48 | $CH_4/Ar$ | 0.5 | 50 | 1.5→1.6 | 350 | Si |
| | $B_2H_6/Ar$ | $1 \times 10^{-5}$ | 125 | | | |

TABLE 20

| Example No. | Thickness (Å) | Resistance (Ω) | Durability |
|---|---|---|---|
| P-41 | 1000 | 205 | o |
| P-42 | 1000 | 205 | o |
| P-43 | 1000 | 205 | o |
| P-44 | 1000 | 205 | o |
| P-45 | 1000 | 205 | o |
| P-46 | 1000 | 205 | o |
| P-47 | 1000 | 205 | o |
| P-48 | 1000 | 205 | o |
| Reference example | 1500 | 120 | x |

A practical embodiment of a liquid jet recording system of the second embodiment of the invention invention which incorporates the described liquid jet recording head will be explained hereinunder. FIG. 30 is a partly cut-away perspective view of a liquid jet recording system embodying the present invention.

This recording system has a pair of recording head units 70 mounted on a carriage 72 in a side-by-side fashion and fixed by retainers 71. Each of the recording head units 70 is detachable and may be of a disposable type which is wasted when the recording liquid therein has been consumed. A wire 82 going around pulleys 80 and 81 has both ends connected to respective side surfaces of the carriage 72. The pulley 81 is power-driven by a motor 84. The arrangement is such that, as the motor 84 operates, the carriage 72 is pulled by the wire 82 so as to move to the left and right as viewed in FIG. 30 along the guide members 74.

On the other hand, a platen 76 is carried by a rotary shaft 77 which in turn is driven by another motor 86 through a gear mechanism 88, so as to feed a recording medium 78.

In operation, electric signals corresponding to the information to be recorded are delivered to the recording head units 70 through a flexible wiring web 90, so that the recording head units 70 jet the droplets of the recording liquid towards the recording medium as indicated by arrows Z, whereby the information is recorded on the recording medium.

Needless to say, the recording head may be of full-line type which extends over the entire length of the recording or print line. In such a case, it is not necessary to employ a mechanism for driving the recording head, unlike the embodiment shown in FIG. 30.

The third embodiment of the invention will now be described.

As stated before, the heat-generating resistance layer 14 in the recording head of the third embodiment of the invention is made of an amorphous material containing halogen atoms and hydrogen atoms in a matrix of carbon atoms. This amorphous material will be expressed as "a-C:(X,H)" hereinafter, where X shows halogen atoms, while H shows hydrogen atoms. The amorphous material a-C:(X,H) can be formed by a plasma CVD (Chemical Vapor Deposition) method such as glow discharge method or by a vacuum deposition method such as sputtering.

The process for forming the resistance layer 14 of a-C:(X,H) by the glow discharge method basically includes the steps of: placing the support member 12 in a deposition chamber of a reduced internal pressure; and introducing a material gas capable of supplying the carbon atoms C, a material gas capable of supplying the halogen atoms X and a material gas capable of supplying the hydrogen atoms H into the deposition chamber, while causing a glow discharge within the deposition chamber by means of high-frequency wave or a microwave, thereby forming a layer of a-C:(X,H) on the support member 12. The rate of introduction of the X material gas and/or of H material gas may be changed during the glow discharging in relation to time if a non-uniform distribution of halogen atoms X and/or of hydrogen atoms H is required.

On the other hand, the formation of the resistance layer 14 of a-C:(X,H) by sputtering is conducted by a process which basically includes the steps of: placing the support member 12 in a deposition chamber maintaining an atmosphere of a reduced pressure constituted by an inert gas such as Ar, He or their mixture; and effecting sputtering on a target constituted by the carbon atoms C, while introducing the X material gas for supplying the halogen atoms X and the H material gas for supplying the hydrogen atoms H. The rate of introduction of the X gas and/or of the H gas may be varied in relation to time during the sputtering, in order to obtain a certain gradient, i.e., non-uniform distribution, of the halogen atoms X and/or the hydrogen atoms.

The heat-generating resistance layer 14 in the recording head of the invention may be made of an amorphous material containing silicon atoms in addition to halogen atoms and hydrogen atoms in a matrix of carbon atoms. This amorphous material will be expressed as "a-C:Si:(X,H)" hereinafter, where Si shows silicon atoms, X shows halogen atoms, and H shows hydrogen atoms. The amorphous material a-C:Si:(X,H) also can be formed by a plasma CVD method such as glow discharge method or by a vacuum diposition method such as sputtering.

The process for forming the resistance layer 14 of a-C:Si:(X,H) by the glow discharge method basically includes the steps of: placing the support member 12 in a deposition chamber of a reduced internal pressure; and introducing a material gas capable of supplying the carbon atoms C, a material gas capable of supplying the silicon atoms Si, a material gas capable of supplying the halogen atoms X and a material gas capable of supplying the hydrogen atoms H into the deposition chamber, while causing a glow discharge within the deposition chamber by means of high-frequency wave or a microwave, thereby forming a layer of a-C:Si:(X,H) on the support member 12. The rate of introduction of at least one of the Si material gas, X material gas and the H material gas may be changed in relation to time during the glow discharge, if a non-uniform distribution of at least one of the Si atoms, X atoms and H atoms is required.

On the other hand, the formation of the resistance layer 14 of a-C:Si:(X,H) by sputtering is conducted by a process which basiclly includes the steps of: placing the support member 12 in a deposition chamber; maintaining an atmosphere of a reduced pressure constituted by an inert gas such as Ar, He or their mixture; and effecting sputtering on a target constituted by the carbon atoms C, while introducing the Si material gas for supplying silicon atoms Si, X material gas for supplying the halogen atoms X and the H material gas for supplying the hydrogen atoms H. The rate of introduction of at least one of the Si material gas, X material gas and the H material gas may be varied in relation to time during the sputtering, in order to obtain a non-uniform distribution, of at least one of the Si atoms, X atoms and the H atoms.

The heat-generating resistance layer 14 in the recording head of the third embodiment of the invention may be made of an amorphous material containing germanium atoms in addition to halogen atoms and hydrogen atoms in a matrix of carbon atoms. This amorphous material will be expressed as "a-C:Ge:(X,H)" hereinafter, where Ge shows germanium atoms, X shows halogen atoms, and H shows hydrogen atoms. The amorphous material a-C:Ge:(X,H) also can be formed by plasma CVD method such as glow-discharge method or by a vacuum deposition method such as sputtering.

The process for forming the resistance layer 14 of a-C:Ge:(X,H) by the glow discharge method basically includes the steps of: placing the support member 12 in a deposition chamber of a reduced internal pressure; and introducing a material gas capable of supplying the carbon atoms C, a material gas capable of supplying the germanium atoms Ge, a material gas capable of supplying the halogen atoms X and a material gas capable of supplying the hydrogen atoms H into the deposition chamber, while causing a glow discharge within the deposition chamber by means of high-frequency wave or a microwave, thereby forming a layer of a-C:Ge:(X,H) on the support member 12. The rate of introduction of at least one of the Ge material gas, X material gas and H material gas may be changed in relation to time during the glow discharge, if a non-uniform distribution of at least one of the germanium atoms Ge, halogen atoms X and the hydrogen atoms H is required.

On the other hand, the formation of the resistance layer 14 of a-C:Ge:(X,H) by sputtering is conducted by a process which basically includes the steps of: placing the support member 12 in a deposition chamber; maintaining an atmosphere of a reduced pressure constituted by an inert gas such as Ar, He or their mixture; and effecting sputtering on a target constituted by the carbon atoms C, while introducing the Ge material gas for supplying germanium atoms Ge, X material gas for supplying the halogen atoms X and the H material gas for supplying the hydrogen atoms H. The rate of introduction of at least one of the Ge material gas, X material gas and the H material gas may be varied in relation to time during the sputtering, in order to obtain a non-uniform distribution of at least one of the germanium atoms Ge, halogen atoms X and the hydrogen atoms H.

The heat-generating resistance layer 14 in the recording head of the third embodiment of the invention may be made of an amorphous material containing silicon atoms and germanium atoms in addition to halogen atoms and hydrogen atoms in a matrix of carbon atoms. This amorphous material will be expressed as "a-C:Si:Ge:(X,H)" hereinafter, where Si shows silicon atoms, Ge shows germanium atoms, X shows halogen atoms, and H shows hydrogen atoms. The amorphous material a-C:Si:Ge:(X,H) also can be formed by plasma CVD method such as glow-discharge method or by a vacuum deposition method such as sputtering.

The process for forming the resistance layer 14 of a-C:Si:Ge:(X,H) by the glow discharge method basically includes the steps of: placing the support member 12 in a deposition chamber of a reduced internal pressure; and introducing a material gas capable of supplying the carbon atoms C, a material gas capable of supplying silicon atoms Si, a material gas capable of supplying the germanium atoms Ge, a material gas capable of supplying the halogen atoms X and a material gas capable of supplying the hydrogen atoms H into the deposition chamber, while causing a glow discharge within the deposition chamber by means of high-frequency wave or a microwave, thereby forming a layer of a-C:Si:Ge:(X,H) on the support member 12. The rate of introduction of at least one of the Si material gas, Ge material gas, X material gas and H material gas may be changed in relation to time during the glow discharge, if a non-uniform distribution of at least one of the silicon atoms Si, germanium atoms Ge, halogen atoms X and the hydrogen atoms H is required.

On the other hand, the formation of the resistance layer 14 of a-C:Si:Ge:(X,H) by sputtering is conducted by a process which basically includes the steps of: placing the support member 12 in a deposition chamber; maintaining an atmosphere of a reduced pressure constituted by an inert gas such as Ar, He or their mixture; and effecting sputtering on a target constituted by the carbon atoms C, while introducing the Si material gas for supplying silicon atoms Si, the Ge material gas for supplying germanium atoms Ge, X material gas for supplying the halogen atoms X and the H material gas for supplying the hydrogen atoms H. The rate of introduction of at least one of the Si material gas, Ge ;material gas, X material gas and the H material gas may be varied in relation to time during the sputtering, in order to obtain a non-uniform distribution of at least one of the silicon atoms Si, germanium atoms Ge, halogen atoms X and the hydrogen atoms H.

According to the third embodiment of the invention, each of the above-mentioned amorphous materials a-

C:(X,H), a-C:Si:(X,H), a-C:Ge:(X,H) and a-C:Si:-Ge:(X,H) can further contain an electroconductivity controlling substance. Such amorphous materials will be expressed as "a-C:(X,H)(p,n)", "a-C:Si:(X,H)(p,n)", "a-C:Ge:(X,H)(p,n)", and "a-C:Si:Ge:(X,H)(p,n)" hereinafter, where (p,n) represents the electroconductivity controlling substance. These amorphous materials containing the electroconductivity controlling substance also can be formed by plasma CVD method such as glow-discharge method or by a vacuum deposition method such as sputtering.

Examaples of processes for forming heat-generating resistance layer 14 of the third embodiment will be explained hereinunder, with specific reference to a-C:(X,H)(p,n) type material. It is to be understood, however, that these methods can be equally applied to other types of amorphous materials containing the electroconductivity controlling substance.

The process for forming the resistance layer 14 of a-C:(X,H)(p,n) by the glow discharge method basically includes the steps of: placing the support member 12 in a deposition chamber of a reduced internal pressure; and introducing a material gas capable of supplying the carbon atoms C, a material gas capable of supplying the halogen atoms X, a material gas capable of supplying hydrogen atoms H and a material gas capable of supplying the electroconductivity controlling substance into the deposition chamber, while causing a glow discharge within the deposition chamber by means of high-frequency wave or a microwave, thereby forming a layer of a-C:(X,H)(p,n) on the support member 12. The rate of introduction of at least one of the X material gas, H material gas and the (p,n) material gas may be varied in relation to time, if a non-uniform distribution of at least one of halogen atoms X, hydrogen atoms H and the substance (p,n) is required.

On the other hand, the formation of the resistance layer 14 of a-C:(X,H)(p,n) by sputtering is conducted by a process which basically includes the steps of: placing the support member 12 in a deposition chamber maintaining an atmosphere of a reduced pressure constituted by an inert gas such as Ar, He or their mixture; and effecting sputtering on a target constituted by the carbon atoms C, while introducing the X material gas for supplying the halogen atoms X, the H material gas for introducing the hydrogen atoms H and the (p,n) material gas capable of supplying the electroconductivity controlling substance (p,n) into the chamber. The rate of introduction of at least one of the X material gas, H material gas and the (p,n) material gas may be varied in relation to time, in order to obtain a non-uniform distribution of least one of the halogen atoms X, hydrogen atoms H and the electroconductivity controlling substance.

It is possible to attain a remarkable improvement in the resistance to chemicals and also the flexibility of the heat-generating resistance layer 14 by adding silicon atoms Si and germanium atoms Ge to the amorphous material of a-C:(X,H) type composition. It is to be noted also that the controllability of the resistance value of the heat-generating resistance layer can be remarkably improved by inclusion of the electroconductivity controlling substance.

In the processes explained above in connection with the third embodiment, the material gases for supplying the carbon atoms (C), halogen atoms (X), hydrogen atoms (H) and the electroconductivity controlling substance (p,n) may be gases of substances which exist in the gaseous phase under normal pressure or substances which can be gasified under a reduced pressure.

The material for supplying carbon atoms (C) in the third embodiment may include saturated hydrocarbons having 1 to 5 carbon atoms, ethylenic hydrocarbons having 2 to 5 carbon atoms, acetylenic hydrocarbons having 2 to 4 carbon atoms and aromatic hydrocarbons. Practical examples of the saturated hydrocarbons are methane ($CH_4$), ethane ($C_2H_6$), propane ($C_3H_8$), n-buthane (n-$C,H_4H_{10}$) and pentane ($C_5H_{12}$). Practical examples of ethylenic hydrocarbons are ethylene ($C_2H_4$), propylene ($C_3H_6$), butene-1 ($C_4H_8$), butene-2 ($C_4H_8$), isobutylene ($C_4H_8$), and pentene ($C_5H_{10}$). Practical examples of acetylenic hydrocarbons are acetylene ($C_2H_2$), methylacetylene ($C_3H_4$) and butyne ($C_4H_6$). A practical example of aromatic hydrocarbons is benzene ($C_6H_6$).

Examples of the material for supplying silicon atoms Si in the third embodiment are silicon hydrides (silane) such as $SiH_4$, $Si_2H_6$, $Si_3H_8$ and $Si_4H_{10}$, and silicon halides (silane derivatives substituted by halogen atoms) such as $SiF_4$, $(SiF_2)_5$, $(SiF_2)_6$, $(SiF_2)_4$, $Si_2F_6$, $Si_3F_8$, $SiHF_3$, $SiH_2F_2$, $SiC_{14}$, $(SiCl_2)_5$, $SiBr_4$, $(SiBr_2)_5$, $Si_2Cl_6$ and $Si_2Cl_3F_3$.

Examples of the material for supplying germanium atoms Ge in the third embodiment are germanium hydrides such as $GeH_4$, $Ge_2H_6$, $Ge_3H_8$, $Ge_4H_{10}$, $Ge_2H_{12}$, $Ge_6H_{14}$, $Ge_7H_{16}$, $Ge_8H_{18}$, and $Ge_9H_{20}$, and germanium halides (germanium hydride derivatives substituted by halogen atoms) such as $GeF_4$, $(GeF_2)_5$, $(GeF_2)_6$, $(GeF_2)_4$, $Ge_2F_6$, $Ge_3F_8$, $GeHF_3$, $GeH_2F_2$, $GeCl_4$, $(GeCl_2)_5$, $GeBr_4$, $(GeBr_2)_5$, $Ge_2Cl_6$ and $Ge_2Cl_3F_3$.

The materials for supplying halogen atoms X in the third embodiment may include halogens, halides, interhalogen compounds, and halo-substituted hydrocarbon derivatives. Practical examples of halogens are $F_2$, $Cl_2$, $Br_2$ and $I_2$. Practical examples of halides are HF, HCl, HBr and HI. Practical examples of interhalogen compounds are BrF, ClF, $ClF_3$, $BrF_5$, $BrF_3$, $IF_3$, $IF_7$, ICl and IBr. Practical examples of halo-substituted hydrocarbon derivatives are $CF_4$, $CHF_3$, $Ch_2F_2$, $Ch_3F$, $CCl_4$, $CHCl_3$, $CH_2Cl_2$, $CH_3Cl$, $CBr_4$, $CHBr_3$, $CH_2Br_2$, $CH_3Br$, $CI_4$, $CHI_3$, $CH_2I_2$, and $CH_3I$.

The materials for supplying hydrogen atoms H in the third embodiment may include hydrogen gas and also saturated hydrocarbons, ethylenic hydrocarbons, acetylenic hydrocarbons and aromatic hydrocarbons which are used also as materials for introducing carbon atoms (C).

Examples of the material for supplying the electroconductivity controlling substance in the third embodiment are as follows. For supplying atoms of the group III, particularly boron atoms, boron hydrides such as $B_2H_6$, $B_4H_{10}$, $B_5H_9$, $B_5H_{11}$, $B_6H_{10}$, $B_6H_{12}$ and $B_6H_{14}$, as well as boron halides such as $BF_3$, $BCl_{13}$ and $BBr_3$, are suitably used. Materials such as $AlCl_3$, $GaCl_3$, $Ga(CH_3)_3$, $InCl_3$ and $TlCl_3$ are usable for introducing other atoms of the group III.

For supplying atoms of the group V in the third embodiment, particularly phosphorus, phosphorous hydrides such as $PH_3$ and $P_2H_4$ and phosphorous halides such as $PH_4I$, $PF_3$, $PF_5$, $PCl_3$, $PCl_5$, $PBr_3$, $PBr_5$ and $PI_3$ are suitably used. Materials such as $AsH_3$, $AsF_3$, $AsCl_3$, $AsBr_3$, $AsF_5$, $SbH_3$, $SbF_3$, $SbF_5$, $SbCl_3$, $SbCl_5$, $BiH_3$, $BiCl_3$ and $BiBr_3$ are usable for introducing other atoms of the group V.

These materials can be used solely or in combination.

In the process for forming the heat-generating resistance layer described in connection with the third embodiment, the amounts of the silicon atoms, germanium atoms, halogen atoms, hydrogen atoms and the electroconductivity controlling substance contained by the resistance layer 14 to be formed, as well as the characteristics of the resistance layer 14, can be controlled by suitably selecting the factors such as the temperature of the substrate, rates of supply of the material gases, electric discharging power and pressure in the deposition chamber.

When it is desired to obtain a heat-generating resistance layer 14 in which at least one of the silicon atoms, germanium atoms, halogen atoms, hydrogen atoms and the electroconductivity controlling substance have non-uniform thicknesswise distribution, it is preferred that the rate or rates of introduction of at least one of the silicon atoms, germanium atoms, halogen atoms, hydrogen atoms and the electroconductivity controlling substance are varied in relation to time, by valve control means or other suitable means.

The support member temperature is selected to range preferably between 20° and 1500° C., more preferably between 30° and 1200° C., and most preferably between 50° and 1100° C.

The rate of supply of the material gas is suitably selected in accordance with the heat-generating characteristic of the layer and the layer forming speed.

The electric discharge power preferbly ranges between 0.001 and 20 W/cm$^2$, more preferably between 0.01 and 15 W/cm$^2$, and most preferably between 0.05 and 10 W/cm$^2$.

Finally, the pressure in the deposition chamber preferably ranges between $10^{-4}$ to 10 Torr, and more preferably between $10^{-2}$ and 5 Torr.

The resistance layer of the recording head of the third embodiment of the invention, produced by the method described above, posesses characteristics similar to those of diamond. For instance, Vickers hardness of this layer is as high as 1800 to 5000. the formation of the heat-generating resistance layer is facilitated by the inclusion of halogen atoms and hydrogen atoms. At the same time, superior mechanical properties are obtained when silicon atoms are contained. It is to be noted also that the flexibility of the heat-generating resistance layer is improved by addition of germanium atoms to the a-C:(X,H) type material.

The heat-generating resistance layer used in the recording head of the third embodiment of the invention does not necessitate any protective layer thereon because it exhibits a high durability against mechanical impacts, as well as high chemical stability. Therefore, the liquid jet recording head of the invention, which incorporates this heat-generating resistance layer, permits a high efficiency of transmission of heat to the recording liquid in response to the inputted signal, thus affording a high thermal response characteristic. This in turn improves the flying characteristics of the droplets in response to the signals inputted to the recording head.

The third embodiment of the invention, however, does not exclude provision of a protective layer on the heat-generating resistance layer, provided that the protective layer does not significantly impair the response characteristics. In fact, the provision of the protective layer is essential when the recording liquid is electrically conductive, in order to avoid any short circuit of electric current between two electrodes through the liquid.

The electro-thermal transducer of the third embodiment described above has the heat-generating resistance layer formed on the support member and overlain by the electrodes. This, however, is not essential and the arrangement may be such that the electrodes are sandwiched between the support member and the heat-generating resistance layer. FIG. 4 shows a modification in which electrodes 16 and 17 are formed directly on the support member 12 and are overlain by the heat-generating resistance layer 14.

Although the support member 12 in the third embodiment has been explained as being constituted by a single member, the support member 12 used in the invention may be a composite member. FIG. 5 shows an example of such a composite substrate. Namely, this support member has a base portion **12*a* and a surface layer 12*b* formed on the base portion 12*a***.

The base portion **12*a* of the third embodiment may be constituted by the same material as the support member material explained in connection with FIGS. 1 to 3, while the surface layer 12*b* may be formed of a material which exhibits a higher affinity to the resistance layer 14 which is to be formed thereon. Thus, the surface layer 12*b* may be formed of an amorphous material having a matrix of carbon atoms or a suitable known oxide. The surface layer 12*b* can be formed by deposition on the base portion 12*b*** from a suitable material, in the same manner as that in the formation of the heat-generating resistance layer explained hereinabove.

The surface layer **12*b*** of the third embodiment may be a glazing layer of an ordinary glass or, when the base portion is made of a metal, an oxide layer formed by oxidizing the surface of such a metal base portion.

The electrodes 16 and 17 of the third embodiment may be of any known material having the required conductivity, e.g., metals such as Au, Cu, Al, Ag and Ni.

The recording head of the third embodiment of the present invention can be produced by the following process, using an apparatus which is exemplarily shown in FIG. 6 and adapted for forming the heat-generating resistance layer by deposition on the support member surface.

Referring to FIG. 6, the apparatus for forming the heat-generating resistance layer has the following constituents: a deposition chamber 1101; gas cylinders 1102 and 1106; mass-flow controllers 1107 to 1111; inlet valves 1112 to 1116; outlet valves 1117 to 1121; gas cylinder valves 1122 to 1126; outlet pressure gauges 1127 to 1131; an auxiliary valve 1132; a lever 1133; a main valve 1134; a leak valve 1135; a vacuum gauge 1136; a support member 1137 on which the heat-generating resistance layer is to be formed; a heater 1138; a support member supporting means 1139; a high-voltage electric power supply 1140; an electrode 1141; and a shutter 1142. A numeral 1142-1 denotes a target which is adapted to be secured to the electrode 1141 when sputtering is to be conducted.

For obtaining a heat-generating resistance layer of a-C:(X,H), the process may be as follows. The gas cylinder 1102 is charged with $CF_4$ gas (99.9% or higher purity) diluted with Ar gas, while the gas cylinder 1103 is charged with $BF_3$ (99.9% or higher purity) gas also diluted with Ar gas. On the other hand, the gas cylinder 1104 is charged with $H_2$ gas (99.9% or higher purity), while the gas cylinder 1105 is charged with $CHF_3$ gas (99.9% or higher purity) diluted with Ar gas. Before letting the gases in these cylinders flow into the deposition chamber 1101, the operator confirms that the valves 1122 to 1126 of all gas cylinders 1102 to 1106 are closed and that the inlet valves 1112 to 1116, outlet valves 1117 to 1121 and the auxiliary valve 1132 are all opened. Then, the operator opens the main valve 1134 to evacuate the deposition chamber 1101 and associated gas pipes, and, when the reading of the vacuum gauge 1136 has reached $1.5\times10^{-6}$ Torr, closes the auxiliary valve 1132, inlet valves 1112 to 1116 and the outlet valves 1117 to 1121. Then, the valves between the deposition chamber 1101 and the gas cylinders containing the gases to be used are opened, so that these gases are introduced into the deposition chamber 1101.

When the above-mentioned resistance layer is formed by glow discharge method with this apparatus, the process may be as follows.

As the first step, the valve 1122 is opened to allow the $CF_4Ar$ gas to be discharged from the gas cylinder 1102 and the valve 1124 is opened to allow the $H_2$ gas to be discharged from the gas cylinder 1104, while regulating the pressure indicated by the outlet pressure gauges 1127 and 1129 at 1 kg/cm$^2$. Subsequently, the inlet valves 1112 and 1114 are gradually opened to allow the gases to flow into the mass-flow controllers 1107 and 1109. Then the outlet valves 1117, 1119 and the auxiliary valve 1132 are gradually opened so as to introduce the $CF_4/Ar$ gas and the $H_2$ gas into the deposition chamber 1101. Meanwhile, the operator adjusts the mass-flow controllers 1107, 1109 so as to maintain a desired ratio of flow rate between the $CF_4/Ar$ gas and $H_2$ gas, and also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutterr 1142 is opened to initiate a glow discharge within the deposition chamber 1101.

For attaining a non-uniform thicknesswise distribution of halogen atoms and/or hydrogen atoms in the resistance layer made of a-C:(X,H), the opening of the outlet valve 1117 and/or the opening of the outlet valve 1119 is varied manually or by an external driving motor so as to change the flow rate of the $CF_4/Ar$ gas and/or the $H_2$ gas in relation to time along a predetermined curve of changing rate, thereby establishing a thicknesswise variation of the content of F atoms and/or H atoms in the product layer 14.

When the above-mentioned resistance layer is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CHF_3/Ar$ gas is introduced from the cylinder 1105 into the deposition chamber 1101 at a desired flow rate, similarly to the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber, as in the case of the layer formation by glow discharge.

In the formation of the heat-generating resistance layer of a-C:(X,H) by sputtering, non-uniform thicknesswise distribution of the halogen atoms and/or the hydrogen atoms can be attained in the same manner adopted in the layer formation by glow discharge. Namely, the opening of the outlet valve 1120 is varied in the same manner as that in the glow discharge, so as to vary the flow rate of $CHF_3/Ar$ gas in relation to time along a predetermined changing rate curve, thus attaining a thicknesswise variation of F atoms and/or H atoms in the resistance layer 14.

For obtaining a heat-generating resistance layer of a-C:Si:(X,H) using the system shown in FIG. 6, the process may be as follows. The gas cylinder 1102 is charged with $CF_4$ gas (99.9% or higher purity) diluted with Ar gas, while the gas cylinder 1103 is charged with $BF_3$ (99.9% or higher purity) gas also diluted with Ar gas. On the other hand, the gas cylinder 1104 is charged with $SiH_4$ gas (99.9% or higher purity) diluted with Ar gas, while the gas cylinder 1105 is charged with $Si_2H_6$ gas (99.9% or higher purity) diluted with Ar gas. Then, the valves of respective cylinders containing the gases to be introduced into the deposition chamber 1101 are opened to introduce these gases, as in the case of the formation of the resistance layer of a-C:(X,H) type composition.

When the above-mentioned heat-generating resistance layer of a-C:Si:(X,H) type composition is formed by glow discharge method with this apparatus, the process may be as follows.

As the first step, the valve 1122 is opened to allow $CF_4/Ar$ gas to be discharged from the gas cylinder 1102 and the valve 1124 is opened to allow the $SiH_4/Ar$ gas to be discharged from the gas cylinder 1104, while regulating the pressure indicated by the outlet pressure gauges 1127 and 1129 at 1 kg/cm$^2$. Subsequently, the inlet valves 1112 and 1114 are gradually opened to allow the gases to flow into the mass-flow controllers 1107 and 1109. Then the outlet valves 1117, 1119 and the auxiliary valve 1132 are gradually opened so as to introduce the $CF_4/Ar$ gas and the $SiH_4$ gas into the deposition chamber 1101. Meanwhile, the operator adjusts the mass-flow controllers 1107, 1109 so as to maintain a desired ratio of flow rate between the $CF_4/Ar$ gas and $SiH_4/Ar$ gas, and also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform thicknesswise distribution of silicon atoms, halogen atoms and hydrogen atoms in the resistance layer made of a-C:Si:(X,H), the opening of the outlet valve 1117 and/or the opening of the outlet valve 1119 is varied manually or by an external driving motor so as to change the flow rate of the $CF_4/Ar$ gas and/or the $SiH_4/Ar$ gas in relation to time along a predetermined curve of changing rate, thereby establishing a thicknesswise variation of the content of at least one of the Si atoms, F atoms and H atoms in the product layer 14.

When the above-mentioned resistance layer is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CF_4$/Ar gas and the $SiH_4$/Ar gas are introduced into the deposition chamber 1101 at respective desired flow rates, similarly to the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber, as in the case of the layer formation by glow discharge.

In the formation of the heat-generating resistance layer of a-C:Si:(X,H) by sputtering, non-uniform thicknesswise distribution of at least one of the silicon atoms, halogen atoms and the hydrogen atoms can be attained in the same manner adopted in the layer formation by glow discharge. Namely, the opening of the outlet valve 1117 and/or 1119 is varied in the same manner as that in the glow discharge, so as to vary the flow rate of $CF_4$/Ar gas and/or the flow rate of the $SiH_4$/Ar gas in relation to time along a predetermined changing rate curve, thus attaining a thicknesswise variation of at least one of Si atoms, F atoms and H atoms in the resistance layer 14.

For obtaining a heat-generating resistance layer of a-C:Ge:(X,H) using the system shown in FIG. 6, the process may be as follows. The gas cylinder 1102 is charged with $CF_4$ gas (99.9% or higher purity) diluted with Ar gas, while the gas cylinder 1103 is charged with $GeH_4$ gas (99.9% or higher purity) diluted with Ar gas. On the other hand, the gas cylinder 1104 is charged with $BF_3$ gas (99.9% or higher purity) diluted with Ar gas. Then, the valves between the deposition chamber 1101 and the respective cylinders containing the gases to be introduced into the deposition chamber 1101 are opened to introduce these gases, as in the case of the formation of the resistance layer of a-C:(X,H) type composition.

When the above-mentioned heat-generating resistance layer of a-C:Ge:(X,H) type composition is formed by glow discharge method with this apparatus, the process may be as follows.

As the first step, the valve 1122 is opened to allow the $CF_4$/Ar gas to be discharged from the gas cylinder 1102 and the valve 1123 is opened to allow the $GeH_4$/Ar gas to be discharged from the gas cylinder 1103, while regulating the pressure indicated by the outlet pressure gauges 1127 and 1128 at 1 kg/cm$^2$. Subsequently, the inlet valves 1112 and 1113 are gradually opened to allow the gases to flow into the mass-flow controllers 1107 and 1108. Then the outlet valves 1117, 1118 and the auxiliary valve 1132 are gradually opened so as to introduce the $CF_4$/Ar gas and the $GeH_4$/Ar gas into the deposition chamber 1101. Meanwhile, the operator adjusts the mass-flow controllers 1107, 1108 so as to maintain a desired ratio of flow rate between the $CF_4$/Ar gas and $GeH_4$/Ar gas, and also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform thicknesswise distribution of at least one of germanium atoms, halogen atoms and hydrogen atoms in the resistance layer made of a-C:Ge:(X,H), the opening of the outlet valve 1117 and/or the opening of the outlet valve 1118 is varied manually or by an external driving motor so as to change the flow rate of the $CF_4$/Ar gas and/or the $GeH_4$/Ar gas in relation to time along a predetermined curve of changing rate, thereby establishing a thicknesswise variation of the content of at least one of the Ge atoms, F atoms and H atoms in the product layer 14.

When the above-mentioned resistance layer is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CF_4$/Ar gas and the $GeH_4$/Ar gas are introduced from the gas cylinders 1102 and 1103 into the deposition chamber 1101 at respective desired flow rates, similarly to the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber 1101, as in the case of the layer formation by glow discharge.

In the formation of the heat-generating resistance layer of a-C:Ge:(X,H) by sputtering, non-uniform thicknesswise distribution of at least one of the germanium atoms, halogen atoms and the hydrogen atoms can be attained in the same manner adopted in the layer formation by glow discharge. Namely, the opening of the outlet valve 1117 and/or 1118 is varied in the same manner as that in the glow discharge, so as to vary the flow rate of $CF_4$/Ar gas and/or the flow rate of the $GeH_4$/Ar gas in relation to time along a predetermined changing rate curve, thus attaining a thicknesswise variation of at least one of Ge atoms, F atoms and H atoms in the resistance layer 14.

For obtaining a heat-generating resistance layer of a-C:Si:Ge:(X,H) using the system shown in FIG. 6, the process may be as follows. The gas cylinder 1102 is charged with $CH_4$ gas (99.9% or higher purity) diluted with Ar gas, while the gas cylinder 1103 is charged with $SiH_4$ gas (99.9% or higher purity) diluted with Ar gas. On the other hand, the gas cylinder 1104 is charged with $GeF_4$ gas (99.9% or higher purity) diluted with Ar gas, while the gas cylinder 1105 is charged with $SiF_4$ gas (99.9% or higher purity) diluted with Ar gas. Finally, the gas cylinder 1106 is charged with $GeH_4$ gas (99.9% or higher purity) diluted with Ar gas. Then, the valves between the deposition chamber 1101 and the respective cylinders containing the gases to be introduced into the deposition chamber 1101 are opened to introduce these gases, as in the case of the formation of the resistance layer of a-C:(X,H) type composition.

When the above-mentioned heat-generating resistance layer of a-C:Si:Ge:(X,H) type composition is formed by glow discharge method with this apparatus, the process may be as follows.

As the first step, the valve 1122 is opened to allow the $CH_4$/Ar gas to be discharged from the gas cylinder 1102 and the valve 1123 is opened to allow the $SiH_4$/Ar gas to be discharged from the gas cylinder 1103 and also the valve 1124 is opened to allow the $GeF_4$/Ar gas to be discharged from the gas cylinder 1104, while regulating the pressure indicated by the outlet pressure gauges 1127, 1128 and 1129 at 1 kg/cm$^2$. Subsequently, the inlet valves 1112, 1113 and 1114 are gradually opened to allow the gases to flow into the mass-flow controllers 1107, 1108 and 1109. Then the outlet valves 1117, 1118 and 1119 and also the auxiliary valve 1132 are gradually opened so as to introduce the $CH_4$/Ar gas, $SiH_4$/Ar gas and the $GeF_4$/Ar gas into the deposition chamber 1101. Meanwhile, the operator adjusts the mass-flow controllers 1107, 1108 and 1109 so as to maintain a desired ratio of flow rate among the $CH_4$/Ar gas, $SiH_4$/Ar gas and $GeF_4$/Ar gas, and also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform thicknesswise distribution of at least one of silicon atoms, germanium atoms, halogen atoms and hydrogen atoms in the resistance layer made of a-C:Si:Ge:(X,H), the opening of at least one of the outlet valves 1117, 1118 and 1119 is varied manually or by an external driving motor so as to change the flow rate of at least one of the $CH_4$/Ar, $SiH_4$/Ar gas and $GeF_4$/Ar gas in relation to time along a predetermined curve of changing rate, thereby establishing a thicknesswise variation of the content of at least one of the Si atoms, Ge atoms, F atoms and H atoms in the product layer 14.

When the above-mentioned resistance layer is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CH_4$/Ar gas, $SiH_4$/Ar gas and the $GeF_4$/Ar gas are introduced from the gas cylinders 1102, 1103 and 1104 into the deposition chamber 1101 at respective desired flow rates, similar to the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber 1101, as in the case of the layer formation by glow discharge.

In the formation of the heat-generating resistance layer of a-C:Si:Ge:(X,H) by sputtering, non-uniform thicknesswise distribution of at least one of the silicon atoms, germanium atoms, halogen atoms and the hydrogen atoms can be attained in the same manner adopted in the layer formation by glow discharge. Namely, the opening of at least one of the outlet valves 1117, 1118 and 1119 is varied in the same manner as that in the glow discharge, so as to vary the flow rate of at least one of the $CH_4$/Ar gas, $SiH_4$/Ar gas and $GeF_4$/Ar gas in relation to time along a predetermined changing rate curve, thus attaining a thicknesswise variation of at least one of Si atoms, Ge atoms, F atoms and H atoms in the resistance layer 14.

Examples of processes for forming a heat-generating resistance layer of a-C:(X,H)(p,n) system, as a representative of the heat-generating resistance layer containing electroconductivity controlling substance, will be explained hereinunder. It is to be understood, however, that the methods explained hereinunder are equally applicable to other types of material containing the electroconductivity controlling substance, i.e., a-C:Si:(X,H)(p,n), a-C:Ge:(X,H)(p,n) and a-C:Si:Ge:(X,H)(p,n) which are obtained by introducing the electroconductivity controlling substance into the foregoing materials of the heat-generating resistance layer, i.e., a-C:Si:(X,H), a-C:Ge:(X,H) and a-C:Si:Ge:(X,H). The processes for these materials, therefore, are not described in this specification.

When the heat-generating resistance layer of a-C:(X,H)(p,n) type composition is formed by using the system shown in FIG. 6, the process is basically as follows. the gas cylinder 1102 is charged with $CF_4$ gas (99.9% or higher purity) diluted with Ar gas, while the gas cylinder 1103 is charged with $Ph_3$ gas (99.9% or higher purity) also diluted with Ar gas. Similarly, the cylinder 1104 is charged with $B_2H_6$ gas (99.9% or higher purity) diluted with Ar gas. Before letting the gases in these cylinders flow into the deposition chamber 1101, the operator confirms that the valves 1122 to 1126 of all gas cylinders 1102 to 1106 are closed and that the inlet valves 1112 to 1116, outlet valves 1117 to 1121 and the auxiliary valve 1132 are all opened. Then, the operator opens the main valve 1134 to evacuate the deposition chamber 1101 and associated gas pipes, and, when the reading of the vacuum gauge 1136 has reached $1.5\times10^{-6}$ Torr, closes the auxiliary valve 1132, inlet valves 1112 to 1116 and the outlet valves 1117 to 1121. Then, the valves between the deposition chamber 1101 and the gas cylinders containing the gases to be used are opened, so that these gases are introduced into the deposition chamber 1101.

When the resistance layer of a-C:(X,H)(p,n) is formed by glow discharge method with this apparatus, the process may be as follows.

As the first step, the valve 1122 is opened to allow the $CF_4$/Ar gas to be discharged from the gas cylinder 1102, and the valve 1123 is opened to allow the $PH_3$/Ar gas to be discharged from the gas cylinder 1103, while regulating the pressures indicated by the outlet pressure gauges 1127 and 1128 at 1 kg/cm$^2$. Subsequently, the inlet valves 1112 and 1113 are gradually opened to allow the gases to flow into the mass-flow controllers 1107 and 1108. Then the outlet valves 1117, 1118 and the auxiliary valve 1132 are gradually opened so as to introduce the $CF_4$/Ar gas and the $PH_3$/Ar gas into the deposition chamber 1101. Meanwhile, the operator adjusts the mass-flow controllers 1107, 1108 so as to maintain a desired ratio of flow rate between the $CF_4$/Ar gas and the $PH_3$/Ar gas and adjusts also the opening of the main valve 1134 while making reference to the reading of the vacuum gauge 1136, so as to maintain a desired pressure in the deposition chamber 1101. Then, after energizing the heater 1138 so as to heat the support member 1137 on the supporting means 1139 up to a desired temperature, the shutter 1142 is opened to initiate a glow discharge within the deposition chamber 1101.

For attaining a non-uniform distribution of at least one of halogen atoms, hydrogen atoms and the electroconductivity controlling substance in the resistance layer made of a-C:(X,H)(p,n), the opening of the outlet valve 1117 and/or of the outlet valve 1118 is varied manually or by an external driving motor so as to change the flow rate of the $CF_4$/Ar gas and/or of the $PH_3$/Ar gas in relation to time along predetermined curves of changing rate, thereby establishing a thicknesswise variation of the content of at least one of the F atoms, H atoms and the electroconductivity controlling substance in the product layer 14.

When the resistance layer of a-C:(X,H)(p,n) is formed by sputtering method with the apparatus explained before, the process may be as follows.

A piece of graphite 1142-1 of a high purity is beforehand set as a target on the electrode 1141 which is adapted to be supplied with a high voltage from the high-voltage electric power supply 1140. Then, the $CF_4$/Ar gas and the $PH_3$/Ar gas are introduced from the cylinders 1102 and 1103 into the deposition chamber 1101 at desired flow rates, as in the case of the layer formation by glow discharge. Then, the shutter 1142 is opened and the power supply 1140 is turned on, whereby a sputtering is effected on the target 1142-1. Meanwhile, the support member 1137 is heated to and maintained at the desired temperature by the heater 1138, and the opening of the main valve 1134 is adjusted to maintain the desired pressure in the deposition chamber, as in the case of the layer formation by glow discharge.

For attaining a non-uniform thicknesswise distribution of at least one of the halogen atoms, hydrogen atoms and the electroconductivity controlling substance in the resistance layer made of a-C:(X,H)(p,n), the opening of the outlet valve 1117 and/or of the outlet valve 1118 is varied so as to change the flow rate of the $CF_4$Ar gas and/or of the $PH_3$/Ar gas in relation to time along predetermined curves of changing rate, thereby establishing a thicknesswise variation of the content of at least one of the F atoms, H atoms and the electroconductivity controlling substance in the product layer 14, as in the case of the layer formation by glow discharge.

The electro-thermal transducer of the type shown in FIGS. 1 to 3, intended for use in the liquid jet recording head of the third embodiment of the invention, is produced by forming the heat-generating resistance layer on the support member in the manner described above, forming conductive layers, e.g., an Au layer and an Al layer, for forming the electrodes on the heat-generating resistance layer, and effecting patterning of the conductive layers and the heat-generating resistance layer by known photolithographic techniques. If necessary, a protective layer is formed to cover the heat-generating resistance layer and the electrodes.

On the other hand, the electro-thermal transducer of the type shown in FIG. 4, intended for use in the liquid jet recording head of the third embodiment of the invention, is produced by forming a conductive layer beforehand on the substrate, effecting patterning of the conductive layer by means of photolithographic techniques, and forming the heat-generating resistance layer by a glow discharge or sputtering as explained before.

The top plate of the recording head of the third embodiment is made of a material similar to that of the substrate. The channels are formed by a suitable method such as mechanical cutting by a microcutter, chemical etching and so forth. When a photosensitive glass is used as the material, the channels can be formed by exposure in the desired pattern followed by development.

The joining of the top plate to the support member in the third embodiment is carried out by bonding through an adhesive, after obtaining sufficient positional alaignment. Some kinds of material of the top plate permit the joining of the top plate to the support member by fusion welding.

In the third embodiment of the liquid jet recording head described above, the outlet 26 for the recording liquid is formed in one end of each channel 22 which defines the liquid passage in the top plate 20, as typically shown in FIG. 7. This position of the recording liquid outlet, however, is not exclusive and the recording liquid outlet 26 may be formed to open in the surface of the top plate 20, as shown in FIG. 8. In this case, the end openings of each channel defining the liquid passage may be utilized as a recording liquid inlet through which the recording liquid is introduced into the liquid passage, and the recording liquid is jetted through the outlet 26 as indicated by an arrow Y. In this case, needless to say, each channel may be closed at one end thereof so that the liquid is introduced through the other open end of the channel.

A modification of the liquid jet recording head of the third embodiment will be explained hereinunder.

Referring to FIG. 9 which is a sectional view taken along the line IX—IX of FIG. 8, the top plate 20 is held in contact at its portions other than the channels with the support member of the electro-thermal transducer. Therefore, the heating sections 24 formed along the respective channels 22 are isolated from one another by the barriers 30 which are constituted by the portions of the top plate 20 contacting the substrate. In the arrangement shown in FIG. 9, the heat-generating regions 18 are provided in respective channels near the outlets 26.

FIGS. 10 and 12 are sectional views which represent different examples of the recording head of the third described embodiment, taken along the line IX—IX of FIG. 8.

In the recording head shown in FIG. 10, the barriers 30 do not contact the support member 12 so that the heating sections 24 corresponding to the heat generating regions 18 are in communication with one another. That is, the liquid passages are not independent as shown in FIG. 9 but instead the adjacent liquid passages are in communication with each other.

In the recording head shown in FIG. 11, the barriers 30 are not formed in the top plate 20 but are formed in the substrate. Therefore, the heating sections 24 are in communication with each other, as in the case of the recording head shown in FIG. 10. Thus, adjacent liquid passages are in communication with each other also in this case.

The recording head shown in FIG. 12 does not have any barrier, unlike the recording heads shown in FIGS. 10 and 11. In this case, therefore, the liquid passage is constituted by an ink chamber which is common to all the heating sections 24.

Various examples shown in FIGS. 9 to 12, which represent modifications of the third embodiment of the recording head shown in FIG. 8, are obtainable also with the liquid jet recording head of the type shown in FIG. 7.

The provision of the barriers 30 is not essential to the third embodiment. Namely, the barriers can be dispensed with provided that the reach and aim of the flying droplets do not exceed predetermined tolerances, although it is true that the direction, velocity and rate of the liquid jet may be affected by the liquid stagnant in adjacent liquid outlets. The provision of the barriers, however, is preferred in order to reduce mutual interference between adjacent liquid outlets and to improve the efficiency of conversion of the energy. It will be clear to those skilled in the art that the barriers may be formed integrally with the top plate or may be formed as independent members and then suitably secured to the top plate. The flat top plate may be formed of the same material as the top plate with channels explained before. Hardened layers of photosensitive resin can be used as the material of the barriers and the top plate.

As will be seen from the foregoing description, the third embodiment of the present invention provides a liquid jet recording head incorporating an electro-thermal transducer having a heat-generating resistance layer made of an amorphous material containing halogen atoms and hydrogen atoms in the matrix of carbon atoms, as well as a liquid jet recording system which incorporates this recording head. The heat-generating resistance layer of the above-mentioned amorphous material exhibits high chemical stability, high resistance both to the electrochemical reaction and oxidation, and superior resistance to mechanical impact and heat. Thus, the liquid jet recording head and system in accordance with the invention have various superior characteristics, particularly high thermal response characteristics and the durability against repeated use. In addition, the invention permits an easy formation of the heat-generating resistance layer. Consequently, the present invention realizes a liquid jet recording with high reliability and high frequency response characteristic. Furthermore, the use of the amorphous material containing silicon atoms ensures a high mechanical strength of the electro-thermal transducer, while the inclusion of the germanium atoms in the amorphous material provides a superior flexibility of the heat-generating resistance layer. It is to be understood also that, when both the silicon atoms and the germanium atoms are included simultaneously, the resistance against chemicals and flexibility are improved advantageously. In addition, when the electroconductivity controlling substance is included, the controllability of the resistance value of the heat-generating resistance layer is improved.

Furthermore, since at least one of the silicon atoms, germanium atoms, halogen atoms, hydrogen atoms and the electroconductivity controlling substance can have a non-uniform distribution in the thicknesswise direction of the heat-generating resistance layer, it is easy to realize various desired characteristics such as heat-accumulation characteristic, heat-radiation characteristics, affinity between the support member and the resistance layer, and resistance to chemical reaction.

Practical examples of the liquid jet recording head in accordance with the invention will be described hereinunder.

Examples of the Third Embodiment:

Examples (Nos. P-49 to P-104, S-9 to S-14) of the arrays of the electro-thermal transducers for use in the liquid jet recording head of the third embodiment of the invention, as well as a comparison example, were prepared in accordance with the following methods.

A glass #7059 produced by Corning Glass Works was used as the material of the substrate. A surface layer of heat-oxidized $SiO_2$ having a thickness of 5 μm was formed as a heat accumulating layer. In each case, a heat-generating resistance layer and electrodes were formed on the substrate, and a protective layer was formed as meeded. The layered structures composed of the heat-generating resistance layer, electrodes and protective layer were prepared in the following three types G, H and I.

Type G

The heat-generating resistance layer was formed on the support member by means of the deposition system explained before in connection with FIG. 6. The conditions of the deposition were as shown in Tables 21, 22, 24, 25, 27, 28, 30, 32, 34, 36, 38, 40 and 42. More specifically, examples shown in Tables 21, 24, 27, 30, 32, 34, 36, 38, 40 and 42 were prepared by glow discharge, while the examples shown in Tables 22, 25 and 28 and comparison example were prepared by sputtering. In the sputtering for the preparation of examples shown in Tables 22 and 25, graphite (99.9% purity) was used as the target material, whereas the sputtering for the preparation of the comparison example employed $HfB_2$ as the target material.

The comparison example prepared under the same conditions was used for the comparison in each of a first case (a-C:(X,H)), a second case (a-C:(X,H)) with non-uniform X atoms and/or H atoms distribution, a third case (a-Ci:Si:(X,H)), a fourth case (a-Ci:Si:(X,H)) with non-uniform distribution of at least one of Si atoms, X atoms and H atoms, a fifth case (a-C:Ge:(X,H)), a sixth case (a-C:Ge:(X,H) with non-uniform distribution of at least one of Ge atoms, X atoms and H atoms, a seventh case (a-Ci:Si:Ge:(X,H)), an eighth case (a-C:Si:-Ge:(X,H)) with non-uniform distribution of at least one of Si atoms, Ge atoms, X atoms and H atoms, and other cases where the electroconductivity controlling substance is added to the respective amorphous compositions mentioned above.

During the deposition, the gas flow rates and other conditions were maintained as shown in Tables 21, 22, 24, 25, 27, 28, 30, 32, 34, 36, 38, 40 and 42, so that heat-generating resistance layers were formed to have thicknesses as shown in Tables 23, 26, 29, 31, 33, 35, 37, 39, 41 and 43.

Then, an Al layer was formed on the heat-generating resistance layer by an electron beam method, and a resist pattern was formed by a photolithographic technique. Using this resist pattern, etching was conducted on the Al layer so as to form a plurality of pairs of electrodes. Then, another resist pattern was formed by a photolithographic technique, and unnecessary portions of the heat-generating resistance layer were removed by etching with an etching liquid of a HF (hydrofluoric acid) system. Consequently, a plurality of heat-generating resistance elements, each having a heat-generating region constituted by a portion of the heat-generating resistance layer of 40 μm×200 μm and electrodes deposited thereon, were formed. The pitch of the heat-generating regions was 8 regions per millimeter.

Subsequently, a layer of photosensitive polyimide (commercial name Photoneece supplied by Tokyo Oka Kogyo) was formed by spin coating method. After a pre-baking conducted at 80° C. for 1 hour, the heat-generating element was subjected to an exposure which was conducted by the use of an aligner, and then to a development, so as to form an aperture or window in each heat generating region. Finally, the heat-generating element was post-baked for 30 minutes at 140° C. and for 1 hour at 400° C., whereby an array of the electro-thermal transducers was completed.

The resistance values of the heat generating regions in various electro-thermal transducers produced by the method described above are shown in Tables 23, 26, 29, 31, 33, 35, 37, 39, 41 and 43. The photosensitive polyimide was used for the purpose of preventing any electrolysis of the Al electrode in the ink.

The thus completed array of electro-thermal transducers is shown in schematic perspective view in FIG. 13 and in schematic cross-sectional view in FIG. 14. In these Figures, a reference numeral 28 designates a polyimide layer.

Type H

A heat-generating resistance layer could be formed on each support member in the same manner as Type G, under the depositing conditions as shown in Tables 21, 22, 24, 25, 27, 28, 30, 32, 34, 36, 38, 40 and 42. During the deposition, the gas flow rates and other factors were controlled as shown in Tables 21, 22, 24, 25, 27, 28, 30, 32, 34, 36, 38, 40, and 42, so that heat-generating resistance layers were formed to have various thicknesses as shown in Tables 23, 26, 29, 31, 33, 35, 37, 39, 41 and 43. Then, an Au layer was formed on the heat-generating resistance layer by an electron beam method, and a resist pattern was formed by a photolithographic technique. Using this resist pattern, etching was conducted on the Au layer so as to form a plurality of pairs of electrodes. Then, another resist pattern was formed by a photolithographic technique, and unnecessary portions of the heat-generating resistance layer were removed by etching with an etching liquid of a HF system. Consequently, a plurality of heat-generating resistance elements, each having a heat-generating region constituted by a portion of the heat-generating resistance layer of 40 μm×200 μm and electrodes deposited thereon, were formed. The pitch of the heat-generating regions was 8 regions per millimeter. The resistance values of the heat generating regions in various electro-thermal transducers produced by the method described above are shown in Tables 23, 26, 29, 31, 33, 35, 37, 39, 41 and 43, as in the case of Type G. The construction of thus completed array of electro-thermal transducers is shown in schematic perspective view in FIG. 15 and in schematic cross-sectional view in FIG. 16.

Type I

An Al layer was formed on the support member by an electron beam method on which was formed a resist pattern by photolithographic technique. Using this resist pattern, a plurality of pairs of electrodes were formed on the Al layer. Then, a heat-generating resistance layer was formed on the Al layer. This could be done by the same method as that in Type G. The deposition conditions were maintained as shown in Tables 21, 22, 24, 25, 27, 28, 30, 32, 34, 36, 38, 40 and 42, so that the heat-generating resistance layer was formed in various thicknesses as shown in Tables 23, 26, 28 and 30. Then, another resist pattern was formed by a photolithographic technique and the unnecessary portion of the heat-generating resistance layer was removed by an etching liquid of an HF system. Consequently, heat-generating resistance elements, each having a heat-generating region constituted by a portion of the heat-generating resistance layer of 40 μm×200 μm and electrodes deposited thereon, were formed. The pitch of the heat-generating regions was 8 regions per millimeter. In this case, the Al electrodes are effectively protected by the heat-generating resistance layer, so that it is not necessary to form a protective layer for the electrodes. The resistance values of the heat-generating regions of the electro-thermal transducers formed by the method described above are shown in Tables 23, 26, 29, 31, 33, 35, 37, 39, 41 and 43, as is the case of Type G. The construction of the thus formed array of electro-thermal transducers is shown in schematic perspective view in FIG. 17 and in schematic cross-sectional view in FIG. 18.

Liquid jet recording heads according to the third embodiment were produced by making use of the electro-thermal transducers which were prepared according to the various methods described above. Broadly, two types of recording heads were produced: namely, type V constructed as shown in FIG. 7 and type VI constructed as shown in FIG. 8. The recording head of type V was produced in two different processes. The recording head produced by a first process will be referred to as Type V-1, while the recording head produced by a second method will be referred to as Type V-2.

The production processes were as follows.

Type V-1

Referring to FIG. 19, a top plate 20 with channels was formed from a glass sheet 40. A plurality of channels 22 which constitute liquid passges, each being 40 μm wide and 40 μm deep, and a groove 42 which constituted a common ink chamber communicating with the liquid passages were formed by a microcutter in the glass sheet 40 thus completing the top plate 20 with channels.

The top plate 20 was then adjoined to each of the array of electro-thermal transducers formed by the methods described before, in such a manner that the heat-generating regions in the electro-thermal transducers are aligned with the channels 22, thus forming the liquid passages and the common ink chamber. Then, ink inlet tubes 44 for introducing an ink into the common ink chamber were connected to the assembly, thus completing an integral recording head 46.

Type V-2

Each array of electro-thermal transducers was coated with a photosensitive layer 50 which was a layer produced by Tokyo Oka Kogyo under the commercial name of Ordyl. The coated element was then exposed by an aligner and subjected to development so that the layer 50 was formed into a predetermined pattern. Then, a glass sheet 54, which was also coated with a photosensitive layer 52 of the same material as layer 50, was adhered to the patternized layer on the electro-thermal transducer. The thus formed member was then cut mechanically such as by dies cutting so as to expose the liquid outlets 26. Then, ink introduction tubes 44 for introducing an ink from a source (not shown) were connected to the cut assembly, whereby an integral recording head 56 was formed as shown in schematic perspective view in FIG. 21.

Type VI

As a first step of the production process, a top plate 20 was formed to have liquid outlets 26 in its major surface. More specifically, the top plate 20 was formed from a stainless steel sheet having channels formed therein by, for example, etching. A pattern of a photosensitive layer, produced by Hitachi Chemical Co., Ltd. under the commercial name of PHT-145FT-50, was formed on the stainless steel sheet, and an Ni-plating layer was formed by an electroforming method. It will be seen that the liquid outlets 26 were formed at positions where the photosensitive layer pattern exists. The thus formed top plate 20 was adhered by an adhesive to the array of electro-thermal transducers in such a manner that the heat-generating regions are aligned with the liquid outlets 26. The electro-thermal transducer was beforehand perforated by mechanical working to permit the supply of the ink into the common ink chamber in the top plate 20. Then, an ink introduction tube 60 for introducing an ink from a source (not shown) was connected to the underside of the electro-thermal transducer, whereby an integral recording head 62 was formed as shown in schematic perspective view in FIG. 22. In FIG. 22, a numeral 64 denotes recesses which provide barriers between adjacent liquid outlets. Thus, the recording head of the Type VI can have either the construction shown in FIG. 9 or the construction shown in FIG. 10, according to the design of the barriers, or even the construction shown in FIG. 12 which is devoid of barriers.

Thus, three types G, H and I of construction of the array of electro-thermal transducers and three types V-1, V-2 and VI of construction of the recording head according to the third embodiment are available, and various combinations are possible among these types.

Amongst these various combinations, a combination between the electro-thermal transducer of type G and the recording head construction of type V-1 was subjected to a durability test which will be explained hereinunder with reference to evaluation shown in Tables 23, 26, 29, 31, 33, 35, 37, 39, 41 and 43.

A lead board was attached to a recording head constituted by the construction of type G and the construction of type V, so as to complete a recording head unit. The lead board had electrode leads (not shown) connected to independent electrodes 17 corresponding to the respective heat-generating regions and an electrode lead (not shown) to the electrode 16 common to all heat-generating regions.

A aliquid jet recording system according to the third embodiment of the invention as shown in schematic perspective view in FIG. 23 was assembled by using this recording head unit. As will be seen from this Figure, the liquid jet recording system employs the following parts: the recording head unit 70; a carriage 72 carrying the recording head unit 70; guide members 74 for guiding the reciprocatory motion of the carriage 72; and a platen 76. A numeral 78 denotes a recording medium such as a print paper held on the platen 76.

The recording head unit 70 is so oriented that the recording liquid outlets are directed in the direction of an arrow Z so that the droplets of the recording liquid may fly in the direction of the arrow Z so as to be deposited in the form of dots on the recording medium 78 on the platen 76. Main scanning is conducted by driving the recording head unit 70 along the guide members 74 by a suitable driving means, while auxiliary scanning is conducted by causing the platen 76 to rotate about its axis of the shaft 77 by another suitable driving means, whereby the imputted information is recorded by the liquid dots on the recording medium 78.

A test was conducted using this liquid jet recording system under the following conditions.

Rectangular-wave pulses were applied to the heat-generating regions. The pulse width was 10 μsec and the period was 200 μsec. The level of the voltage of the pulse was selected to be 1.2 times as high as the minimum boiling temperature at which the generation of void in the recording liquid is commenced. Thus, the voltage of the pulse was selected to be 24 V when the minimum voltage to produce boiling temperature was 20 V. The composition of the recording liquid used was as follows:

| | |
|---|---|
| Water | 68 weight parts |
| DEG (diethylene glycol) | 30 weight parts |
| Black dye | 2 weight parts |

The test operation of the recording system of the third embodiment was carried out by using the recording liquid specified above and under the conditions explained above, and the durability was examined for various examples, the result of which is shown in Tables 23, 26, 29, 31, 33, 35, 37, 39, 41 and 43. The evaluation of the durability was made by counting the number of electric pulses sustained by the recording head. The marks "o" and "x" appearing in these Tables represent, respectively, that the recording head could withstand $10^9$ or more repetitional cycles of pulses and that the recording head could withstand only $10^6$ cycles or less.

From these Tables, it will be seen that the liquid jet recording head according to the third embodiment of the present invention exhibits superior durability and recording characteristic over the comparison example. Although the result of the test conducted with the combination between type G and type V-1 was specifically described, it is to be understood that similar superiority of the liquid jet recording head of the third embodiment of the invention was confirmed also with other combinations of types.

Various examples of the liquid jet printing head of the third embodiment of the invention were prepared together with some comparison examples, and conditions of deposition for forming the heat-generating resistance layers, thicknesses of the layers, resistance values and results of evaluation are summarized in Tables 21 to 30. Examples P-49, P-50, P-51, P-52, S-9 and S-10 appearing in Tables 21 and 23 are those which have resistance layers of a-C:(X,H) type composition. Examaples P-53, P-54, P-55, P-56, P-57, P-58, P-59, P-60, S-11 and S-12 appearing in Tables 24 to 26 are those which have resistance layers of a-C:(X,H) type composition with non-uniform distribution of atoms X and/or atoms H. Examples P-61, P-62, P-63, P-64, S-13 and S-14 appearing in Tables 27 to 29 are those which have resistance layers of the a-C:Si:(X,H) type composition. Examples P-65, P-66, P-67 and P-68 appearing in Tables 30 and 31 are those which have resistance layers of the a-C:Si:(X,H) type construction with non-uniform distribution of at least one of Si atoms, X atoms and H atoms. Examples P-69, P-70, P-71 and P-72 appearing in Tables 32 and 33 are those which have resistance layers of a-C:Ge:(X,H) type composition. Examples P-73, P-74, P-75, P-76, P-77, P-78, P-79 and P-80 appearing in Tables 34 and 35 are those which have resistance layers of a-C:Ge:(X,H) type construction with non-uniform distribution of at least one of Ge atoms, X atoms and H atoms. Examples P-81, P-82, P-83 and P-84 appearing in Tables 36 and 37 are those which have resistance layers of a-C:Si:-Ge:(X,H) type composition. Examples P-85, P-86, P-87, P-88, P-89, P-90, P-91 and P-92 appearing in Tables 38 and 39 are those which have resistance layers of a-C:Si:-Ge:(X,H) type composition with non-uniform distribution of at least one of Si atoms, Ge atoms, X atoms and H atoms with non-uniform distribution of at least one of Ge atoms, X atoms and H atoms. Examples P-93, P-94, P-95 and P-96 appearing in Tables 40 and 41 are those which have resistance layers of a-C::(X,H)(p,n) type composition. Finally, Examples P-97, P-98, P-99, P-100, P-101, P-102, P-103 and P-104 appearing in Tables 42 and 43 are those which have resistance layers of a-C:(X,H)(p,n) type composition, with non-uniform distribution of at least one of X atoms, H atoms and the electroconductivity controlling substance.

As stated before, the same comparison example is shown in all Tables. In the following tables, the "Substrate" is the support member.

TABLE 21

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| P-49 | $CF_4/Ar$ | 0.5 | 50 | 0.8 | 350 | glass |
| | $H_2$ | 1 | 1 | | | |
| P-50 | $C_2F_6/Ar$ | 0.5 | 50 | 1.5 | 350 | glass |
| | $H_2$ | 1 | 1 | | | |
| P-51 | $CF_4/Ar$ | 0.5 | 50 | 0.8 | 350 | Si |
| | $H_2$ | 1 | 1 | | | |
| P-52 | $C_2F_6/Ar$ | 0.5 | 50 | 1.5 | 350 | Si |
| | $H_2$ | 1 | 1 | | | |

TABLE 22

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| S-9 | $CHF_3/Ar$ | 0.1 | 20 | 5 | 350 | glass |
| S-10 | $CHF_3/Ar$ | 0.1 | 20 | 5 | 350 | Si |
| Reference example | Ar | 1 | 20 | 1.5 | 200 | Si |

TABLE 23

| Example No. | Thickness (Å) | Resistance (Ω) | Durability |
|---|---|---|---|
| P-49 | 1000 | 205 | o |
| P-50 | 1000 | 205 | o |
| P-51 | 1000 | 205 | o |
| P-52 | 1000 | 205 | o |
| S-9 | 1000 | 205 | o |
| S-10 | 1000 | 205 | o |
| Reference example | 1500 | 120 | x |

TABLE 24

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| P-53 | $CF_4/Ar$ | 0.5 | 50 | 0.8 | 350 | glass |
| | $H_2$ | 1 | 2 → 1 | | | |
| P-54 | $C_2F_6/Ar$ | 0.5 | 50 | 1.5 | 350 | glass |
| | $H_2$ | 1 | 2 → 1 | | | |
| P-55 | $CF_4/Ar$ | 0.5 | 50 | 0.8 | 350 | glass |
| | $H_2$ | 1 | 1 → 2 | | | |
| P-56 | $C_2F_6/Ar$ | 0.5 | 50 | 1.5 | 350 | glass |
| | $H_2$ | 1 | 1 → 2 | | | |
| P-57 | $CF_4/Ar$ | 0.5 | 50 | 0.8 | 350 | Si |
| | $H_2$ | 1 | 1 → 2 | | | |
| P-58 | $C_2F_6/Ar$ | 0.5 | 50 | 1.5 | 350 | Si |
| | $H_2$ | 1 | 1 → 2 | | | |
| P-59 | $CF_4/Ar$ | 0.5 | 50 | 0.8 | 350 | Si |
| | $H_2$ | 1 | 2 → 1 | | | |
| P-60 | $C_2F_6/Ar$ | 0.5 | 50 | 1.5 | 350 | Si |
| | $H_2$ | 1 | 2 → 1 | | | |

TABLE 25

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| S-11 | $CHF_3/Ar$ | 0.1 | 20 → 10 | 5 | 350 | glass |
| S-12 | $CHF_3/Ar$ | 1 | 20 → 10 | 5 | 350 | Si |
| Reference example | Ar | 1 | 20 | 1.5 | 200 | Si |

TABLE 26

| Example No. | Thickness (Å) | Resistance (Ω) | Durability |
|---|---|---|---|
| P-53 | 1000 | 230 | o |
| P-54 | 1000 | 230 | o |
| P-55 | 1000 | 230 | o |
| P-56 | 1000 | 230 | o |
| P-57 | 1000 | 230 | o |
| P-58 | 1000 | 230 | o |
| P-59 | 1000 | 230 | o |
| P-60 | 1000 | 230 | o |
| S-11 | 1000 | 230 | o |
| S-12 | 1000 | 230 | o |
| Reference example | 1500 | 120 | x |

TABLE 27

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| P-61 | $CF_4/Ar$ | 0.5 | 50 | 0.8 | 350 | glass |
| | $SiH_4/Ar$ | 0.1 | 5 | | | |
| P-62 | $C_2F_6/Ar$ | 0.5 | 50 | 0.8 | 350 | glass |
| | $Si_2H_6/Ar$ | 0.1 | 2 | | | |
| P-63 | $CF_4/Ar$ | 0.5 | 50 | 0.8 | 350 | Si |
| | $SiH_4/Ar$ | 0.1 | 5 | | | |
| P-64 | $C_2F_6/Ar$ | 0.5 | 50 | 0.8 | 350 | Si |
| | $Si_2H_6/Ar$ | 0.1 | 2 | | | |

TABLE 28

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| S-13 | $CF_4/Ar$ | 0.5 | 15 | 5 | 350 | glass |
| | $SiH_4/Ar$ | 0.1 | 2 | | | |
| S-14 | $CF_4/Ar$ | 0.5 | 15 | 5 | 350 | Si |
| | $SiH_4/Ar$ | 0.1 | 2 | | | |
| Reference example | Ar | 1 | 20 | 1.5 | 200 | Si |

TABLE 29

| Example No. | Thickness (Å) | Resistance (Ω) | Durability |
|---|---|---|---|
| P-61 | 1000 | 205 | o |
| P-62 | 1000 | 205 | o |
| P-63 | 1000 | 205 | o |
| P-64 | 1000 | 205 | o |
| S-13 | 1000 | 205 | o |
| S-14 | 1000 | 205 | o |
| Reference example | 1500 | 120 | x |

TABLE 30

| Example No. | Reaction gas Kind A/B | Reaction gas Ratio A/B | Flow rate (SCCM) | Electric power ($W/cm^2$) | Substrate temp. (°C.) | Substrate material |
|---|---|---|---|---|---|---|
| P-65 | $CF_4/Ar$ | 0.5 | 50 | 0.8 | 350 | glass |
| | $SiH_4/Ar$ | 0.8 | 5 → 2 | | | |

TABLE 30-continued

| Example No. | Reaction gas Kind A/B | Ratio A/B | Flow rate (SCCM) | Electric power (W/cm²) | Substrate temp. (°C.) | Substrate material |
|---|---|---|---|---|---|---|
| P-66 | $CF_4$/Ar | 0.5 | 50 | 0.8 → 0.9 | 350 | glass |
| | $SiH_4$/Ar | 0.8 | 5 | | | |
| P-67 | $CF_4$/Ar | 0.5 | 50 | 0.8 | 350 | Si |
| | $SiH_4$/Ar | 0.8 | 5 → 2 | | | |
| P-68 | $CF_4$/Ar | 0.5 | 50 | 0.8 → 0.9 | 350 | Si |
| | $SiH_4$/Ar | 0.8 | 5 | | | |

TABLE 31

| Example No. | Thickness (Å) | Resistance (Ω) | Durability |
|---|---|---|---|
| P-65 | 1000 | 230 | o |
| P-66 | 1000 | 230 | o |
| P-67 | 1000 | 230 | o |
| P-68 | 1000 | 230 | o |
| Reference example | 1500 | 120 | x |

TABLE 32

| Example No. | Reaction gas Kind A/B | Ratio A/B | Flow Rate (SCCM) | Electric power (W/cm²) | Substrate temp. (°C.) | Substrate material |
|---|---|---|---|---|---|---|
| P-69 | $CF_4$/Ar | 0.5 | 50 | 0.8 | 350 | glass |
| | $GeH_4$/Ar | 0.1 | 5 | | | |
| P-70 | $C_2F_6$/Ar | 0.5 | 50 | 0.8 | 350 | glass |
| | $GeH_4$/Ar | 0.1 | 5 | | | |
| P-71 | $CF_4$/Ar | 0.5 | 50 | 0.8 | 350 | Si |
| | $GeH_4$/Ar | 0.1 | 5 | | | |
| P-72 | $C_2F_6$/Ar | 0.5 | 50 | 0.8 | 350 | Si |
| | $GeH_4$/Ar | 0.1 | 5 | | | |

TABLE 33

| Example No. | Thickness (Å) | Resistance (Ω) | Durability |
|---|---|---|---|
| P-69 | 1000 | 205 | o |
| P-70 | 1000 | 205 | o |
| P-71 | 1000 | 205 | o |
| P-72 | 1000 | 205 | o |
| Reference example | 1500 | 120 | x |

TABLE 34

| Example No. | Reaction gas Kind A/B | Ratio A/B | Flow rate (SCCM) | Electric power (W/cm²) | Substrate temp. (°C.) | Substrate material |
|---|---|---|---|---|---|---|
| P-73 | $CF_4$/Ar | 0.5 | 50 | 0.8 | 350 | glass |
| | $GeH_4$/Ar | 0.1 | 5→2 | | | |
| P-74 | $C_2F_6$/Ar | 0.5 | 50 | 0.8 | 350 | glass |
| | $GeH_4$/Ar | 0.1 | 5→2 | | | |
| P-75 | $CF_4$/Ar | 0.5 | 50 | 0.8→0.9 | 350 | glass |
| | $GeH_4$/Ar | 0.1 | 5 | | | |
| P-76 | $C_2F_6$/Ar | 0.5 | 50 | 0.8→0.9 | 350 | glass |
| | $GeH_4$/Ar | 0.1 | 5 | | | |
| P-77 | $CF_4$/Ar | 0.5 | 50 | 0.8 | 350 | Si |
| | $GeH_4$/Ar | 0.1 | 5→2 | | | |
| P-78 | $C_2F_6$/Ar | 0.5 | 50 | 0.8 | 350 | Si |
| | $GeH_4$/Ar | 0.1 | 5→2 | | | |
| P-79 | $CF_4$/Ar | 0.5 | 50 | 0.8→0.9 | 350 | Si |
| | $GeH_4$/Ar | 0.1 | 5 | | | |
| P-80 | $C_2F_6$/Ar | 0.5 | 50 | 0.8→0.9 | 350 | Si |
| | $GeH_4$/Ar | 0.1 | 5 | | | |

TABLE 35

| Example No. | Thickness (Å) | Resistance (Ω) | Durability |
|---|---|---|---|
| P-73 | 1000 | 230 | o |
| P-74 | 1000 | 230 | o |
| P-75 | 1000 | 230 | o |
| P-76 | 1000 | 230 | o |
| P-77 | 1000 | 230 | o |
| P-78 | 1000 | 230 | o |
| P-79 | 1000 | 230 | o |
| P-80 | 1000 | 230 | o |
| Reference example | 1500 | 120 | x |

TABLE 36

| Example No. | Reaction gas Kind A/B | Ratio A/B | Flow rate (SCCM) | Electric power (W/cm²) | Substrate temp. (°C.) | Substrate material |
|---|---|---|---|---|---|---|
| P-81 | $CH_4$/Ar | 0.5 | 50 | 0.8 | 350 | glass |
| | $SiH_4$/Ar | 0.1 | 5 | | | |
| | $GeF_4$/Ar | 0.05 | 5 | | | |
| P-82 | $CH_4$Ar | 0.5 | 50 | 0.8 | 350 | glass |
| | $SiF_4$/Ar | 0.1 | 5 | | | |
| | $GeF_4$/Ar | 0.05 | 5 | | | |
| P-83 | $CH_4$/Ar | 0.5 | 50 | 0.8 | 350 | Si |
| | $SiH_4$/Ar | 0.1 | 5 | | | |
| | $GeF_4$/Ar | 0.05 | 5 | | | |
| P-84 | $CH_4$/Ar | 0.5 | 50 | 0.8 | 350 | Si |
| | $SiF_4$/Ar | 0.1 | 5 | | | |
| | $GeF_4$/Ar | 0.05 | 5 | | | |

TABLE 37

| Example No. | Thickness (Å) | Resistance (Ω) | Durability |
|---|---|---|---|
| P-81 | 1000 | 205 | o |
| P-82 | 1000 | 205 | o |
| P-83 | 1000 | 205 | o |
| P-84 | 1000 | 205 | o |
| Reference example | 1500 | 120 | x |

TABLE 38

| Example No. | Reaction gas Kind A/B | Ratio A/B | Flow rate (SCCM) | Electric power (W/cm²) | Substrate temp. (°C.) | Substrate material |
|---|---|---|---|---|---|---|
| P-85 | $CH_4$/Ar | 0.5 | 50 | 0.8 | 350 | glass |
| | $SiH_4$/Ar | 0.1 | 5→2 | | | |
| | $GeF_4$/Ar | 0.05 | 5→2 | | | |
| P-86 | $CH_4$/Ar | 0.5 | 50 | 0.8 | 350 | glass |
| | $SiF_4$/Ar | 0.1 | 5→2 | | | |
| | $GeH_4$/Ar | 0.05 | 5→2 | | | |
| P-87 | $CH_4$/Ar | 0.5 | 50 | 0.8→0.9 | 350 | glass |
| | $SiH_4$/Ar | 0.1 | 5 | | | |
| | $GeF_4$/Ar | 0.05 | 5 | | | |
| P-88 | $CH_4$/Ar | 0.5 | 50 | 0.8→0.9 | 350 | glass |
| | $SiF_4$/Ar | 0.1 | 5 | | | |
| | $GeH_4$/Ar | 0.05 | 5 | | | |
| P-89 | $CH_4$/Ar | 0.5 | 50 | 0.8 | 350 | Si |
| | $SiH_4$/Ar | 0.1 | 5→2 | | | |
| | $GeF_4$/Ar | 0.05 | 5→2 | | | |
| P-90 | $CH_4$/Ar | 0.5 | 50 | 0.8 | 350 | Si |
| | $SiF_4$/Ar | 0.1 | 5→2 | | | |
| | $GeH_4$/Ar | 0.05 | 5→2 | | | |
| P-91 | $CH_4$/Ar | 0.5 | 50 | 0.8→0.9 | 350 | Si |
| | $SiH_4$/Ar | 0.1 | 5 | | | |
| | $GeF_4$/Ar | 0.05 | 5 | | | |
| P-92 | $CH_4$/Ar | 0.5 | 50 | 0.8→0.9 | 350 | Si |
| | $SiF_4$/Ar | 0.1 | 5 | | | |
| | $GeH_4$/Ar | 0.05 | 5 | | | |

TABLE 39

| Example No. | Thickness (Å) | Resistance (Ω) | Durability |
|---|---|---|---|
| P-85 | 1000 | 230 | o |
| P-86 | 1000 | 230 | o |
| P-87 | 1000 | 230 | o |
| P-88 | 1000 | 230 | o |
| P-89 | 1000 | 230 | o |
| P-90 | 1000 | 230 | o |
| P-91 | 1000 | 230 | o |
| P-92 | 1000 | 230 | o |
| Reference example | 1500 | 120 | x |

TABLE 40

| Example No. | Reaction gas Kind A/B | Ratio A/B | Flow rate (SCCM) | Electric power ($W/cm^2$) | Substrate temp. (°C.) | Substrate material |
|---|---|---|---|---|---|---|
| P-93 | $CF_4/Ar$ | 0.5 | 50 | 1.5 | 350 | glass |
| | $PH_3/Ar$ | $1 \times 10^{-5}$ | 125 | | | |
| P-94 | $CF_4/Ar$ | 0.5 | 50 | 1.5 | 350 | glass |
| | $B_2H_6/Ar$ | $1 \times 10^{-5}$ | 125 | | | |
| P-95 | $CF_4/Ar$ | 0.5 | 50 | 1.5 | 350 | Si |
| | $PH_3/Ar$ | $1 \times 10^{-5}$ | 125 | | | |
| P-96 | $CF_4/Ar$ | 0.5 | 50 | 1.5 | 350 | Si |
| | $B_2H_6/Ar$ | $1 \times 10^{-5}$ | 125 | | | |

TABLE 41

| Example No. | Thickness (Å) | Resistance (Ω) | Durability |
|---|---|---|---|
| P-93 | 1000 | 180 | o |
| P-94 | 1000 | 180 | o |
| P-95 | 1000 | 180 | o |
| P-96 | 1000 | 180 | o |
| Reference example | 1500 | 120 | x |

TABLE 42

| Example No. | Reaction gas Kind A/B | Ratio A/B | Flow rate (SCCM) | Electric power ($W/cm^2$) | Substrate temp. (°C.) | Substrate material |
|---|---|---|---|---|---|---|
| P-97 | $CF_4/Ar$ | 0.5 | 50→30 | 1.5 | 350 | glass |
| | $PH_3/Ar$ | $1 \times 10^{-5}$ | 125 | | | |
| P-98 | $CF_4/Ar$ | 0.5 | 50→30 | 1.5 | 350 | glass |
| | $B_2H_6/Ar$ | $1 \times 10^{-5}$ | 125 | | | |
| P-99 | $CF_4/Ar$ | 0.5 | 50 | 1.5→1.6 | 350 | glass |
| | $PH_3/Ar$ | $1 \times 10^{-5}$ | 125 | | | |
| P-100 | $CF_4/Ar$ | 0.5 | 50 | 1.5→1.6 | 350 | glass |
| | $B_2H_6/Ar$ | $1 \times 10^{-5}$ | 125 | | | |
| P-101 | $CF_4/Ar$ | 0.5 | 50→30 | 1.5 | 350 | Si |
| | $PH_3/Ar$ | $1 \times 10^{-5}$ | 125 | | | |
| P-102 | $CF_4/Ar$ | 0.5 | 50→30 | 1.5 | 350 | Si |
| | $B_2H_6/Ar$ | $1 \times 10^{-5}$ | 125 | | | |
| P-103 | $CF_4/Ar$ | 0.5 | 50 | 1.5→1.6 | 350 | Si |
| | $PH_3/Ar$ | $1 \times 10^{-5}$ | 125 | | | |
| P-104 | $CF_4/Ar$ | 0.5 | 50 | 1.5→1.6 | 350 | Si |
| | $B_2H_6/Ar$ | $1 \times 10^{-5}$ | 125 | | | |

TABLE 43

| Example No. | Thickness (Å) | Resistance (Ω) | Durability |
|---|---|---|---|
| P-97 | 1000 | 205 | o |
| P-98 | 1000 | 205 | o |
| P-99 | 1000 | 205 | o |
| P-100 | 1000 | 205 | o |
| P-101 | 1000 | 205 | o |
| P-102 | 1000 | 205 | o |
| P-103 | 1000 | 205 | o |
| P-104 | 1000 | 205 | o |
| Reference example | 1500 | 120 | x |

A practical embodiment of a liquid jet recording system of the invention which incorporates the described liquid jet recording head according to the third embodiment of the invention will be explained hereinunder. FIG. 30 is a partly cut-away perspective view of a liquid jet recording system embodying the present invention.

This recording system has a pair of recording head units 70 mounted on a carriage 72 in a side-by-side fashion and fixed by retainers 71. Each of the recording head units 70 is detachable and may be of a disposable type which is wasted when the recording liquid therein has been consumed.

A wire 82 going around pulleys 80 and 81 has both ends connected to respective side surfaces of the carriage 72. The pulley 81 is power-driven by a motor 84. The arrangement is such that, as the motor 84 operates, the carriage 72 is pulled by the wire 82 so as to move to the left and right as viewed in FIG. 30 along the guide members 74.

On the other hand, a platen 76 is carried by a rotary shaft 77 which in turn is driven by another motor 86 through a gear mechanism 88, so as to feed a recording medium 78.

In operation, electric signals corresponding to the information to be recorded are delivered to the recording head units 70 through a flexible wiring web 90, so that the recording head units 70 jet the droplets of the recording liquid towards the recording medium as indicated by arrows Z, whereby the information is recorded on the recording medium.

Needless to say, the recording head may be of full-line type which extends over the entire length of the recording or print line. In such a case, it is not necessary to employ a amechanism for driving the recording head, unlike the embodiment shown in FIG. 30.

What is claimed is:

1. A liquid jet recording head comprising:

at least one liquid outlet for discharging a recording liquid so as to form a droplet of said recording liquid; and at least one electro-thermal transducer for producing heat energy which is used in forming said droplet of said recording liquid;

wherein said electro-thermal transducer has a heat-generating resistance layer which is made of an amorphous material containing halogen atoms and a matrix of carbon atoms, said halogen atoms having a non-uniform distribution in the thickness direction of said heat-generating resistance layer.

2. A liquid jet recording head according to claim 1, wherein said amorphous material of said heat-generating resistance layer further contains an electroconductivity controlling substance.

3. A liquid jet recording head according to claim 2, wherein said halogen atoms and/or said electroconductivity controlling substance has a non-uniform distribution in the thicknesswise direction of said heat-generating resistance layer.

4. A liquid jet recording head according to claim 1, wherein said halogen atoms are atoms of an element selected from a group consisting of F (Fluorine), Cl (Chlorine), B (Bromine) and I (Iodide).

5. A liquid jet recording head according to claim 2, wherein said halaogen atoms are atoms of an element selected from a group consisting of F (Fluorine), Cl (Chlorine), B (Bromine) and I (Iodide).

6. A liquid jet recording head according to claim 1, wherein said halogen atoms are atoms of an element selected from a group consisting of F (Fluorine), Cl (Chlorine), B (Bromine) and I (Iodide).

7. A liquid jet recording head according to claim 3, wherein said halogen atoms are atoms of an element selected from a group consisting of F (Fluorine), Cl (Chlorine), B (Bromine) and I (Iodide).

8. A liquid jet recording head according to claim 2, wherein said electroconductivity controlling substance is an element of group III or group V in the periodic table.

9. A liquid jet recording head according to claim 3, wherein said electroconductivity controlling substance is an element of group III or group V in the periodic table.

10. A liquid jet recording head according to claim 1, wherein the content of said halogen atoms ranges between 0.0001 and 30 atomic %.

11. A liquid jet recording head according to claim 2, wherein the content of said halogen atoms ranges between 0.0001 and 30 atomic %.

12. A liquid jet recording head according to claim 1, wherein the content of said halogen atoms ranges between 0.0001 and 30 atomic %.

13. A liquid jet recording head according to claim 3, wherein the content of said halogen atoms ranges between 0.0001 and 30 atomic %.

14. A liquid jet recording head according to claim 2, wherein the content of said electroconductivity controlling substance ranges between 0.01 and 50000 atomic ppm.

15. A liquid jet recording head according to claim 3, wherein the content of said electroconductivity controlling substance ranges between 0.01 and 50000 atomic ppm.

16. A liquid jet recording head according to claim 1, wherein said electro-thermal transducer further has a protective layer.

17. A liquid jet recording head according to claim 2, wherein said electro-thermal transducer further has a protective layer.

18. A liquid jet recording head according to claim 1, wherein said electro-thermal transducer further has a protective layer.

19. A liquid jet recording head according to claim 3, wherein said electro-thermal transducer further has a protective layer.

20. A liquid jet recording head according to claim 1, wherein a plurality of said recording liquid outlets are provided.

21. A liiquid jet recording head according to claim 2, wherein a plurality of said recording liquid outlets are provided.

22. A liquid jet recording head according to claim 1, wherein a plurality of said recording liquid outlets are provided.

23. A liquid jet rocroding head according to claim 3, wherein a plurality of said recording liquid outlets are provided.

24. A liquid jet recording head according to claim 1, wherein a plurality of said electro-thermal transducers are provided.

25. A liquid jet recording head according to claim 2, wherein a plurality of said electro-thermal transducers are provided.

26. A liquid jet recording head according to claim 1, wherein a plurality of said electro-thermal transducers are provided.

27. A liquid jet recording head according to claim 3, wherein a plurality of said electro-thermal transducers are provided.

28. A liquid jet recording system incorporating a liquid jet recording head as set forth in claim 1.

29. A liquid jet recording system incorporating a liquid jet recording head as set forth in claim 2.

30. A liquid jet recording system incorporating a liquid jet recording head as set forth in claim 1.

31. A liquid jet recording system incorporating a liquid jet recording head as set forth in claim 3.

32. A liquid jet recording head comprising:

at least one liquid drop outlet for discharging a recording liquid so as to form a droplet of said recording liquid;

at least one liquid passage communicating with said outlet and having a heating section; and at least one electro-thermal transducer corresponding to said heating section;

said electro-thermal transducer including a heat-generating resistance layer formed on a support member and made of an amorphous material containing halogen atoms and a matrix of carbon atoms in a non-uniform distribution of the thicknesswise direction of said heat-generating resistance layer, said electro-thermal transducer further including a pair of electrodes electrically connected to said heat-generating resistance layer.

33. A liquid jet recording to claim 32, wherein said amorphous material of said heat-generating resistance layer further contains an electroconductivity controlling substance.

34. A liquid jet recording head according to claim 32, wherein said non-uniform distribution of said halogen atoms exhibits a greater concentration of said halogen atoms in the region near said support member than in the region remote from said support member.

35. A liquid jet recording head according to claim 32, wherein said non-uniform distribution of said halogen atoms exhibits a smaller concentration of said halogen atoms in the region near said support member than in the region remote from said support member.

36. A liquid jet recording head according to claim 32, wherein said non-uniform distribution of said halogen atoms in thicknesswise direction of said heat-generating resistance layer has a maximum value.

37. A liquid jet recording head according to claim 32, wherein said non-uniform distribution of said halogen atoms in thicknesswise direction of said heat-generating resistance layer has a minimum value.

38. A liquid jet recording head according to claim 33, wherein said halogen atoms and/or said electroconductivity controlling substance have non-uniform distribution in the thicknesswise direction of said heat-generating resistance layer.

39. A liquid jet recording head according to claim 38, wherein said non-uniform distribution of said halogen atoms and/or said electroconductivity controlling substance exhibits a greater concentration of said halogen atoms and/or said electroconductivity controlling substance in the region near said support member than in the region remote from said support member.

40. A liquid jet recording head according to claim 38, wherein said non-uniform distribution of said halogen atoms and/or said electroconductivity controlling substance exhibit a smaller concentration of said halogen atoms and/or said electroconductivity controlling substance in the region near said support member than in the region remote from said support member.

41. A liquid jet recording head according to claim 38, wherein said non-uniform distribution of said halogen atoms and/or said electroconductivity controlling substance in thicknesswise direction of said heat-generating resistance layer has a maximum value.

42. A liquid jet recording head according to claim 38, wherein said non-uniform distribution of said halogen atoms and/or said electroconductivity controlling substance in thicknesswise direction of said heat-generating resistance layer has a minimum value.

43. A liquid jet recording head according to claim 32, wherein a plurality of said liquid passages and a plurality of said recording liquid outlets corresponding to said liquid passages are provided.

44. A liquid jet recording head according to claim 32, wherein a plurality of said recording liquid outlets are provided in communication with a single common liquid passage.

45. A liquid jet recording head according to claim 43, wherein said liquid passages communicate with a single common liquid chamber.

46. A liquid jet recording head according to claim 43, wherein said heating sections of respective liquid passages communicate with one another.

47. A liquid jet recording head according to claim 32, wherein said heat-generating resistance layer is formed on said support member and said pair of electrodes are formed to overlie said heat-generating resistance layer.

48. A liquid jet recording head according to claim 32, wherein said pair of electrodes are formed on said support member and said heat-generating resistance layer is formed to overlie said pair of electrodes.

49. A liquid jet recording head according to claim 47, wherein at least one of said pair of electrodes is covered by a protective layer.

50. A liquid jet recording system incorporating a liquid jet recording head as set forth in claim 32.

51. A liquid jet recording system incorporating a liquid jet recording head as set forth in claim 33.

52. A liquid jet recording system incorporating a liquid jet recording head as set forth in claim 32.

53. A liquid jet recording system incorporating a liquid jet recording head as set forth in claim 38.

54. A liquid jet recording head comprising:

at least one liquid outlet for discharging a recording liquid so as to form a droplet of said recording liquid; and at least one electro-thermal transducer for producing heat energy which is used in forming said droplet of said recording liquid;

wherein said electro-thermal transducer has a heat-generating resistance layer which is made of an amorphous material containing hydrogen atoms and a matrix of carbon atoms, said hydrogen atoms having a non-uniform distribution in the thicknesswise direction of said heat-generating resistance layer.

55. A liquid jet recording head according to claim 54, wherein said amorphous material of said heat-generating resistance layer further contains an electroconductivity controlling substance.

56. A liquid jet recording head according to claim 55, wherein said hydrogen atoms and/or said electroconductivity controlling substance has a non-uniform distribution in the thicknesswise direction of said heat-generating resistance layer.

57. A liquid jet recording head according to claim 55, wherein said electroconductivity controlling substance is an element of group III or group V in the periodic table.

58. A liquid jet recording head according to claim 56, wherein said electroconductivity controlling substance is an element of group III or group V in the periodic table.

59. A liquid jet recording head according to claim 54, wherein the content of said hydrogen atoms ranges between 0.0001 and 30 atomic %.

60. A liquid jet recording head according to claim 55, wherein the content of said hydrogen atoms ranges between 0.0001 and 30 atomic %.

61. A liquid jet recording head according to claim 54, wherein the content of said hydrogen atoms ranges between 0.0001 and 30 atomic %.

62. A liquid jet recording head according to claim 56, wherein the content of said hydrogen atoms ranges between 0.0001 and 30 atomic %.

63. A liquid jet recording head according to claim 55, wherein the content of said electroconductivity controlling substance ranges between 0.01 and 50000 atomic ppm.

64. A liquid jet recording head according to claim 56, wherein the content of said electroconductivity controlling substance ranges between 0.01 and 50000 atomic ppm.

65. A liquid jet recording head according to claim 54, wherein said electro-thermal transducer further has a protective layer.

66. A liquid jet recording head according to claim 55, wherein said electro-thermal transducer further has a protective layer.

67. A liquid jet recording head according to claim 54, wherein said electro-thermal transducer further has a protective layer.

68. A liquid jet recording head according to claim 56, wherein said electro-thermal transducer further has a protective layer.

69. A liquid jet recording head according to claim 54, wherein a plurality of said recording liquid outlets are provided.

70. A liquid jet recording head according to claim 55, wherein a plurality of said recording liquid outlets are provided.

71. A liquid jet recording head according to claim 54, wherein a plurality of said recording liquid outlets are provided.

72. A liquid jet recording head according to claim 56, wherein a plurality of said recording liquid outlets are provided.

73. A liquid jet recording head according to claim 54, wherein a plurality of said electro-thermal transducers are provided.

74. A liquid jet recording head according to claim 55, wherein a plurality of said electro-thermal transducers are provided.

75. A liquid jet recording head according to claim 54, wherein a plurality of said electro-thermal transducers are provided.

76. A liquid jet recording head according to claim 56, wherein a plurality of said electro-thermal transducers are provided.

77. A liquid jet recording system incorporating a liquid jet recording head as set forth in claim 54.

78. A liquid jet recording system incorporating a liquid jet recording head as set forth in claim 55.

79. A liquid jet recording system incorporating a liquid jet recording head as set forth in claim 54.

80. A liquid jet recording system incorporating a liquid jet recording head as set forth in claim 56.

81. A liquid jet recording head comprising:

at least one liquid drop outlet for discharging a recording liquid so as to form a droplet of said recording liquid;

at least one liquid passage communicating with said outlet and having a heating section; and at least one electro-thermal transducer corresponding to said heating section;

said electro-thermal transducer including a heat-generating resistance layer formed on a support member and made of an amorphous material containing hydrogen atoms and a matrix of carbon atoms in a non-uniform distribution in the thicknesswise direction of said heat-generating resistance layer, said electro-thermal transducer further including a pair of electrodes electrically connected to said heat-generating resistance layer.

82. A liquid jet recording head according to claim 81, wherein said amorphous material of said heat-generating resistance layer further contains an electroconductivity controlling substance.

83. A liquid jet recording head according to claim 81, wherein said non-uniform distribution of said hydrogen atoms exhibits a greater concentration of said hydrogen atoms in the region near said support member than in the region remote from said support member.

84. A liquid jet recording head according to claim 81, wherein said non-uniform distribution of said hydrogen atoms exhibits a smaller concentration of said hydrogen atoms in the region near said support member than in the region remote from said support member.

85. A liquid jet recording head according to claim 81, wherein said non-uniform distribution of said hydrogen atoms in thicknesswise direction of said heat-generating resistance layer has a maximum value.

86. A liquid jet recording head according to claim 81, wherein said non-uniform distribution of said hydrogen atoms in thicknesswise direction of said heat-generating resistance layer has a maximum value.

87. A liquid jet recording head according to claim 82, wherein said hydrogen atoms and/or said electroconductivity controlling substance have non-uniform distribution in the thicknesswise direction of said heat-generating resistance layer.

88. A liquid jet recording head according to claim 87, wherein said non-uniform distribution of said hydrogen atoms and/or said electroconductivity controlling substance exhibits a greater concentration of said hydrogen atoms and/or said electroconductivity controlling substance in the region near said support member than in the region remote from said support member.

89. A liquid jet recording head according to claim 87, wherein said non-uniform distribution of said hydrogen atoms and/or said electroconductivity controlling substance exhibit a smaller concentration of said hydrogen atoms and/or said electroconductivity controlling substance in the region near said support member than in the region remote from said support member.

90. a liquid jet recording head according to claim 87, wherein said non-uniform distribution of said hydrogen atoms and/or said electroconductivity controlling substance in thicknesswise direction of said heat-generating resistance layer has a maximum value.

91. A liquid jet recording head according to claim 87, wherein said non-uniform distribution of said hydrogen atoms and/or said electroconductivity controlling substance in thicknesswise direction of said heat-generating resistance layer has a minimum value.

92. A liquid jet recording head according to claim 81, wherein a plurality of said liquid passages and a plurality of said recording liquid outlets corresponding to said liquid passages are provided.

93. A liquid jet recording head according to claim 81, wherein a plurality of said recording liquid outlets are provided in communication with a single common liquid passage.

94. A liquid jet recording head according to claim 92, wherein said liquid passages communicate with a single common liquid chamber.

95. A liquid jet recording head according to claim 92, wherein said heating sections of respective liquid passages are in communication with one another.

96. A liquid jet recording head according to claim 81, wherein said heat-generating resistance layer is formed on said support member and said pair of electrodes are formed to overlie said heat-generating resistance layer.

97. A liquid jet recording head according to claim 81, wherein said pair of electrodes are formed on said support member and said heat-generating resistance layer is formed to ovverlie said pair of electrodes.

98. A liquid jet recording head according to claim 96, wherein at least one of said pair of electrodes is covered by a protective layer.

99. A liquid jet recording system incorporating a liquid jet recording head as set forth in claim 81.

100. A liquid jet recording system incorporating a liquid jet recording head as set forth in claim 82.

101. A liquid jet recording system incorporating a liquid jet recording as set forth in claim 81.

102. A liquid jet recording system incorporating a liquid jet recording head as set forth in claim 87.

103. A liquid jet recording head comprising:

at least one liquid outlet for discharging a recording liquid so as to form a droplet of said recording liquid; and at least one electro-thermal transducer for producing heat energy which is used in forming said droplet of said recording liquid;

wherein said electro-thermal transducer has a heat-generating resistance layer which is made of an amorphous material containing halogen atoms and hydrogen atoms in a matrix of carbon atoms.

104. A liquid jet recording head according to claim 103, wherein said amorphous material of said heat-generating resistance layer further contains silicon atoms in addition to said halogen atoms and said hydrogen atoms.

105. A liquid jet recording head according to claim 103,
wherein said amosphous material of said heat-generating resistance layer further contains germanium atoms in addition to said halogen atoms and said hydrogen atoms.

106. A liquid jet recording head according to claim 103,
wherein said amorphous material of said heat-generating resistance layer further contains silicon atoms and germanium atoms in addition to said halogen atoms and said hydrogen atoms.

107. A liquid jet recording head according to claim 103,
wherein said amorphous material of said heat-generating resistance layer further contains an electroconductivity controlling substance in addition to said halogen atoms and said hydrogen atoms.

108. A liquid jet recording head according to claim 104,
wherein said amorphous material of said heat-generating resistance layer further contains an electroconductivity controlling substance in addition to said halogen atoms, said hydrogen atoms and said silicon atoms.

109. A liquid jet recording head according to claim 105,
wherein said amorphous material of said heat-generating resistance layer further contains an electroconductivity controlling substance in addition to said halogen atoms, said hydrogen atoms and said germanium atoms.

110. A liquid jet recording head according to claim 103,
wherein said amorphous material of said heat-generating resistance layer further contains an electroconductivity controlling substance in addition to said halogen atoms, said hydrogen atoms and said germanium atoms.

111. A liquid jet recording head according to claim 103,
wherein at least one of said halogen atoms and said hydrogen atoms has a non-uniform distribution in the thicknesswise direction of said heat-generating resistance layer.

112. A liquid jet recording head according to claim 104,
wherein at least one of said halogen atoms, said hydrogen atoms and said silicon atoms has a non-uniform distribution in the thicknesswise direction of said heat-generating resistance layer.

113. A liquid jet recording head according to claim 105,
wherein at least one of said halogen atoms, said hydrogen atoms and said germanium atoms has a non-uniform distribution in the thicknesswise direction of said heat-generating resistance layer.

114. A liquid jet recording head according to claim 106,
wherein at least one of said halogen atoms, said hydrogen atoms, said silicon atoms and said germanium atoms has a non-uniform distribution in the thicknesswise direction of said heat-generating resistance layer.

115. A liquid jet recording head according to claim 107,
wherein at least one of said halogen atoms, said hydrogen atoms and said electroconductivity controlling substance has a non-uniform distribution in the thicknesswise direction of said heat-generating resistance layer.

116. A liquid jet recording head according to claim 108,
wherein at least one of said halogen atoms, said hydrogen atoms, said silicon atoms and said electroconductivity controlling substance has a non-uniform distribution in the thicknesswise direction of said heat-generating resistance layer.

117. A liquid jet recording head according to claim 109,
wherein at least one of said halogen atoms, said hydrogen atoms, said germanium atoms and said electroconductivity controlling substance has a non-uniform distribution in the thicknesswise direction of said heat-generating resistance layer.

118. A liquid jet recording head according to claim 110,
wherein at least one of said halogen atoms, said hydrogen atoms, said silicon atoms, said germanium atoms and said electroconductivity controlling substance has a non-uniform distribution in the thicknesswise direction of said heat-generating resistance layer.

119. A liquid jet recording head according to claim 103,
wherein said halogen atoms are atoms of an element selected from a group consisting of F (Fluorine), Cl (Chlorine), B (Bromine) and I (Iodide).

120. A liquid jet recording head according to claim 104,
wherein said halogen atoms are atoms of an element selected from a group consisting of F (Fluorine), Cl (Chlorine), B (Bromine) and I (Iodide).

121. A liquid jet recording head according to claim 105,
wherein said halogen atoms are atoms of an element selected from a group consisting of F (Fluorine), Cl (Chlorine), B (Bromine) and I (Iodide).

122. A liquid jet recording head according to claim 106,
wherein said halogen atoms are atoms of an element selected from a group consisting of F (Fluorine), Cl (Chlorine), B (Bromine) and I (Iodide).

123. A liquid jet recording head according to claim 107,
wherein said halogen atoms are atoms of an element selected from a group consisting of F (Fluorine), Cl (Chlorine), B (Bromine) and I (Iodide).

124. A liquid jet recording head according to claim 108,
wherein said halogen atoms are atoms of an element selected from a group consisting of F (Fluorine), Cl (Chlorine), B (Bromine) and I (Iodide).

125. A liquid jet recording head according to claim 109,
wherein said halogen atoms are atoms of an element selected from a group consisting of F (Fluorine), Cl (Chlorine), B (Bromine) and I (Iodide).

126. A liquid jet recording head according to claim 110,
wherein said halogen atoms are atoms of an element selected from a group consisting of F (Fluorine), Cl (Chlorine), B (Bromine) and I (Iodide).

127. A liquid jet recording head according to claim 111, wherein said halogen atoms are atoms of an element selected from a group consisting of F (Fluorine), Cl (Chlorine), B (Bromine) and I (Iodide).

128. A liquid jet recording head according to claim 112.

wherein said halogen atoms are atoms of an element selected from a group consisting of F (Fluorine), Cl (Chlorine), B (Bromine) and I (Iodide).

129. A liquid jet recording head according to claim 113, wherein said halogen atoms are atoms of an element selected from a group consisting of F (Fluorine), Cl (Chlorine), B (Bromine) and I (Iodide).

130. A liquid jet recording head according to claim 114, wherein said halogen atoms are atoms of an element selected from a group consisting of F (Fluorine), Cl (Chlorine), B (Bromine) and I (Iodide).

131. A liquid jet recording head according to claim 115, wherein said halogen atoms are atoms of an element selected from a group consisting of F (Fluorine), Cl (Chlorine), B (Bromine) and I (Iodide).

132. A liquid jet recording head according to claim 116, wherein said halogen atoms are atoms of an element selected from a group consisting of F (Fluorine), Cl (Chlorine), B (Bromine) and I (Iodide).

133. A liquid jet recording head according to claim 117, wherein said halogen atoms are atoms of an element selected from a group consisting of F (Fluorine), Cl (Chlorine), B (Bromine) and I (Iodide).

134. A liquid jet recording head according to claim 118, wherein said halogen atoms are atoms of an element selected from a group consisting of F (Fluorine), Cl (Chlorine), B (Bromine) and I (Iodide).

135. A liquid jet recording head according to claim 107, wherein said electroconductivity controlling substance is an element of group III or group V in the periodic table.

136. A liquid jet recording head according to claim 108, wherein said electroconductivity controlling substance is an element of group III or group V in the periodic table.

137. A liquid jet recording head according to claim 109, wherein said electroconductivity controlling substance is an element of group III or group V in the periodic table.

138. A liquid jet recording head according to claim 110, wherein said electroconductivity controlling substance is an element of group III or group V in the periodic table.

139. A liquid jet recording head according to claim 115, wherein said electroconductivity controlling substance is an element of group III or group V in the periodic table.

140. A liquid jet recording head according to claim 116, wherein said electroconductivity controlling substance is an element of group III or group V in the periodic table.

141. A liquid jet recording head according to claim 117, wherein said electroconductivity controlling substance is an element of group III or group V in the periodic table.

142. A liquid jet recording head according to claim 118, wherein said electroconductivity controlling substance is an element of group III or group V in the periodic table.

143. A liquid jet recording head according to claim 103, wherein the content of said halogen atoms ranges between 0.0001 and 30 atomic %.

144. A liquid jet recording head according to claim 104, wherein the content of said halogen atoms ranges between 0.0001 and 30 atomic %.

145. A liquid jet recording head according to claim 105, wherein the content of said halogen atoms ranges between 0.0001 and 30 atomic %.

146. A liquid jet recording head according to claim 106, wherein the content of said halogen atoms ranges between 0.0001 and 30 atomic %.

147. A liquid jet recording head according to claim 107,

Wherein the content of said halogen atoms ranges between 0.0001 and 30 atomic %.

148. A liquid jet recording head according to claim 108, wherein the content of said halogen atoms ranges between 0.0001 and 30 atomic %.

149. A liquid jet recording head according to claim 109, wherein the content of said halogen atoms ranges between 0.0001 and 30 atomic %.

150. A liquid jet recoding head according to claim 110, wherein the content of said halogen atoms ranges between 0.0001 and 30 atomic %.

151. A liquid jet recording head according to claim 103, wherein the content of said hydrogen atoms ranges between 0.0001 and 30 atomic %.

152. A liquid jet recording head according to claim 104, wherein the content of said hydrogen atoms ranges between 0.0001 and 30 atomic %.

153. A liquid jet recording head according to claim 105, wherein the content of said hydrogen atoms ranges between 0.0001 and 30 atomic %.

154. A liquid jet recording head according to claim 106, wherein the content of said hydrogen atoms ranges between 0.0001 and 30 atomic %.

155. A liquid jet recording head according to claim 107, wherein the content of said hydrogen atoms ranges between 0.0001 and 30 atomic %.

156. A liquid jet recording head according to claim 108, wherein the content of said hydrogen atoms ranges between 0.0001 and 30 atomic %.

157. A liquid jet recording head according to claim 109, wherein the content of said hydrogen atoms ranges between 0.0001 and 30 atomic %.

158. A liquid jet recording head according to claim 110, wherein the content of said hydrogen atoms ranges between 0.0001 and 30 atomic %.

159. A liquid jet recording head according to claim 103, wherein the sum of the contents of said halogen atoms and said hydrogen atoms ranges between 0.0001 and 40 atomic %.

160. A liquid jet recording head according to claim 104, wherein the sum of the contents of said halogen atoms and said hydrogen atoms ranges between 0.0001 and 40 atomic %.

161. A liquid jet recording head according to claim 105, wherein the sum of the contents of said halogen atoms and said hydrogen atoms ranges between 0.0001 and 40 atomic %.

162. A liquid jet recording head according to claim 106, wherein the sum of the contents of said halogen atoms and said hydrogen atoms ranges between 0.0001 and 40 atomic %.

163. A liquid jet recording head according to claim 107, wherein the sum of the contents of said halogen atoms and said hydrogen atoms ranges between 0.0001 and 40 atomic %.

164. A liquid jet recording head according to claim 108, wherein the sum of the contents of said halogen atoms and said hydrogen atoms ranges between 0.0001 and 40 atomic %.

165. A liquid jet recording head according to claim 109, wherein the sum of the contents of said halogen atoms and said hydrogen atoms ranges between 0.0001 and 40 atomic %.

166. A liquid jet recording head according to claim 110, wherein the sum of the contents of said halogen atoms and said hydrogen atoms ranges between 0.0001 and 40 atomic %.

167. A liquid jet recording head according to claim 104, wherein the content of said silicon atoms ranges between 0.0001 and 40 atomic %.

168. A liquid jet recording head according to claim 106, wherein the content of said silicon atoms ranges between 0.0001 and 40 atomic %.

169. A liquid jet recording head according to claim 108, wherein the content of said silicon atoms ranges between 0.0001 and 40 atomic %.

170. A liquid jet recording head according to claim 110, wherein the content of said silicon atoms ranges between 0.0001 and 40 atomic %.

171. A liquid jet recording head according to claim 105, wherein the content of said germanium atoms ranges between 0.0001 and 40 atomic %.

172. A liquid jet recording head according to claim 106, wherein the content of said germanium atoms ranges between 0.0001 and 40 atomic %.

173. A liquid jet recording head according to claim 109, wherein the content of said germanium atoms ranges between 0.0001 and 40 atomic %.

174. A liquid jet recording head according to claim 110, wherein the content of said germanium atoms ranges between 0.0001 and 40 atomic %.

175. A liquid jet recording head according to claim 104, wherein the sum of contents of said silicon atoms, sail halogen atoms and said hydrogen atoms ranges between 0.0001 and 40 atomic %.

176. A liquid jet recording head according to claim 108, wherein the sum of contents of said silicon atoms, said halogen atoms and said hydrogen atoms ranges between 0.0001 and 40 atomic %.

177. A liquid jet recording head according to claim 105, wherein the sum of contents of said germanium atoms, said halogen atoms and said hydrogen atoms ranges between 0.0001 and 40 atomic %.

178. A liquid jet recording head according to claim 109, wherein the sum of contents of said germanium atoms, said halogen atoms and said hydrogen atoms ranges between 0.0001 and 40 atomic %.

179. A liquid jet recording head according to claim 106, wherein the sum of contents of said silicon atoms, said germanium atoms, said halogen atoms and said hydrogen atoms ranges between 0.0001 and 40 atomic %.

180. A liquid jet recording head according to claim 110, wherein the sum of contents of said silicon atoms, said germanium atoms, said halogen atoms and said hydrogen atoms ranges between 0.0001 and 40 atomic %.

181. A liquid jet recording head according to claim 107, wherein the content of said electroconductivity controlling substance ranges between 0.01 and 50000 atomic ppm.

182. A liquid jet recording head according to claim 108, wherein the content of said electroconductivity controlling substance ranges between 0.01 and 50000 atomic ppm.

183. A liquid jet recording head according to claim 109, wherein the content of said electroconductivity controlling substance ranges between 0.01 and 50000 atomic ppm.

184. A liquid jet recording head according to claim 110, wherein the content of said electroconductivity controlling substance ranges between 0.01 and 50000 atomic ppm.

185. A liquid jet recording head according to claim 105, wherein said electro-thermal transducer further has a protective layer.

186. A liquid jet recording head according to claim 106, wherein said electro-thermal transducer further has a protective layer.

187. A liquid jet recording head according to claim 107, wherein said electro-thermal transducer further has a protective layer.

188. A liquid jet recording head according to claim 108, wherein said electro-thermal transducer further has a protective layer.

189. A liquid jet recording head according to claim 109, wherein said electro-thermal transducer further has a protective layer.

190. A liquid jet recording head according to claim 110, wherein said electro-thermal transducer further has a protective layer.

191. A liquid jet recording head according to claim 111, wherein said electro-thermal transducer further has a protective layer.

192. A liquid jet recording head according to claim 110, wherein said electro-thermal transducer further has a protective layer.

193. A liquid jet recording system incorporating a liquid jet recording head according to claim 103.

194. A liquid jet recording system incorporating a liquid jet recording head according to claim 104.

195. A liquid jet recording system incorporating a liquid jet recording head according to claim 105.

196. A liquid jet recording system incorporating a liquid jet recording head according to claim 106.

197. A liquid jet recording system incorporating a liquid jet recording head according to claim 107.

198. A liquid jet recording system incorporating a liquid jet recording head according to claim 108.

199. A liquid jet recording system incorporating a liquid jet recording head according to claim 109.

200. A liquid jet recordig system incorporating a liquid jet recording head according to claim 110.

201. A liquid jet recording head according to claim 103, wherein a plurality of said recording liquid outlets are provided.

202. A liquid jet recording head according to claim 103, wherein a plurality of said electro-thermal transducers are provided.

203. A liquid jet recording head comprising:

at least one liquid drop outlet for discharging a recording liquid so as to form a droplet of said recording liquid;

at least one liquid passage communicating with said outlet and having a heating section; and at least one electro-thermal transducer corresponding to said heating section;

said electro-thermal transducer including a heat-generating resistance layer formed on a support member and made of an amorphous material containing halogen atoms and hydrogen atoms in a matrix of carbon atoms, and a pair of electrodes electrically connected to said heat-generating resistance layer.

204. A liquid jet recording head according to claim 203, wherein said amorphous material of said heat-generating resistance layer further contains silicon atoms in addition to said halogen atoms and said hydrogen atoms.

205. A liquid jet recording head according to claim 203, wherein said amorphous material of said heat-generating resistance layer further contains germanium atoms in addition to said halogen atoms and said hydrogen atoms.

206. A liquid jet recording head according to claim 203, wherein said amorphous material of said heat-generating resistance layer further contains silicon atoms and germanium atoms in addition to said halogen atoms and said hydrogen atoms.

207. A liquid jet recording head according to claim 203, wherein said amorphous material of said heat-generating resistance layer further contains an electroconductivity controlling substance in addition to said halogen atoms and said hydrogen atoms.

208. A liquid jet recording head according to claim 204, wherein said amorphous material of said heat-generating resistance layer further contains an electroconductivity controlling substance in addition to said halogen atoms, said hydrogen atoms and said silicon atoms.

209. A liquid jet recording head according to claim 205, wherein said amorphous material of said heat-generating resistance layer further contains an electroconductivity controlling substance in addition to said halogen atoms, said hydrogen atoms and said germanium atoms.

210. A liquid jet recording head according to claim 206, wherein said amorphous material of said heat-generating resistance layer further contains an electroconductivity controlling substance in addition to said halogen atoms, said hydrogen atoms and said germanium 211. A liquid jet recording head according to claim 203, wherein at least one of said halogen atoms and said hydrogen atoms has a non-uniform distribution in the thicknesswise direction of said heat-generating resistance layer.

212. A liquid jet recording head according to claim 204, wherein at least one of said halogen atoms, said hydrogen atoms and said silicon atoms has a non-uniform distribution in the thicknesswise direction of said heat-generating resistance layer.

213. A liquid jet recording head according to claim 205, wherein at least one of said halogen atoms, said hydrogen atoms and said germanium atoms has a non-uniform distribution in the thicknesswise direction of said heat-generating resistance layer.

214. A liquid jet recording head according to claim 206, wherein at least one of said halogen atoms, said hydrogen atoms, said silicon atoms and said germanium atoms has a non-uniform distribution in the thicknesswise direction of said heat-generating resistance layer.

215. A liquid jet recording head according to claim 207,
wherein at least one of said halogen atoms, said hydrogen atoms and said electroconductivity controlling substance has a non-uniform distribution in the thicknesswise direction of said heat-generating resistance layer.

216. A liquid jet recording head according to claim 208,
wherein at least one of said halogen atoms, said hydrogen atoms, said silicon atoms and said electroconductivity controlling substance has a non-uniform distribution in the thicknesswise direction of said heat-generatig resistance layer.

217. A liquid jet recording head according to claim 209,
wherein at least one of said halogen atoms, said hydrogen atoms, said germanium atoms and said electroconductivity controlling substance has a non-uniform distribution in the thicknesswise direction of said heat-generating resistance layer.

218. A liquid jet recording head according to claim 210,
wherein at least one of said halogen atoms, said hydrogen atoms, said silicon atoms, said germanium atoms and said electroconductivity controlling substance has a non-uniform distribution in the thicknesswise direction of said heat-generating resistance layer.

219. A liquid jet recording head according to claim 203,
wherein said halogen atoms are atoms of an element selected from a group consisting of F (Fluorine), Cl (Chlorine), B (Bromine) and I (Iodide).

220. A liquid jet recording head according to claim 204,
wherein said halogen atoms are atoms of an element selected from a group consisting of F (Fluorine), Cl (Chlorine), B (Bromine) and I (Iodide).

221. A liquid jet recording head according to claim 205,
wherein said halogen atoms are atoms of an element selected from a group consisting of F (Fluorine), Cl (Chlorine), B (Bromine) and I (Iodide).

222. A liquid jet recording head according to claim 206,
wherein said halogen atoms are atoms of an element selected from a group consisting of F (Fluorine), Cl (Chlorine), B (Bromine) and I (Iodide).

223. A liquid jet recordig head according to claim 207,
wherein said halogen atoms are atoms of an element selected from a group consisting of F (Fluorine), Cl (Chlorine), B (Bromine) and I (Iodide).

224. A liquid jet recording head according to claim 208,
wherein said halogen atoms are atoms of an element selected from a group consisting of F (Fluorine), Cl (Chlorine), B (Bromine) and I (Iodide).

225. A liquid jet recording head according to claim 209,
wherein said halogen atoms are atoms of an element selected from a group consisting of F (Fluorine), Cl (Chlorine), B (Bromine) and I (Iodide).

226. A liquid jet recording head according to claim 210,
wherein said halogen atoms are atoms of an element selected from a group consisting of F (Fluorine), Cl (Chlorine), B (Bromine) and I (Iodide).

227. A liquid jet recording head according to claim 211,
wherein said halogen atoms are atoms of an element selected from a group consisting of F (Fluorine), Cl (Chlorine), B (Bromine) and I (Iodide).

228. A liquid jet recording head according to claim 212,
wherein said halogen atoms are atoms of an element selected from a group consisting of F (Fluorine), Cl (Chlorine), B (Bromine) and I (Iodide).

229. A liquid jet recording head according to claim 213,
wherein said halogen atoms are atoms of an element selected from a group consisting of F (Fluorine), Cl (Chlorine), B (Bromine) and I (Iodide).

230. A liquid jet recording head according to claim 214,
wherein said halogen atoms are atoms of an element selected from a group consisting of F (Fluorine), Cl (Chlorine), B (Bromine) and I (Iodide).

231. A liquid jet recording head according to claim 215,
wherei said halogen atoms are atoms of an element selected from a group consisting of F (Fluorine), Cl (Chlorine), B (Bromine) and I (Iodide).

232. A liquid jet recording head according to claim 216,
wherein said halogen atoms are atoms of an element selected from a group consisting of F (Fluorine), Cl (Chlorine), B (Bromine) and I (Iodide).

233. A liquid jet recording head according to claim 217,
wherein said halogen atoms are atoms of an element selected from a group consisting of F (Fluorine), Cl (Chlorine), B (Bromine) and I (Iodide).

234. A liquid jet recording head according to claim 218,
wherein said halogen atoms are atoms of an element selected from a group consisting of F (Fluorine), Cl (Chlorine), B (Bromine) and I (Iodide).

235. A liquid jet recording head according to claim 207,
wherein said electroconductivity controlling substance is an element of group III or group V in the periodic table.

236. A liquid jet recording head according to claim 208,
wherein said electroconductivity controlling substance is an element of group III or group V in the periodic table.

237. A liquid jet recording head according to claim 209,
wherein said electroconductivity controlling substance is an element of group III or group V in the periodic table.

238. A liquid jet recording head according to claim 210,
wherein said electroconductivity controlling substance is an element of group III or group V in the periodic table.

239. A liquid jet recording head according to claim 215,
wherein said electroconductivity controlling substance is an element of group III or group V in the periodic table.

240. A liquid jet recording head according to claim 216, wherein said electroconductivity controlling substance is an element of group III or group V in the periodic table.

241. A liquid jet recording head according to claim 217, wherein said electroconductivity controlling substance is an element of group III or group V in the periodic table.

242. A liquid jet recording head according to claim 218, wherein said electroconductivity controlling substance is an element of group III or group V in the periodic table.

243. A liquid jet recording head according to claim 203, wherein the content of said halogen atoms ranges between 0.0001 and 30 atomic %.

244. A liquid jet recording head according to claim 204, wherein the content of said halogen atoms ranges between 0.0001 and 30 atomic %.

245. A liquid jet recording head according to claim 205, wherein the content of said halogen atoms ranges between 0.0001 and 30 atomic %.

246. A liquid jet recording head according to claim 206, wherein the content of said halogen atoms ranges between 0.0001 and 30 atomic %.

247. A liquid jet recording head according to claim 207, where the content of said halogen atoms ranges between 0.0001 and 30 atomic %.

248. A liquid jet recording head according to claim 208, wherein the content of said halogen atoms ranges between 0.0001 and 30 atomic %.

249. A liquid jet recording head according to claim 209, wherein the content of said halogen atoms ranges between 0.0001 and 30 atomic %.

250. A liquid jet recording head according to claim 210, wherein the content of said halogen atoms ranges between 0.0001 and 30 atomic %.

251. A liquid jet recording head according to claim 203, wherein the content of said hydrogen atoms ranges between 0.0001 and 30 atomic %.

252. A liquid jet recording head according to claim 204, wherein the content of said hydrogen atoms ranges between 0.0001 and 30 atomic %.

253. A liquid jet recording head according to claim 205, wherein the content of said hydrogen atoms ranges between 0.0001 and 30 atomic %.

254. A liquid jet recording head according to claim 206, wherein the content of said hydrogen atoms ranges between 0.0001 to 30 atomic %.

255. A liquid jet recording head according to claim 207, wherein the content of said hydrogen atoms ranges between 0.0001 and 30 atomic %.

256. A liquid jet recording head according to claim 208, wherein the content of said hydrogen atoms ranges between 0..0001 and 30 atomic %.

257. A liquid jet recording head according to claim 209, wherein the content of said hydrogen atoms ranges between 0.0001 and 30 atomic %.

258. A liquid jet recording head according to claim 210, wherein the content of said hydrogen atoms ranges between 0.0001 and 30 atomic %.

259. A liquid jet recording head according to claim 203, wherein the sum of the contents of said halogen atoms and said hydrogen atoms ranges between 0.0001 and 40 atomic %.

260. A liquid jet recording head according to claim 204, wherein the sum of the contents of said halogen atoms and said hydrogen atoms ranges between 0.0001 and 40 atomic %.

261. A liquid jet recording head according to claim 205, wherein the sum of the contents of said halogen atoms and said hydrogen atoms ranges between 0.0001 and 40 atomic %.

262. A liquid jet recording head according to claim 206, wherein the sum of the contents of said halogen atoms and said hydrogen atoms ranges between 0.0001 and 40 atomic %.

263. A liquid jet recording head according to claim 207, wherein the sum of the contents of said halogen atoms and said hydrogen atoms ranges between 0.0001 and 40 atomic %.

264. A liquid jet recording head according to claim 208, wherein the sum of the contents of said halogen atoms and said hydrogen atoms ranges between 0.0001 and 40 atomic %.

265. A liquid jet recording head according to claim 209, wherein the sum of the contents of said halogen atoms and said hydrogen atoms ranges between 0.0001 and 40 atomic %.

266. A liquid jet recording head according to claim 210, wherein the sum of the contents of said halogen atoms and said hydrogen atoms ranges between 0.0001 and 40 atomic %.

267. A liquid jet recording head according to claim 204, wherein the content of said silicon atoms ranges between 0.0001 and 40 atomic %.

268. A liquid jet recording head according to claim 206, wherein the content of said silicon atoms ranges between 0.0001 and 40 atomic %.

269. A liquid jet recording head according to claim 208, wherein the content of said silicon atoms ranges between 0.0001 and 40 atomic %.

270. A liquid jet recording head according to claim 210, wherein the content of said silicon atoms ranges between 0.0001 and 40 atomic %.

271. A liquid jet recording head according to claim 205, wherein the content of said germanium atoms ranges between 0.0001 and 40 atomic %.

272. A liquid jet recording head according to claim 206, wherein the content of said germanium atoms ranges between 0.0001 and 40 atomic %.

273. A liquid jet recording head according to claim 209, wherein the content of said germanium atoms ranges between 0.0001 and 40 atomic %.

274. A liquid jet recording head according to claim 210, wherein the content of said germanium atoms ranges between 0.0001 and 40 atomic %.

275. A liquid jet recording head according to claim 204, wherein the sum of contents of said silicon atoms, said halogen atoms and said hydrogen atoms ranges between 0.0001 and 40 atomic %.

276. A liquid jet recording head according to claim 208, wherein the sum of contents of said silicon atoms, said halogen atoms and said hydrogen atoms ranges between 0.0001 and 40 atomic %.

277. A liquid jet recording head according to claim 205, wherein the sum of contents of said germanium atoms, said halogen atoms and said hydrogen atoms ranges between 0.0001 and 40 atomic %.

278. A liquid jet recording head according to claim 209, wherein the sum of contents of said germanium atoms, said halogen atoms and said hydrogen atoms ranges between 0.0001 and 40 atomic %.

279. A liquid jet recording head according to claim 206, wherein the sum of contents of said silicon atoms, said germanium atoms, said halogen atoms and said hydrogen atoms ranges between 0.0001 and 40 atomic %.

280. A liquid jet recording head according to claim 210, wherein the sum of contents of said silicon atoms, said germanium atoms, said halogen atoms and said hydrogen atoms ranges between 0.0001 and 40 atomic %.

281. A liquid jet recording head according to claim 207, wherein the content of said electroconductivity controlling substance ranges between 0.01 and 50000 atomic ppm.

282. A liquid jet recording head according to claim 208, wherein the content of said electroconductivity controlling substance ranges between 0.01 and 50000 atomic ppm.

283. A liquid jet recording head according to claim 209, wherein the content of said electroconductivity controlling substance ranges between 0.01 and 50000 atomic ppm.

284. A liquid jet recording head according to claim 210, wherein the content of said electroconductivity controlling substance ranges between 0.01 and 50000 atomic ppm.

285. A liquid jet recording head according to claim 203, wherein said electro-thermal transducer further has a protective layer.

286. A liquid jet recording head according to claim 204, wherein said electro-thermal transducer further has a protective layer.

287. A liquid jet recording head according to claim 205, wherein said electro-thermal transducer further has a protective layer.

288. A liquid jet recording head according to claim 206, wherein said electro-thermal transducer further has a protective layer.

289. A liquid jet recording head according to claim 207, wherein said electro-thermal transducer further has a protective layer.

290. A liquid jet recording head according to claim 208, wherein said electro-thermal transducer further has a protective layer.

291. A liquid jet recording head according to claim 209, wherein said electro-thermal transducer further has a protective layer.

292. A liquid jet recording head according to claim 210, wherein said electro-thermal transducer further has a protective layer.

293. A liquid jet recording system incorporating the liquid jet recording head according to claim 203.

294. A liquid jet recording system incorporating a liquid jet recording head according to claim 204.

295. A liquid jet recording system incorporating a liquid jet recording head according to claim 205.

296. A liquid jet recording system incorporating a liquid jet recording head according to claim 206.

297. A liquid jet recording system incorporating a liquid jet recording head according to claim 207.

298. A liquid jet recording system incorporating a liquid jet recording head according to claim 208.

299. A liquid jet recording system incorporating a liquid jet recording head according to claim 209.

300. A liquid jet recording system incorporating a liquid jet recording head according to claim 210.

301. A liquid jet recording head according to claim 203, wherein a plurality of said liquid passages and a plurality of said liquid outlets corresponding to said liquid passages are provided.

302. A liquid jet recording head according to claim 203, wherein a plurality of said liquid outlets and a single liquid passage common to said liquid outlets are provided.

303. A liquid jet recording head according to claim 301, further comprising a common ink chamber with which said liquid passages communicate.

304. A liquid jet recording head according to claim 301, wherein said heating sections of said liquid passages are communicating with each other.

305. A liquid jet recording head according to claim 203, wherein said heat-generating resistance layer is formed on said support member and overlain by said pair of electrodes.

306. A liquid jet recording head according to claim 203, wherein said pair of electrodes are formed on said support member and overlain by said heat-generating resistance layer.

307. A liquid jet recording head according to claim 305, wherein said pair of electrodes are covered by a protective layer.

* * * * *

UNITED STATES PATENT AND TRADEMARK OFFICE

CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 1

Line 7, "May 5, 1988," should read --May 5, 1987,--.

COLUMN 3

Line 41, "superrior" should read --superior--.

COLUMN 8

Line 35, "the" should read --The--.

COLUMN 11

Line 4, "it" should read --It--.
Line 13, after "and" delete --semi colon--.

COLUMN 13

Line 58, "hydrocarbos." should read --hydrocarbons.--.
Line 64, "practical" should read --Practical--.

COLUMN 14

Line 37, "gasses," should read --gases,--.
Line 46, "value" should read --valve--.

COLUMN 19

Line 39, "in" should read --In--.

UNITED STATES PATENT AND TRADEMARK OFFICE

CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 20

Line 17, "rocroding" should read --recording--.

COLUMN 21

Line 53, "corss-sectional" should read --cross-sectional--.

COLUMN 23

Line 14, "recroding" should read --recording--.
Line 21, "a" should read --an--.

COLUMN 26

TABLE 5, "AR" should read --Ar--.

COLUMN 28

Line 50, "isnot" should read --is not--.

COLUMN 31

Line 34, "rpovision" should read --provision--.

COLUMN 33

Line 45, "$B_2H_6$," should read --$B_2H_6$--.

UNITED STATES PATENT AND TRADEMARK OFFICE

CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 34

Line 50, "a-CH:H(p,n)," should read --a-C:H(p,n),--.

COLUMN 36

Line 51, "substances" should read --substance--.

COLUMN 38

Line 7, "corss-sectional" should read --cross-sectional--.
Line 20, "wad" should read --was--.

COLUMN 40

Line 49, "maya" should read --may--.

COLUMN 41

Line 14, "withstant" should read --withstand--.

COLUMN 43

Line 34, "invention" should be deleted.

COLUMN 45

Line 2, "diposition" should read --deposition--.
Line 24, "basiclly" should read --basically--.

UNITED STATES PATENT AND TRADEMARK OFFICE
CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 47

Line 12, "Examaples" should read --Examples--.

COLUMN 49

Line 29, "preferbly" should read --preferably--.
Line 40, "the" should read --The--.

COLUMN 56

Line 17, "the" should read --The--.

COLUMN 57

Line 68, "alaign-" should read --align- --.

COLUMN 59

Line 65, "meeded" should read --needed--.

COLUMN 60

Line 24, "(a-C:Ge:(X,H)" should read --(a-C:Ge:(X,H))--.

COLUMN 62

Line 23, "passges" should read --passages--.

UNITED STATES PATENT AND TRADEMARK OFFICE

CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 63

Line 38, "aliquid" should read --liquid--.
Line 58, "imputted" should read --inputted--.

COLUMN 64

Line 40, "Examaples P-53," should read --Examples P-53,--.

COLUMN 70

Line 35, "amechanism" should read --mechanism--.
Line 60, "I (Iodide)." should read --I (Iodine).--.
Line 67, "I (Iodide)." should read --I (Iodine).--.

COLUMN 71

Line 3, "I (Iodide)." should read --I (Iodine).--.
Line 7, "I (Iodide)." should read --I (Iodine).--.
Line 57, "rocroding" should read --recording--.

COLUMN 78

Line 30, "I (Iodide)." should read --I (Iodine).--.
Line 35, "I (Iodide)." should read --I (Iodine).--.
Line 40, "I (Iodide)." should read --I (Iodine).--.
Line 45, "I (Iodide)." should read --I (Iodine).--.
Line 50, "I (Iodide)." should read --I (Iodine).--.
Line 55, "I (Iodide)." should read --I (Iodine).--.
Line 60, "I (Iodide)." should read --I (Iodine).--.
Line 65, "I (Iodide)." should read --I (Iodine).--.

UNITED STATES PATENT AND TRADEMARK OFFICE

CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 79

Line 3, "I (Iodide)." should read --I (Iodine).--.
Line 8, "I (Iodide)." should read --I (Iodine).--.
Line 13, "I (Iodide)." should read --I (Iodine).--.
Line 18, "I (Iodide)." should read --I (Iodine).--.
Line 23, "I (Iodide)." should read --I (Iodine).--.
Line 28, "I (Iodide)." should read --I (Iodine).--.
Line 33, "I (Iodide)." should read --I (Iodine).--.
Line 38, "I (Iodide)." should read --I (Iodine).--.

COLUMN 82

Line 13, "sail" should read --said--.

COLUMN 84

Line 43, "germanium" should read --germanium atoms.--

COLUMN 85

Line 14, "heat-generatig" should read --heat-generating--.
Line 35, "I (Iodide)." should read --I (Iodine).--.
Line 40, "I (Iodide)." should read --I (Iodine).--.
Line 45, "I (Iodide)." should read --I (Iodine).--.
Line 50, "I (Iodide)." should read --I (Iodine).--.
Line 55, "I (Iodide)." should read --I (Iodine).--.
Line 60, "I (Iodide)." should read --I (Iodine).--.
Line 65, "I (Iodide)." should read --I (Iodine).--.

UNITED STATES PATENT AND TRADEMARK OFFICE

CERTIFICATE OF CORRECTION

PATENT NO. : 4,847,639

DATED : July 11, 1989

INVENTOR(S) : MASAO SUGATA, ET AL.

It is certified that error appears in the above-identified patent and that said Letters Patent is hereby corrected as shown below:

COLUMN 86

Line 3, "I (Iodide)." should read --I (Iodine).--.
Line 8, "I (Iodide)." should read --I (Iodine).--.
Line 13, "I (Iodide)." should read --I (Iodine).--.
Line 18, "I (Iodide)." should read --I (Iodine).--.
Line 23, "I (Iodide)." should read --I (Iodine).--.
Line 26, "wherei" should read --wherein--.
Line 28, "I (Iodide)." should read --I (Iodine).--.
Line 33, "I (Iodide)." should read --I (Iodine).--.
Line 38, "I (Iodide)." should read --I (Iodine).--.
Line 43, "I (Iodide)." should read --I (Iodine).--.

Signed and Sealed this

Tenth Day of July, 1990

*Attest:*

HARRY F. MANBECK, JR.

*Attesting Officer*

*Commissioner of Patents and Trademarks*